United States Patent
Ahn et al.

(10) Patent No.: US 12,503,433 B2
(45) Date of Patent: Dec. 23, 2025

(54) ACETAL-BASED COMPOUND, ACETAL-BASED PREPOLYMER, ACETAL-BASED POLYMER, AND PHOTORESIST COMPOSITION COMPRISING THE SAME

(71) Applicants: Samsung Electronics Co., Ltd., Suwon-si (KR); INHA Industry Partnership Institute, Incheon (KR)

(72) Inventors: Chanjae Ahn, Suwon-si (KR); Myungwoong Kim, Incheon (KR); Yoonhyun Kwak, Suwon-si (KR); Sol An, Incheon (KR)

(73) Assignees: SAMSUNG ELECTRONICS CO., LTD., Suwon-si (KR); INHA Industry Partnership Institute, Incheon (KR)

( * ) Notice: Subject to any disclaimer, the term of this patent is extended or adjusted under 35 U.S.C. 154(b) by 444 days.

(21) Appl. No.: 18/055,959

(22) Filed: Nov. 16, 2022

(65) Prior Publication Data
US 2023/0174471 A1    Jun. 8, 2023

(30) Foreign Application Priority Data

Dec. 6, 2021 (KR) .......... 10-2021-0173266
Oct. 14, 2022 (KR) .......... 10-2022-0132743

(51) Int. Cl.
C07C 321/14    (2006.01)
C08G 75/14    (2006.01)

(52) U.S. Cl.
CPC ............ *C07C 321/14* (2013.01); *C08G 75/14* (2013.01)

(58) Field of Classification Search
CPC .. C07C 321/14; C08G 75/14; C08G 65/2663; C08G 65/1202; C08G 65/2603;
(Continued)

(56) References Cited

U.S. PATENT DOCUMENTS 4,162,239 A    7/1979    Nicolet et al.
4,647,504 A    3/1987    Kimimura et al.
(Continued)

FOREIGN PATENT DOCUMENTS

DE    2457690 A1    6/1975
DE    3411763 A1    10/1984
DE    3544790 A1    7/1986

OTHER PUBLICATIONS

Park, Juhae et al., "Molecular Modeling of EUV Photoresist Revealing of the Effect of Chain Conformation on Line-Edge Roughness Formation," Polymers 2019, 11, 1923, 14 pp. published Nov. 22, 2019.
(Continued)

*Primary Examiner* — Shane Fang
(74) *Attorney, Agent, or Firm* — Sughrue Mion, PLLC

(57) ABSTRACT

An acetal-based compound represented by Formula 1, an acetal-based prepolymer, an acetal-based polymer, and a photoresist composition including the same Formula 1

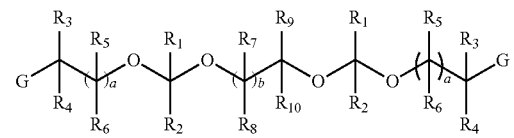

wherein in Formula 1, $R_1$ to $R_{10}$, G, a, and b are as defined in the detailed description, and * indicates a linking site.

22 Claims, 8 Drawing Sheets

(58) Field of Classification Search
CPC ............ C08G 65/2606; C08G 65/2618; C08G 65/2636; C08G 65/2639; C09D 171/00; C09D 171/02; C09D 171/08
See application file for complete search history.

(56) References Cited

U.S. PATENT DOCUMENTS

| | | |
|---|---|---|
| 4,791,183 A | 12/1988 | Yamamizu et al. |
| 8,741,546 B2 | 6/2014 | Hatakeyama et al. |
| 9,316,909 B2 | 4/2016 | Hatakeyama et al. |
| 9,323,153 B2 | 4/2016 | Hirano et al. |
| 2014/0158664 A1* | 6/2014 | Kwak ........................ C08J 7/04 216/41 |
| 2016/0370702 A1 | 12/2016 | Hatakeyama et al. |
| 2017/0174808 A1 | 6/2017 | Kramer |

OTHER PUBLICATIONS

Extended EP Search Report dated May 12, 2023, in corresponding EP Patent Application No. 22207193.8, 7 pp.

* cited by examiner

ACETAL-BASED COMPOUND, ACETAL-BASED PREPOLYMER, ACETAL-BASED POLYMER, AND PHOTORESIST COMPOSITION COMPRISING THE SAME

CROSS-REFERENCE TO RELATED APPLICATION

This application claims priority to Korean Patent Application No. 10-2021-0173266, filed on Dec. 6, 2021 and 10-2022-0132743, filed on Oct. 14, 2022, in the Korean Intellectual Property Office, and all the benefits accruing therefrom under 35 U.S.C. § 119, the disclosure of which in its entirety is incorporated by reference herein.

BACKGROUND

1. Field

One or more embodiments relates to an acetal-based compound, an acetal-based prepolymer, an acetal-based polymer, and a photoresist composition including the acetal-based polymer.

2. Description of the Related Art

Fine patterning is essential for manufacturing a highly integrated semiconductor device. Recently, as design specifications of semiconductor devices are rapidly decreasing, various lithography techniques for achieving fine patterns are being developed. In particular, there is recent interest in an extreme ultraviolet (EUV) lithography process using an exposure process by EUV as a next-generation technology to replace lithography processes by KrF excimer laser (248 nm) and ArF excimer laser (193 nm). However, in the case of EUV lithography process and the use of a conventional chemical amplified resist (CAR), EUV light has a very high energy compared to ArF light. Accordingly, even if the CAR is irradiated with light of the same or similar energy, the number of photons is significantly reduced, and sensitivity decreases. Therefore, to increase the number of photons capable of generating an acid, a higher exposure dose and/or a very long exposure time is required.

SUMMARY

One or more embodiments includes a novel acetal-based compound.

One or more embodiments includes an acetal-based prepolymer using the acetal-based compound described above.

One or more embodiments includes an acetal-based polymer formed from the acetal-based prepolymer described above.

One or more embodiments include a photoresist composition including the acetal-based polymer described above.

Additional aspects will be set forth in part in the description which follows and, in part, will be apparent from the description, or may be learned by practice of the presented embodiments of the disclosure.

According to one or more embodiments, provided is an acetal-based compound represented by Formula 1.

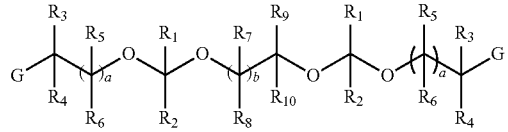

Formula 1 wherein, in Formula 1, $R_1$ to $R_{10}$ are each independently hydrogen, deuterium, a substituted or unsubstituted C1-C60 alkyl group, a substituted or unsubstituted C2-C60 alkenyl group, a substituted or unsubstituted C2-C60 alkynyl group, a substituted or unsubstituted C1-C60 alkoxy group, a substituted or unsubstituted C3-C10 cycloalkyl group, a substituted or unsubstituted C1-C10 heterocycloalkyl group, a substituted or unsubstituted C3-C10 cycloalkenyl group, a substituted or unsubstituted C1-C10 heterocycloalkenyl group, a substituted or unsubstituted C6-C60 aryl group, a substituted or unsubstituted C6-C60 aryloxy group, a substituted or unsubstituted C6-C60 arylthio group, a substituted or unsubstituted C1-C60 heteroaryl group, a substituted or unsubstituted C8-C60 monovalent non-aromatic condensed polycyclic group, a substituted or unsubstituted C1-C60 monovalent non-aromatic condensed heteropolycyclic group, —Si($Q_1$)($Q_2$)($Q_3$), —B($Q_1$)($Q_2$), —N($Q_1$)($Q_2$), —P($Q_1$)($Q_2$), —C(=O)($Q_1$), —S(=O)($Q_1$), —S(=O)$_2$ ($Q_1$), —P(=O)($Q_1$)($Q_2$), or —P(=S)($Q_1$)($Q_2$), wherein $Q_1$ to $Q_3$ are each independently hydrogen; deuterium; —F; —Cl; —Br; —I; a hydroxyl group; a cyano group; a nitro group; a $C_1$-$C_{60}$ alkyl group; a $C_2$-$C_{60}$ alkenyl group; a $C_2$-$C_{60}$ alkynyl group; a $C_1$-$C_{60}$ alkoxy group; or a $C_3$-$C_{60}$ carbocyclic group unsubstituted or substituted with deuterium, —F, cyano group, a $C_1$-$C_{60}$ alkyl group, a $C_1$-$C_{60}$ alkoxy group, a phenyl group, a biphenyl group, or any combination thereof; a $C_1$-$C_{60}$ heterocyclic group unsubstituted or substituted with deuterium, —F, cyano group, a $C_1$-$C_{60}$ alkyl group, a $C_1$-$C_{60}$ alkoxy group, a phenyl group, a biphenyl group, or any combination thereof; a $C_7$-$C_{60}$ arylalkyl group unsubstituted or substituted with deuterium, —F, cyano group, a $C_1$-$C_{60}$ alkyl group, a $C_1$-$C_{60}$ alkoxy group, a phenyl group, a biphenyl group, or any combination thereof; or a $C_2$-$C_{60}$ heteroarylalkyl group unsubstituted or substituted with deuterium, —F, cyano group, a $C_1$-$C_{60}$ alkyl group, a $C_1$-$C_{60}$ alkoxy group, a phenyl group, a biphenyl group, or any combination thereof, with an exception that both $R_1$ and $R_2$ are hydrogen, a and b are each independently 0 or an integer of 1 to 10, G is a group represented by Formula 2 or Formula 2a,

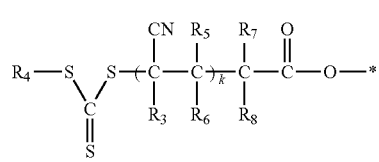

Formula 2

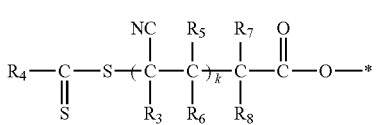

Formula 2a wherein, in Formulae 2 and 2a, $R_4$ is an unsubstituted or substituted C1-C60 alkyl or C1-C60 aryl group, and $R_3$, $R_5$ to $R_8$ are each independently hydrogen, or an unsubstituted or substituted C1-C20 alkyl group,

* indicates a linking site, and k is 0 or 1.

According to one or more embodiments, provided is acetal-based prepolymer which is a polymerization product of the acetal-based compound described above, a first polymerizable monomer having a polar group, and a second polymerizable monomer having an acid labile group.

According to one or more embodiments, provided is an acetal-based polymer which is a chain extension reaction product of the acetal-based prepolymer described above and a chain extender.

According to one or more embodiments, provided is a photoresist composition including a base polymer, a photoacid generator, and a solvent, wherein the base polymer includes the acetal-based polymer described above.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
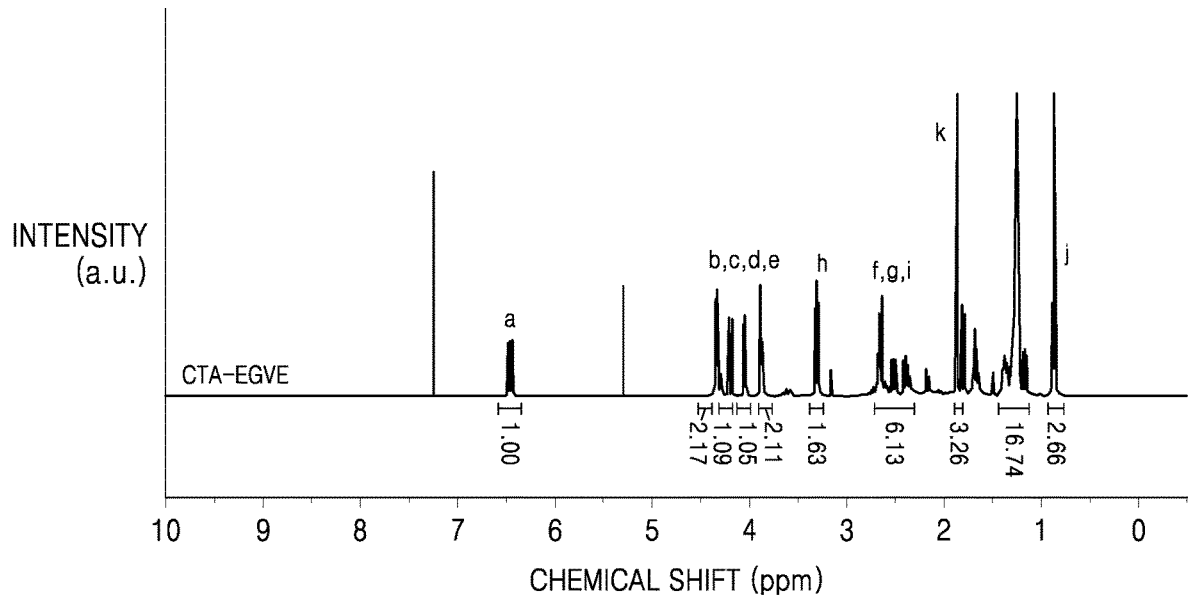
FIG. 1 shows a nuclear magnetic resonance (NMR) spectrum of a product (CTA-EGVE) prepared according to Example 1.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

It will be understood that when an element is referred to as being "on" another element, it can be directly on the other element or intervening elements may be present therebetween. In contrast, when an element is referred to as being "directly on" another element, there are no intervening elements present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±10% or ±5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, reference to an "acetal-based" compound, prepolymer, or polymer will be understood to refer to an acetal-containing compound, prepolymer, or polymer.

Hereinafter, embodiments of an acetal-based compound, an acetal-based prepolymer prepared therefrom, an acetal-based polymer, a preparing method thereof, and a photoresist composition including the acetal-based polymer will be described in detail. In addition, a method of forming a pattern by using the photoresist composition will be described.

Because extreme ultraviolet (EUV) light is of very high energy compared to ArF light, the number of photons is significantly small even when light of the same energy is irradiated onto a chemically amplified resist (CAR), and thus, sensitivity is reduced. Accordingly, to increase the number of photons capable of generating an acid, an increased exposure dose and a very long exposure time of the CAR would be required.

To increase the sensitivity of a CAR-type photoresist when the length of photoresist polymer chains is reduced by a relatively smaller amounts of acid generated by light, the molecular weight is rapidly reduced, and the solubility of the chains can rapidly increase.

As main-chain scission (MCS) polymers capable of reducing the length of a polymer chain, methyl methacrylate polymer, polysulfone, polycarbonate, and the like are known. However, when such MCS polymers are used a practical application of the polymers may be more difficult because of the necessary changing of a developing solution, low etch resistance, poor contrast with respect to the developing solution, defect occurrence, low glass transition temperature, outgassing during exposure, and the like.

Accordingly, the present inventors have conducted research on an acetal-based polymer that is a novel main-chain scission (MCS) polymer with an acetal moiety introduced as an acid labile functional group into the polymer main chain. The acetal-based polymer can effectively reduce the molecular weight of polymer by main-chain scission that is induced by light. Using the acetal-based polymer according to an embodiment, the molecular weight of polymer can be effectively reduced through main-chain scission by introducing an acid-labile functional group into the polymer main chain, and thus, improve the photosensitivity of the system while expanding the concept of a combination of acid generator/polymer as a CAR. Accordingly, when the main chain of polymer is cleaved, and though the deprotection of side chains may be incomplete in an exposed region due to limited acid generation, the length of the polymer chain is reduced and the molecular weight decreases. This in turn provides for improved developing, and thus, photosensitivity can be greatly increased.

A novel acetal-based compound is used in the preparation of an acetal-based polymer according to one or more embodiments.

In one or more embodiments, provided is an acetal-based compound represented by Formula 1.

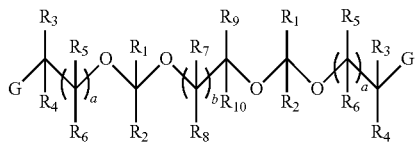

Formula 1 wherein, in Formula 1,
$R_1$ to $R_{10}$ are each independently hydrogen, deuterium, a substituted or unsubstituted C1-C60 alkyl group, a substituted or unsubstituted C2-C60 alkenyl group, a substituted or unsubstituted C2-C60 alkynyl group, a substituted or unsubstituted C1-C60 alkoxy group, a substituted or unsubstituted C3-C10 cycloalkyl group, a substituted or unsubstituted C1-C10 heterocycloalkyl group, a substituted or unsubstituted C3-C10 cycloalkenyl group, a substituted or unsubstituted C1-C10 heterocycloalkenyl group, a substituted or unsubstituted C6-C60 aryl group, a substituted or unsubstituted C6-C60 aryloxy group, a substituted or unsubstituted C6-C60 arylthio group, a substituted or unsubstituted C1-C60 heteroaryl group, a substituted or unsubstituted C8-C60 monovalent non-aromatic condensed polycyclic group, a substituted or unsubstituted C1-C60 monovalent non-aromatic condensed heteropolycyclic group, $-Si(Q_1)(Q_2)(Q_3)$, $-B(Q_1)(Q_2)$, $-N(Q_1)(Q_2)$, $-P(Q_1)(Q_2)$, $-C(=O)(Q_1)$, $-S(=O)(Q_1)$, $-S(=O)_2(Q_1)$, $-P(=O)(Q_1)(Q_2)$, or $-P(=S)(Q_1)(Q_2)$, wherein $Q_1$, $Q_2$, and $Q_3$ are each independently hydrogen; deuterium; $-F$; $-Cl$; $-Br$; $-I$; a hydroxyl group; a cyano group; a nitro group; a $C_1$-$C_{60}$ alkyl group; a $C_2$-$C_{60}$ alkenyl group; a $C_2$-$C_{60}$ alkynyl group; a $C_1$-$C_{60}$ alkoxy group; or a $C_3$-$C_{60}$ carbocyclic group unsubstituted or substituted with deuterium, $-F$, cyano group, a $C_1$-$C_{60}$ alkyl group, a $C_1$-$C_{60}$ alkoxy group, a phenyl group, a biphenyl group, or any combination thereof; a $C_1$-$C_{60}$ heterocyclic group unsubstituted or substituted with deuterium, $-F$, cyano group, a $C_1$-$C_{60}$ alkyl group, a $C_1$-$C_{60}$ alkoxy group, a phenyl group, a biphenyl group, or any combination thereof; a $C_7$-$C_{60}$ arylalkyl group unsubstituted or substituted with deuterium, $-F$, cyano group, a. $C_1$-$C_{60}$ alkyl group, a $C_1$-$C_{60}$ alkoxy group, a phenyl group, a biphenyl group, or any combination thereof; or a $C_2$-$C_{60}$ heteroarylalkyl group unsubstituted or substituted with deuterium, $-F$, cyano group, a $C_1$-$C_{60}$ alkyl group, a $C_1$-$C_{60}$ alkoxy group, a phenyl group, a biphenyl group, or any combination thereof, with an exception that both $R_1$ and $R_2$ are hydrogen,
a and b are each independently 0 or an integer of 1 to 10,
G is a group represented by Formula 2 or Formula 2a,

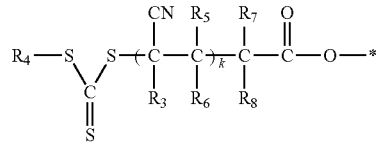

Formula 2

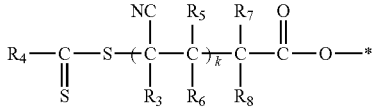

Formula 2a wherein, in Formula 2 and Formula 2a, $R_4$ is an unsubstituted or substituted C1-C60 alkyl group or an unsubstituted or substituted C6-C60 aryl group,
$R_3$, and $R_5$ to $R_8$ are each independently hydrogen, or an unsubstituted or substituted C1-C20 alkyl group,
* indicates a linking site, and
k is 0 or 1.

In Formula 1, G indicates a chain transfer agent (CTA) used for reversible addition fragmentation chain transfer (RAFT) polymerization.

The compound of Formula 1 may be, for example, a compound represented by Formula 1-1.

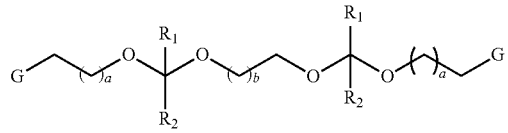

Formula 1-1 wherein, in Formula 1-1,
$R_1$ and $R_2$ are each independently hydrogen, deuterium, a substituted or unsubstituted C1-C60 alkyl group, a substituted or unsubstituted C2-C60 alkenyl group, a substituted or unsubstituted C2-C60alkynyl group, a substituted or unsubstituted C1-C60alkoxy group, a substituted or unsubstituted C3-C10 cycloalkyl group, a substituted or unsubstituted C1-C10 heterocycloalkyl group, a substituted or unsubstituted C3-C10 cycloalkenyl group, a substituted or unsubstituted C1-C10 heterocycloalkenyl group, a substituted or unsubstituted C6-C60 aryl group, a substituted or unsubstituted C6-C60 aryloxy group, a substituted or unsubstituted C6-C60 arylthio group, a substituted or unsubstituted C1-C60 heteroaryl group, a substituted or unsubstituted C8-C60 monovalent non-aromatic condensed polycyclic group, a substituted or unsubstituted C1-C60 monovalent non-aromatic condensed heteropolycyclic group, $-Si(Q_1)(Q_2)(Q_3)$, $-B(Q_1)(Q_2)$, $-N(Q_1)(Q_2)$, $-P(Q_1)(Q_2)$, $-C(=O)(Q_1)$, $-S(=O)(Q_1)$, $-S(=O)_2(Q_1)$, $-P(=O)(Q_1)(Q_2)$, or $-P(=S)(Q_1)(Q_2)$, wherein $Q_1$ to $Q_3$ are each independently hydrogen; deuterium; —F; —Cl; —Br; —I; a hydroxyl group; a cyano group; a nitro group; a $C_1$-$C_{60}$ alkyl group; a $C_2$-$C_{60}$ alkenyl group; a $C_2$-$C_{60}$ alkynyl group; a $C_1$-$C_{60}$ alkoxy group; or a $C_3$-$C_{60}$ carbocyclic group unsubstituted or substituted with deuterium, —F, cyano group, a $C_1$-$C_{60}$ alkyl group, a $C_1$-$C_{60}$ alkoxy group, a phenyl group, a biphenyl group, or any combination thereof; a $C_1$-$C_{60}$ heterocyclic group unsubstituted or substituted with deuterium, —F, cyano group, a $C_1$-$C_{60}$ alkyl group, a $C_1$-$C_{60}$ alkoxy group, a phenyl group, a biphenyl group, or any combination thereof; a $C_7$-$C_{60}$ arylalkyl group unsubstituted or substituted with deuterium, —F, cyano group, a $C_1$-$C_{60}$ alkyl group, a $C_1$-$C_{60}$ alkoxy group, a phenyl group, a biphenyl group, or any combination thereof; or a $C_2$-$C_{60}$ heteroarylalkyl group unsubstituted or substituted with deuterium, —F, cyano group, a $C_1$-$C_{60}$ alkyl group, a $C_1$-$C_{60}$ alkoxy group, a phenyl group, a biphenyl group, or any combination thereof, with an exception that both $R_1$ and $R_2$ are hydrogen, a and b are each independently 0 or an integer of 1 to 10, G is a group represented by Formula 2-1 or Formula 2a-1,

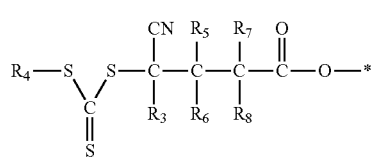

Formula 2-1

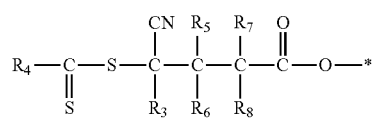

Formula 2a-1 wherein in Formulae 2 and 2a-1, $R_4$ is a C1-C60 alkyl group or a C6-C30 aryl group, $R_3$ and $R_5$ to $R_8$ are each independently hydrogen or a C1-C60 alkyl group, and

* indicates a linking site.

In the formulae above, substituents of each group may be at least one R. R may be deuterium (-D), —F, —Cl, —Br, —I, a hydroxyl group, a cyano group, or a nitro group; a $C_1$-$C_{30}$ alkyl group, a $C_2$-$C_{30}$ alkenyl group, a $C_2$-$C_{30}$ alkynyl group, or a $C_1$-$C_{30}$ alkoxy group; a $C_3$-$C_{30}$ carbocyclic group, a $C_1$-$C_{30}$ heterocyclic group, a $C_6$-$C_{30}$ aryloxy group, a $C_6$-$C_{30}$ arylthio group, a $C_7$-$C_{30}$ arylalkyl group, or a $C_2$-$C_{30}$ heteroarylalkyl group; or $-Si(Q_1)(Q_2)(Q_3)$, $-N(Q_1)(Q_2)$, $-B(Q_1)(Q_2)$, $-C(=O)(Q_1)$, $-S(=O)_2(Q_1)$, or $-P(=O)(Q_1)(Q_2)$ wherein $Q_1$ to $Q_3$ are each independently hydrogen, deuterium, —F, —C$_1$, —Br, —I, a hydroxyl group, a cyano group, a nitro group, a $C_1$-$C_{30}$ alkyl group, a $C_2$-$C_{30}$ alkenyl group, a $C_2$-$C_{30}$ alkynyl group, a $C_1$-Cso alkoxy group, $C_3$-$C_{30}$ carbocyclic group, a $C_1$-$C_{30}$ heterocyclic group, a $C_7$-$C_{30}$ arylalkyl group, or a $C_2$-$C_3$ heteroarylalkyl group.

The acetal-based compound according to one or more embodiments may be a compound represented by Formula 3 or Formula 3-1.

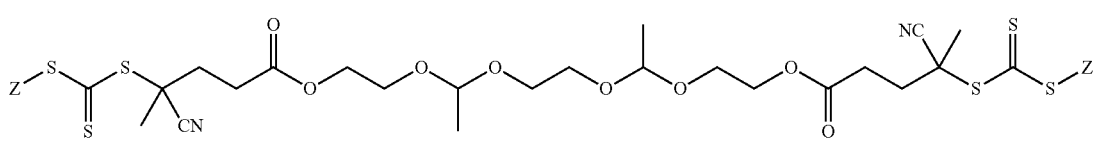

Formula 3

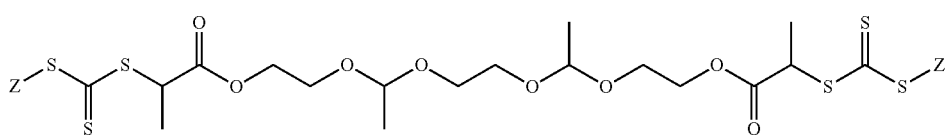

Formula 3-1 wherein, in Formulae 3 and 3-1, z is a C1-C60 alkyl group.

For example, z may be a C1-C30 alkyl group, a C1-C25 alkyl group, a C5-C20 alkyl group, or a C10-C15 alkyl group. For example, z may be $CH_3(CH_2)_5-$, $CH_3(CH_2)_6-$, $CH_3(CH_2)_7-$, $CH_3(CH_2)_8-$, $CH_3(CH_2)_9-$, $CH_3(CH_2)_{10}-$ or $CH_3(CH_2)_{11}-$.

The acetal-based compound according to one or more embodiments may be, for example, a compound represented by Formula 3-3, or a compound represented by Formula 3-4.

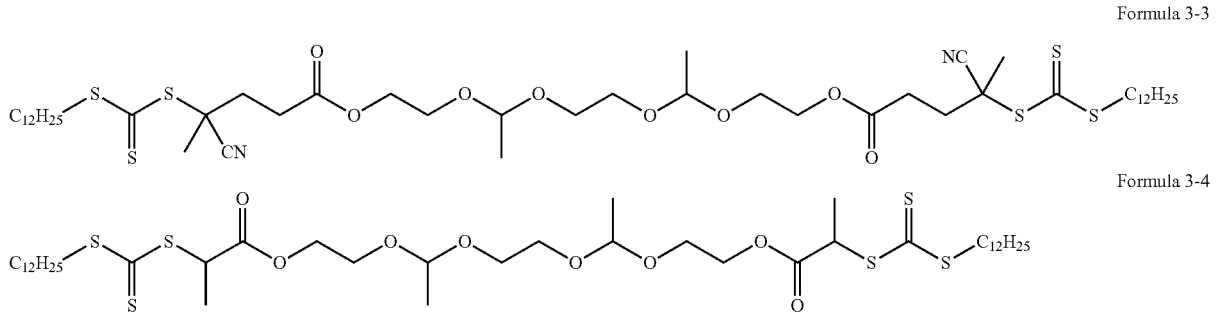

Formula 3-3

Formula 3-4

In a method of preparing the acetal-based compound according to one or more embodiments, the acetal-based compound may be prepared, as described in Example 1, which will be described later, by firstly preparing a chain transfer agent having a vinyl ether terminal group, and then using the chain transfer agent together with ethylene glycol and an acid.

The acetal-based compound according to one or more embodiments includes an acetal moiety, and thus, an acetal-based prepolymer and an acetal-based polymer, which have the acetal moiety as an acid labile functional group in the polymer main chain, may be prepared using the acetal-based compound.

The acetal-based prepolymer and the acetal-based polymer may be prepared using a reversible addition-fragmentation chain transfer (RAFT) agent for RAFT polymerization, which is designed to have an acid labile functional group, or an atom transfer radical polymerization (ATRP) initiator, and a chain extender.

The acetal-based prepolymer according to one or more embodiments may be prepared by using a RAFT agent into which an acid-labile group is introduced, to have a structure with an acetal group located at the chain center. The acetal-based prepolymer is a product obtained by a polymerization reaction of the acetal-based compound, a first polymerizable monomer having a polar group, and a second polymerizable monomer having an acid labile group.

A mixed molar ratio of the first polymerizable monomer and the second polymerizable monomer may be, for example, 1:99 to 99:1, 1:9 to 9:1, 2:8 to 8:2, 6:4 to 4:6, or 5:5.

Sequentially, after modification by substitution of the terminal group of the acetal-based prepolymer, the modified acetal-based prepolymer is mixed with a chain extender to cause a chain extension reaction, thereby preparing an acetal-based polymer.

The acetal-based polymer, which is obtained through the chain extension reaction of the acetal-based prepolymer and the chain extender, may have a molecular weight that may vary according to reaction conditions during the chain extension reaction. These conditions may include a chain extender, a catalyst, a solvent, and the like.

When forming a line pattern in a photoresist film using a photoresist composition, a line width variation may occur due to roughness of a pattern sidewall surface, i.e., line edge roughness (LER). The line width variation is required to be about 10% or less of a LER. However, a common base polymers in a photoresist composition have an average particle diameter per molecule as large as several nanometers, and thus, it is hard to reduce LER.

The acetal-based polymer according to one or more embodiments contains an acetal moiety that is an acid labile group, and thus, may have improved LER by the reduction of the radius of gyration in an portion of the polymer exposed to light. In addition, by the reduction of the molecular weight of the exposed portion, solubility in a developing solution is increased, thereby reducing the occurrence of defects and improving the contrast. In addition, sensitivity may be improved so that excellent contrast may be ensured even with a low dose of light.

The acetal-based polymer according to one or more embodiments may have a weight average molecular weight (Mw) of about 4,000 grams per mole (g/mol) to about 50,000 g/mol, about 4,000 g/mol to about 35,000 g/mol, about 4,100 g/mol to about 20,000 g/mol, about 4,300 g/mol to about 20,000 g/mol, about 4,500 g/mol to about 18,000 g/mol, or about 4,800 g/mol to about 15,000 g/mol, and a polydispersity index (PDI) of about 1.2 to about 2.5, for example, about 1.3 to 2.4. In the acetal-based polymer according to one or more embodiments, a scission polymer chain decomposed by acid treatment may have a weight average molecular weight (Mw) of about 3,000 g/mol or less, about 2,000 g/mol or less, about 1,500 g/mol or less, about 1,000 g/mol or less, or about 500 g/mol to about 900 g/mol. The polymer chain decomposed by acid may have a PDI of about 1.05 to about 1.19.

Weight average molecular weights as herein are defined by gel permeation chromatography.

The acetal-based polymer according to one or more embodiments may be used as a base polymer in preparing a photoresist composition.

In relation to a patterning mechanism when the acetal-based polymer is used as a base polymer in a photoresist composition, an acid is generated in a light exposed portion by a photo-acid generator. The acid labile functional group of the acetal-based polymer, which is a hydrophobic group, is decomposed by the generated acid and changed into a hydrophilic group. As a result, solubility in a developing solution is increased, thus increasing contrast and ensuring excellent performance even with a small dose of light.

The acetal-based prepolymer according to one or more embodiments is a polymerization reaction product of the acetal-based compound, a first polymerizable monomer having a polar group, and a second polymerizable monomer having an acid labile group.

The first polymerizable monomer may be a compound represented by Formula 4.

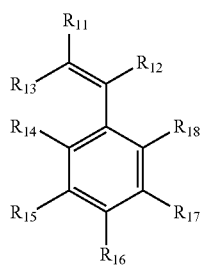

Formula 4 wherein, in Formula 4, $R_{11}$, $R_{12}$, and $R_{13}$ are each independently a hydrogen, a C1-30 alkyl group, or a C6-C60 aryl group, $R_{14}$ to $R_{18}$ are each independently hydrogen, a C1-C60 alkyl group, a C1-C60 alkoxy group, a cyano group, a hydroxyl group, a halogen, a halogen-substituted C1-C60 alkyl group, an acetal group, R'C(=O)O—, wherein R' is H or a C1-C20 alkyl group, a C6-C60 aryl group, a C6-C60 aryloxy group, a C6-C60 arylthio group, a C1-C60 heteroaryl group, a C8-C60 monovalent non-aromatic condensed polycyclic group, or a C1-C60 monovalent non-aromatic condensed heteropolycyclic group, optionally, at least two adjacent $R_{14}$ to $R_{18}$ are linked to form a ring, and at least one of $R_{14}$ to $R_{18}$ is a polar group.

For example, the polar group may be a hydroxyl group, an acetal group, or R'C(=O)O— (wherein R' is H or a C1-C20 alkyl group).

The halogen may be, for example, F, I, Cl, or Br. In addition, the C1-C60 alkyl group substituted with a halogen may be, for example, $CF_3$.

The second polymerizable monomer having an acid labile group may be, for example, a compound represented by Formula 5.

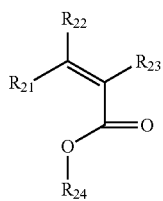

Formula 5 wherein, in Formula 5, $R_{21}$, $R_{22}$, and $R_{23}$ are each independently a hydrogen or a C1-C60 alkyl group, and $R_{24}$ is an acid labile group.

The acid labile group may be, for example, a C4-C12 alkyl group such as t-butyl group or t-amyl group, or a C4-C60 hydrocarbon group having an alicyclic structure.

The hydrocarbon group having an alicyclic group may be, for example, a hydrocarbon group having an alicyclic group or having an alkyl group substituted with an alicyclic group.

$R_{24}$ may be, for example, a tertiary alkyl group or a cycloalkyl group. The alicyclic structure may be monocyclic or polycyclic, and for example, may include a group having a monocyclic, bicyclic, tricyclic, or a tetracyclic structure of five or more carbon atoms. For example, $R_{24}$ may be a hydrocarbon group having a C6-C30 alicyclic structure, for example, C7-C25 alicyclic structure. The hydrocarbon group having such an alicyclic structure may have a substituent. Examples of the alicyclic structure are as follows.

(1)

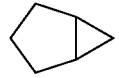

(2)

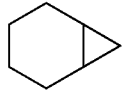

(3)

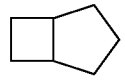

(4)

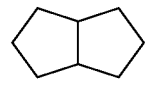

(5)

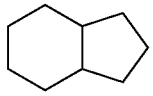

(6)

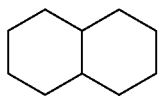

(7)

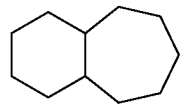

(8)

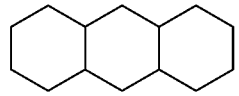

(9)

(10)

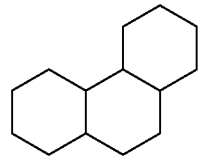

-continued (11)

(12)

(13)

(14)

(15)

(16)

(17)

(18)

(19)

(20)

(21)

-continued (22)

(23)

(24)

(25)

(26)

(27)

(28)

(29)

(30)

(31)

(32)

(33)

(34) 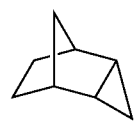

(35) 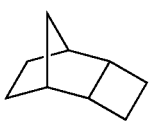

(36) 

(37) 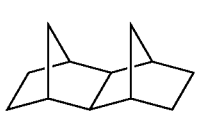

(38) 

(39) 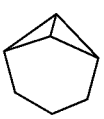

(40) 

(41) 

(42) 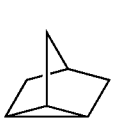

(43) 

(44) 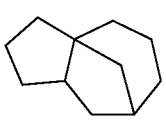

(45) 

(46) 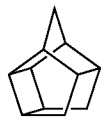

(47) 

(48) 

(49) 

(50) 

The alicyclic group may include, as a monovalent alicyclic group, an adamantyl group, a noradamantyl group, a decalin residue, a tricyclodecanyl group, a tetracyclododecanyl group, a norbornyl group, a cedrol group, a cyclohexyl group, a cycloheptyl group, a cyclooctyl group, a cyclodecanyl group, and a cyclododecanyl group. Other examples of the alicyclic group may include an adamantyl group, a decalin residue, a norbornyl group, a cedrol group, a cyclohexyl group, a cycloheptyl group, a cyclooctyl group, a cyclodecanyl group, or a cyclododecanyl group. Examples of the substituent of the alicyclic structure include an alkyl group, a halogen, a hydroxyl group, an alkoxy group, a carboxyl group, or an alkoxycarbonyl group. The alkyl group may be a lower alkyl group, such as a methyl group, an ethyl group, a propyl group, an isopropyl group, or a butyl group. For example, the alkyl group may be a methyl group, an ethyl group, a propyl group, or an isopropyl group. The alkoxy group may include a C1-C4 alkoxy group such as a methoxy group, an ethoxy group, a propoxy group, or a butoxy group. The alkyl group and the alkoxy group may further have a substituent. Examples of the substituent of the alkyl group and the alkoxy group may be a hydroxyl group, a halogen, or an alkoxy group.

The acid labile group may be an unsubstituted or substituted group A including an adamantyl group, a noradamantyl group, a decalin residue, a tricyclodecanyl group, a tetracyclododecanyl group, a norbornyl group, a cedrol group, a cyclohexyl group, a cycloheptyl group, a cyclooctyl group, a cyclodecanyl group, or a cyclododecanyl group.

Non-limiting examples of the first polymerizable monomer that can form repeating units are monomers represented by the following formulae.

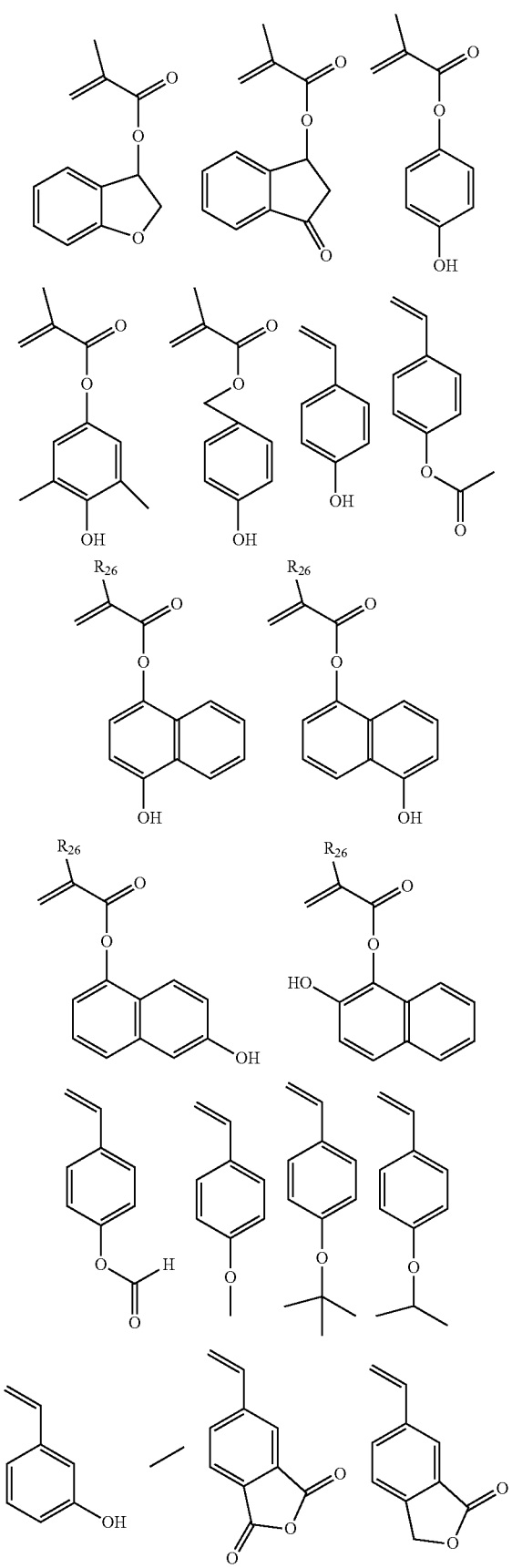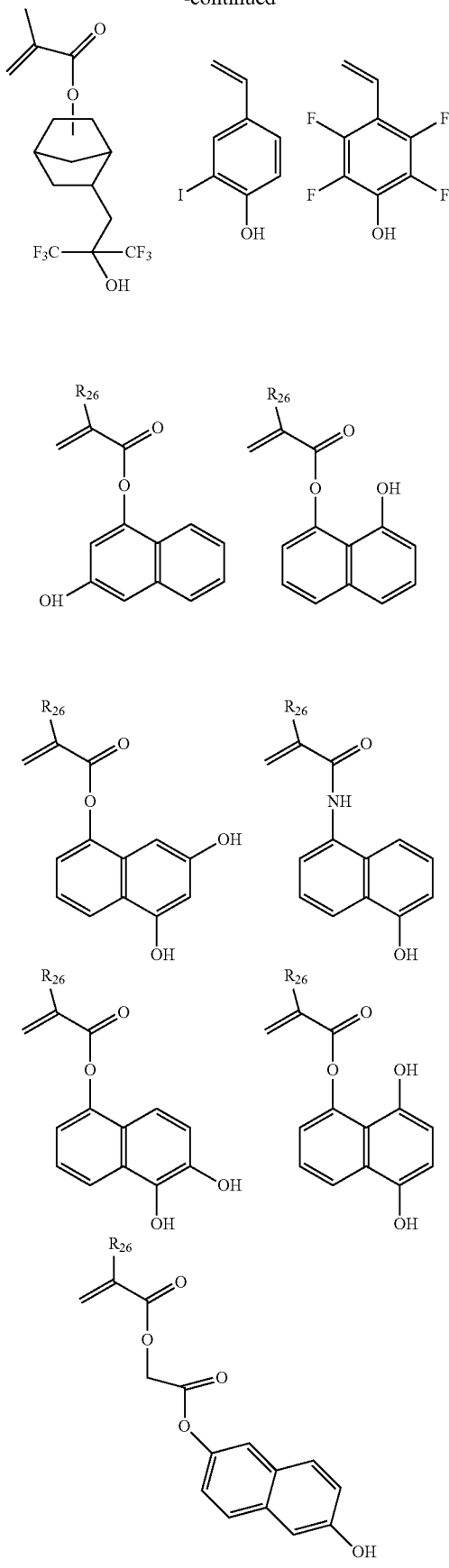

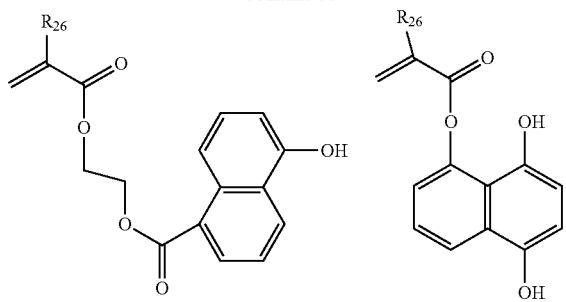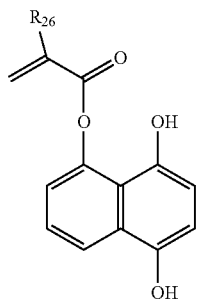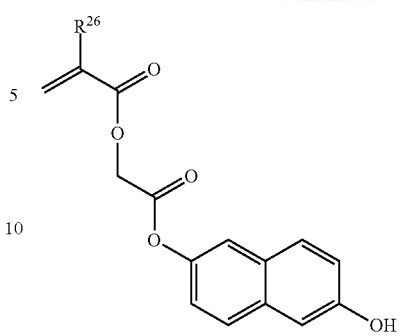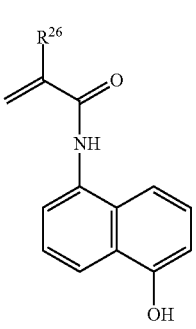
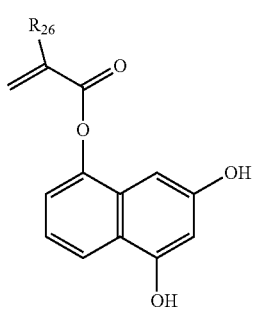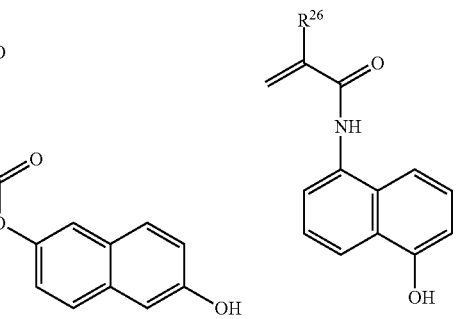
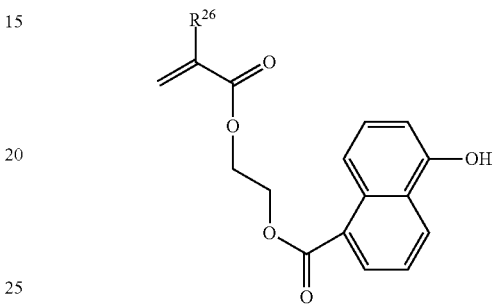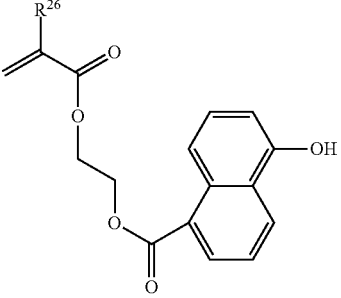
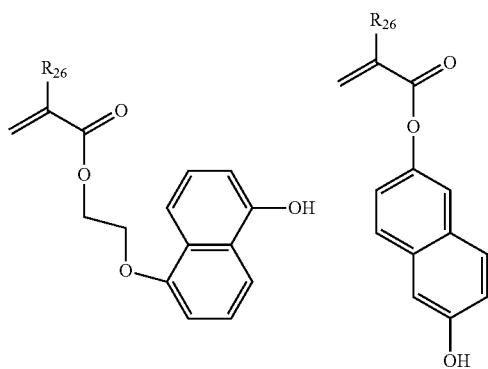
In the formulae above, $R_{26}$ is a hydrogen or a methyl group.
Additional non-limiting examples of first monomers are monomers that can form the repeating units represented by the following formulae.
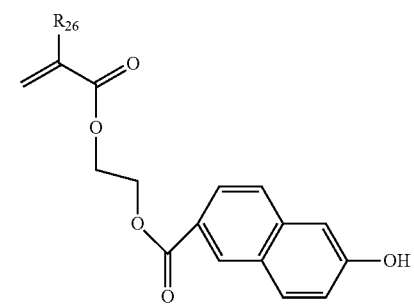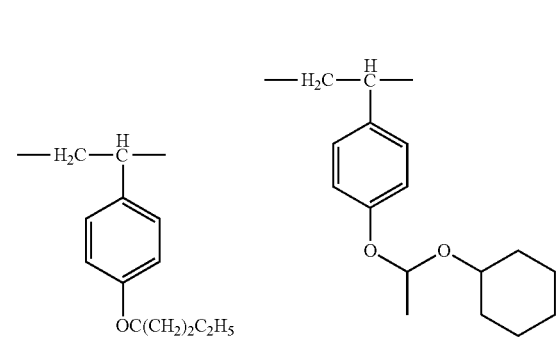
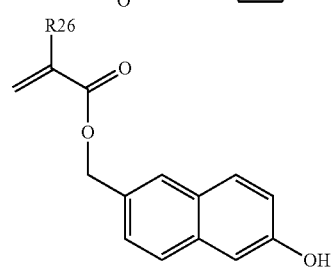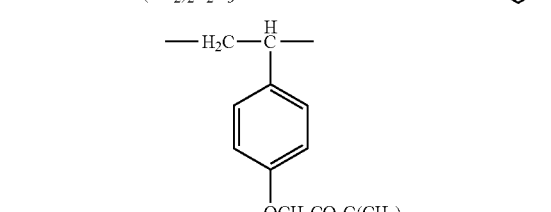
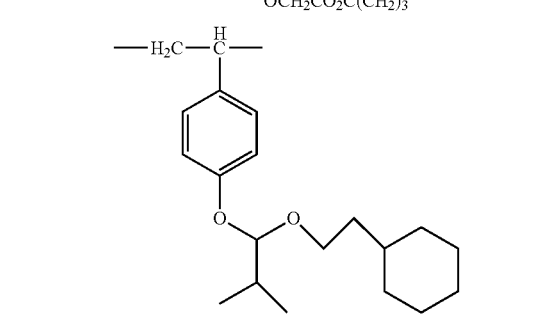

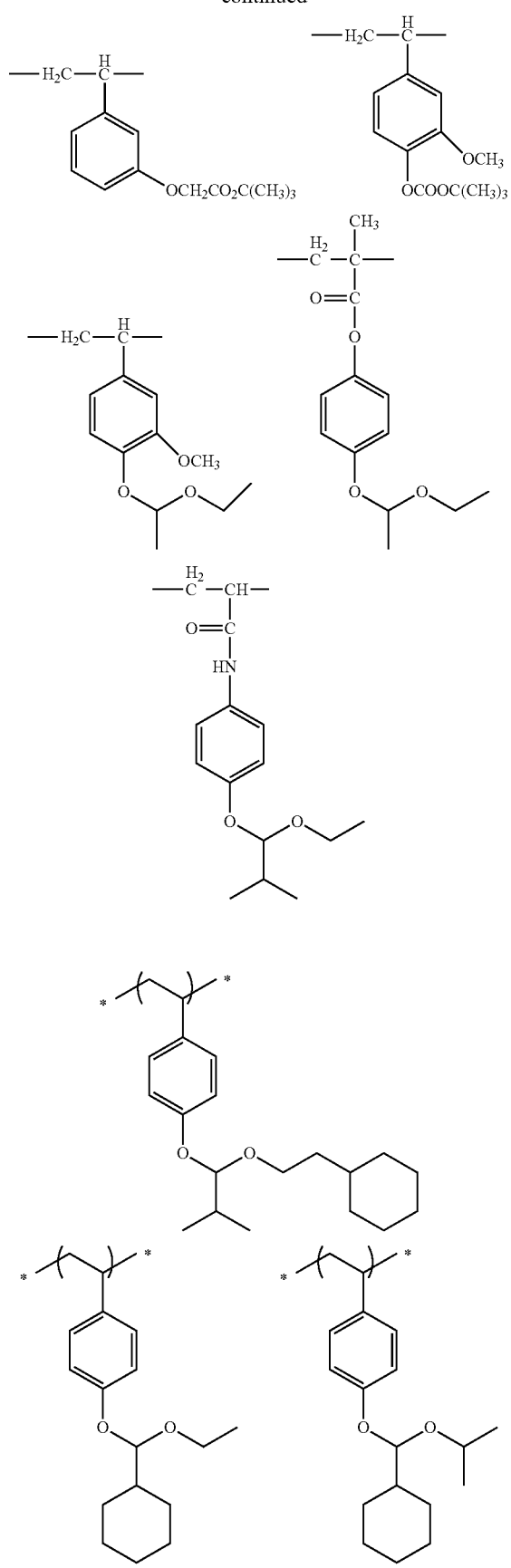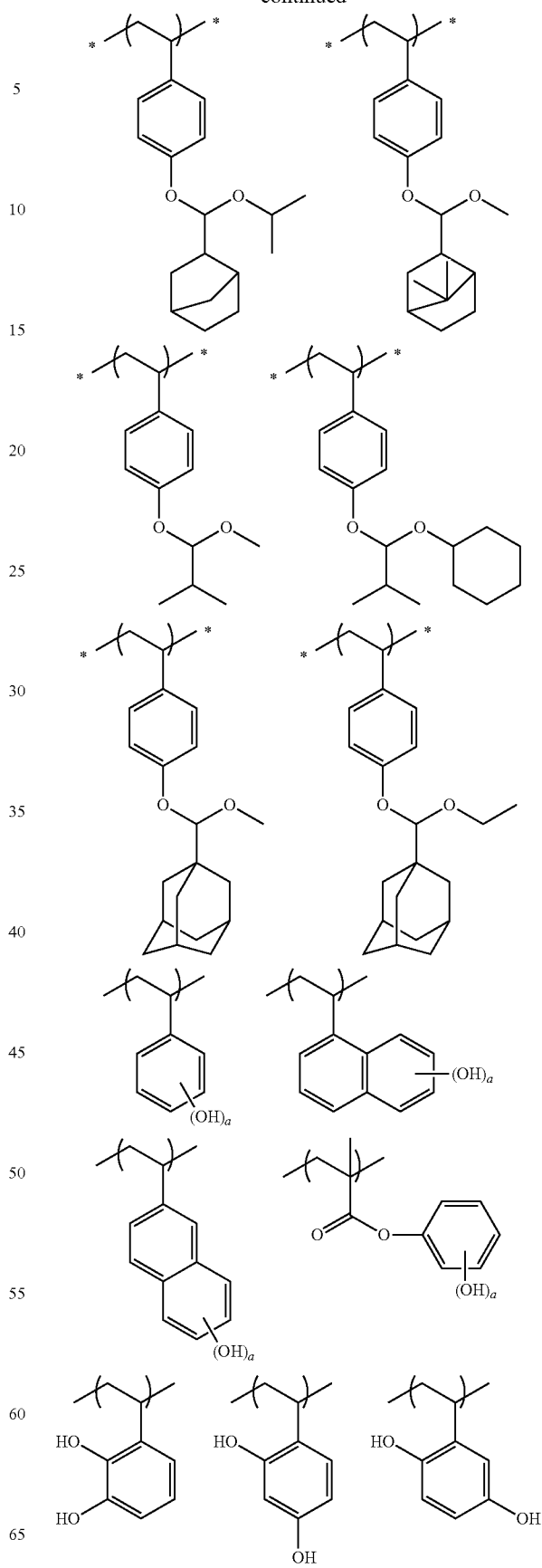

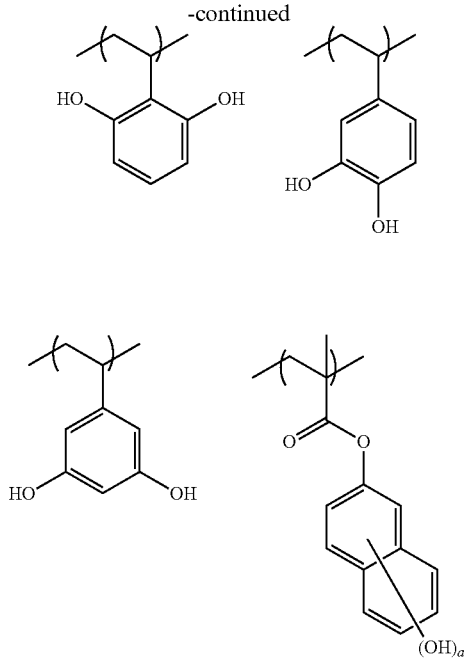
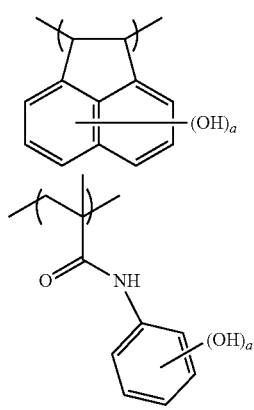
In the formula, a is an integer from 1 to 6.
Other non-limiting examples of the second polymerizable monomer are monomers that can form the repeating units represented by the following formulae
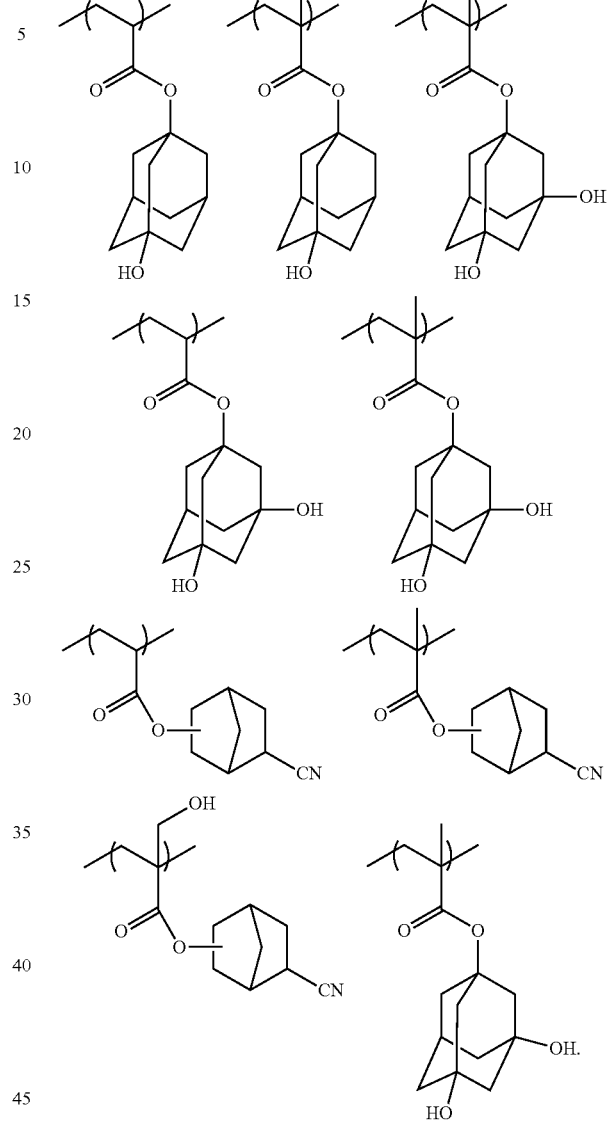
Still other non-limiting examples of the second polymerizable monomer are monomers that can represented by the following formulae.
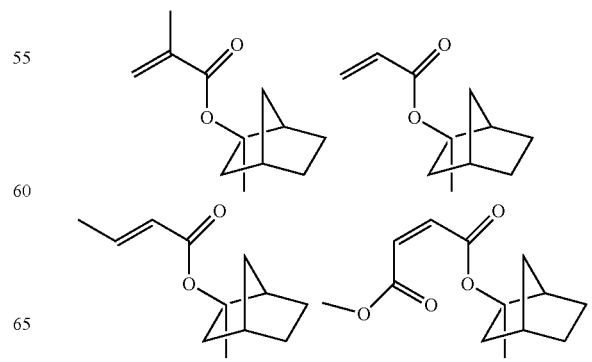

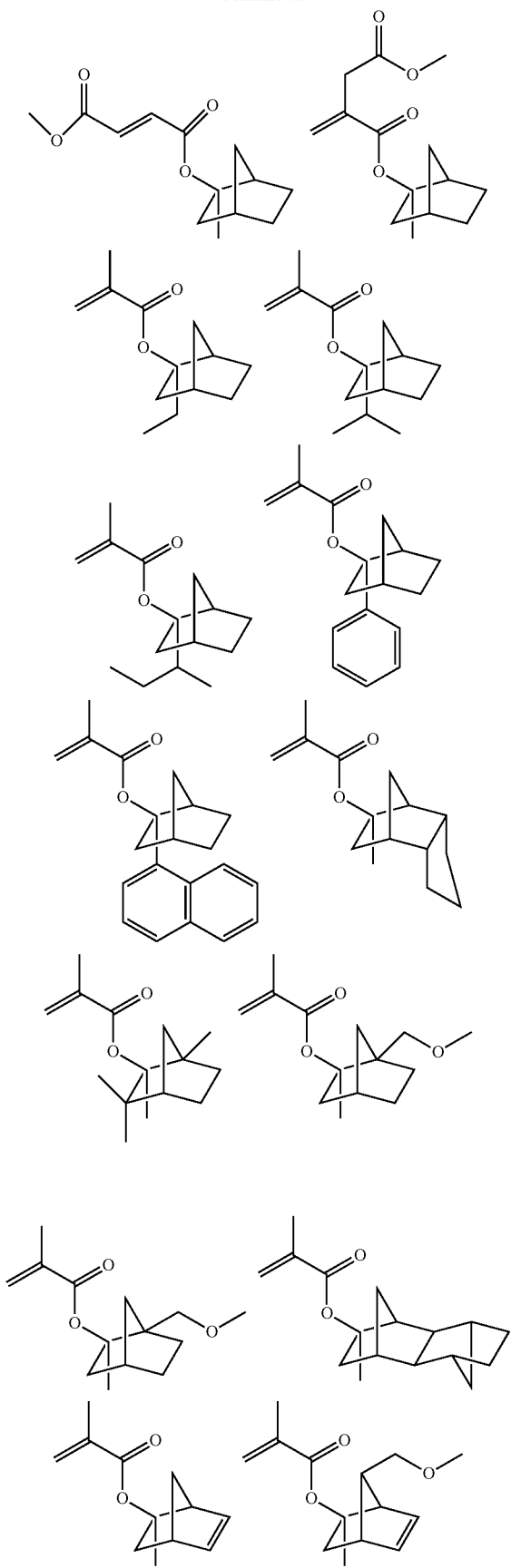
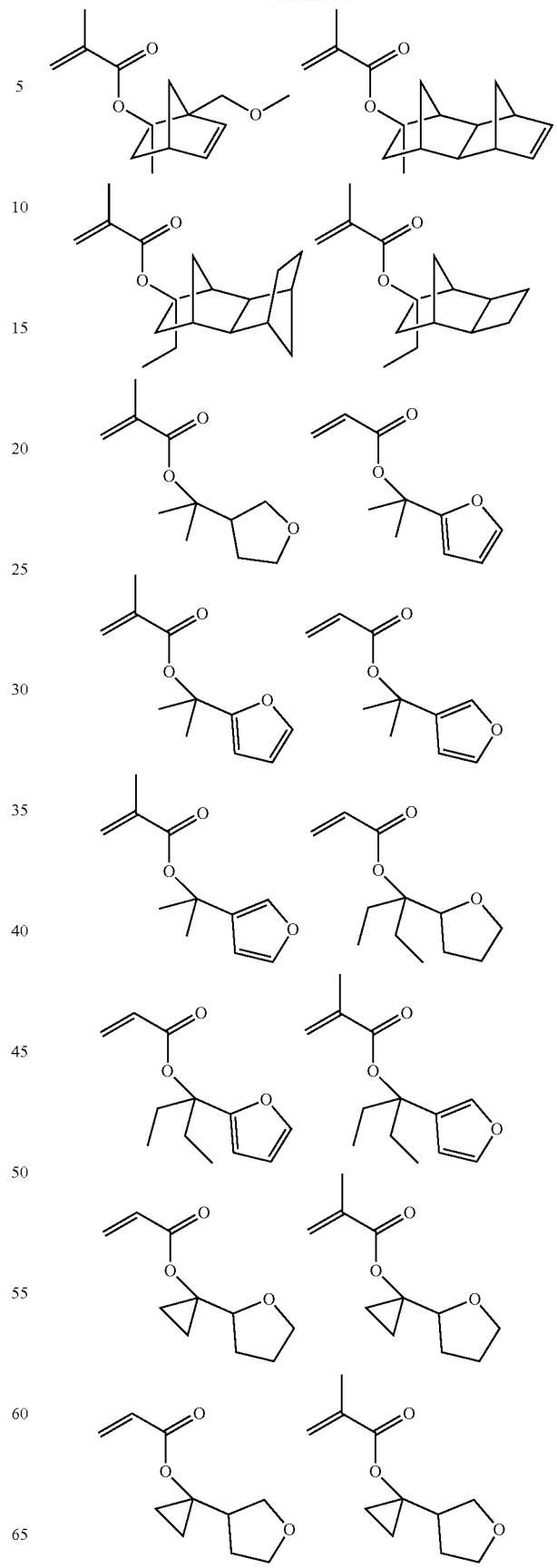

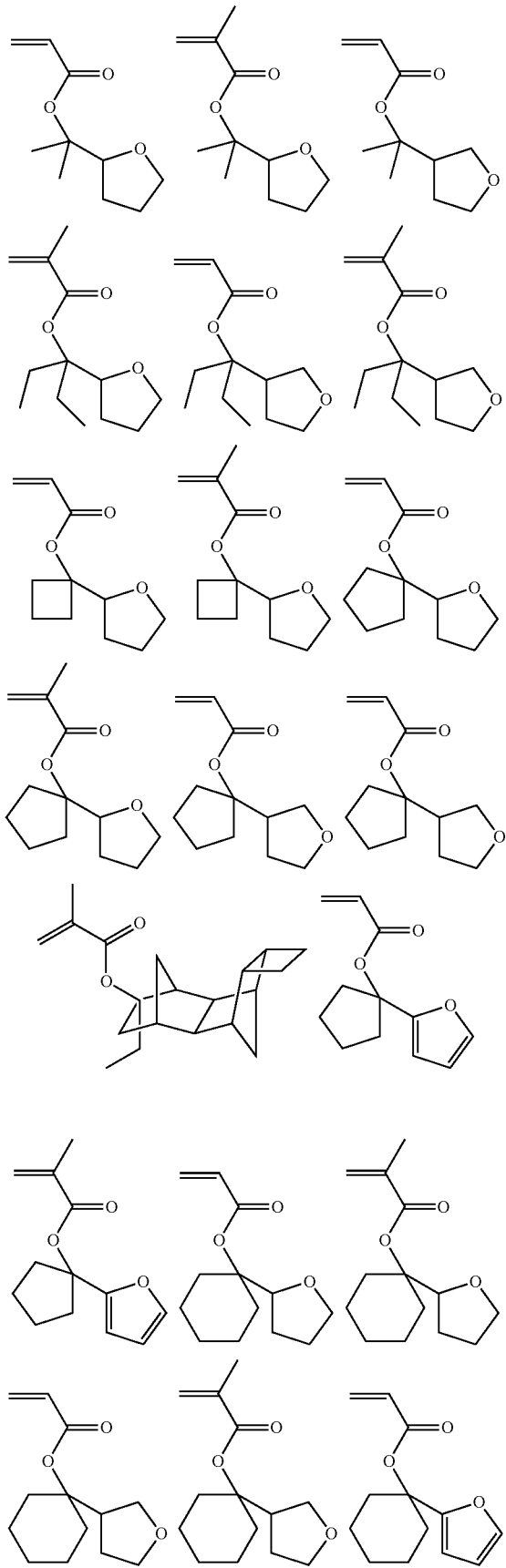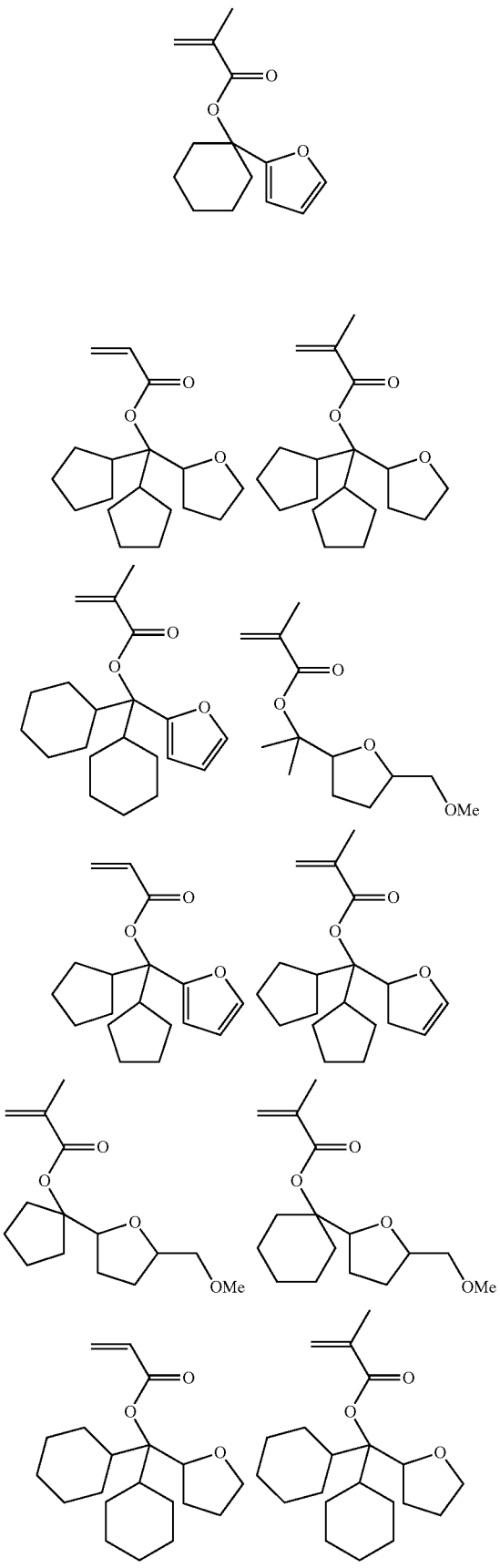

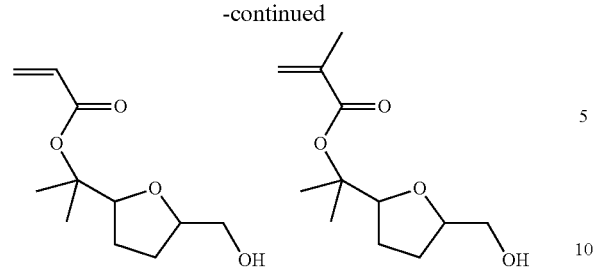
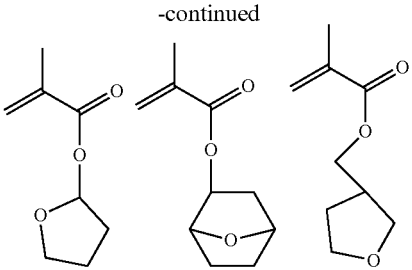
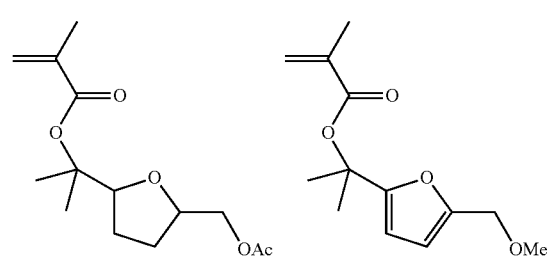
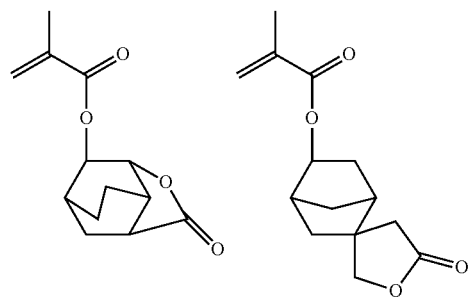
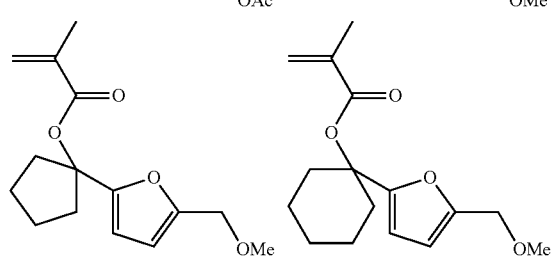
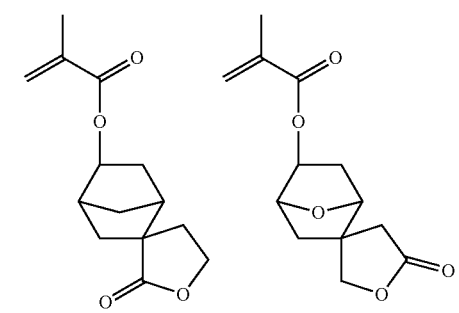
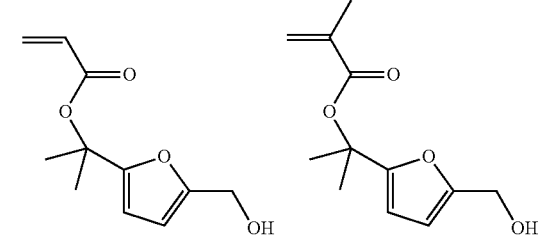
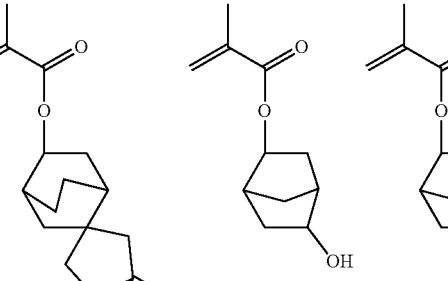
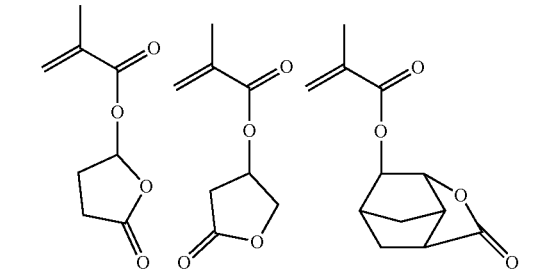
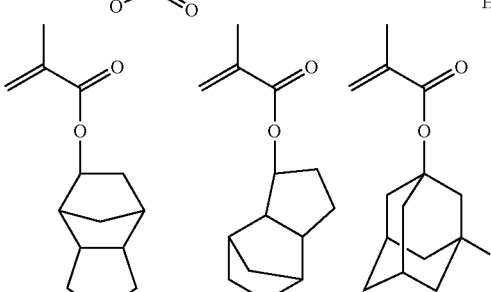
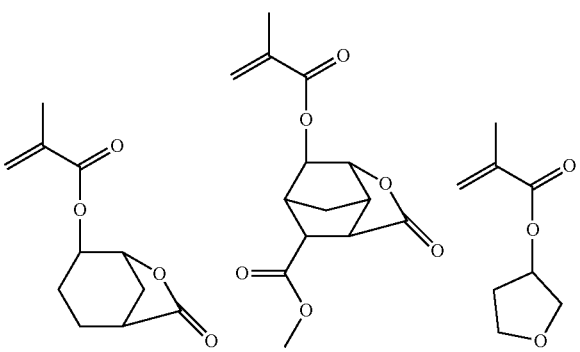
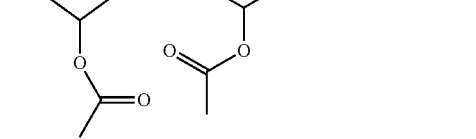

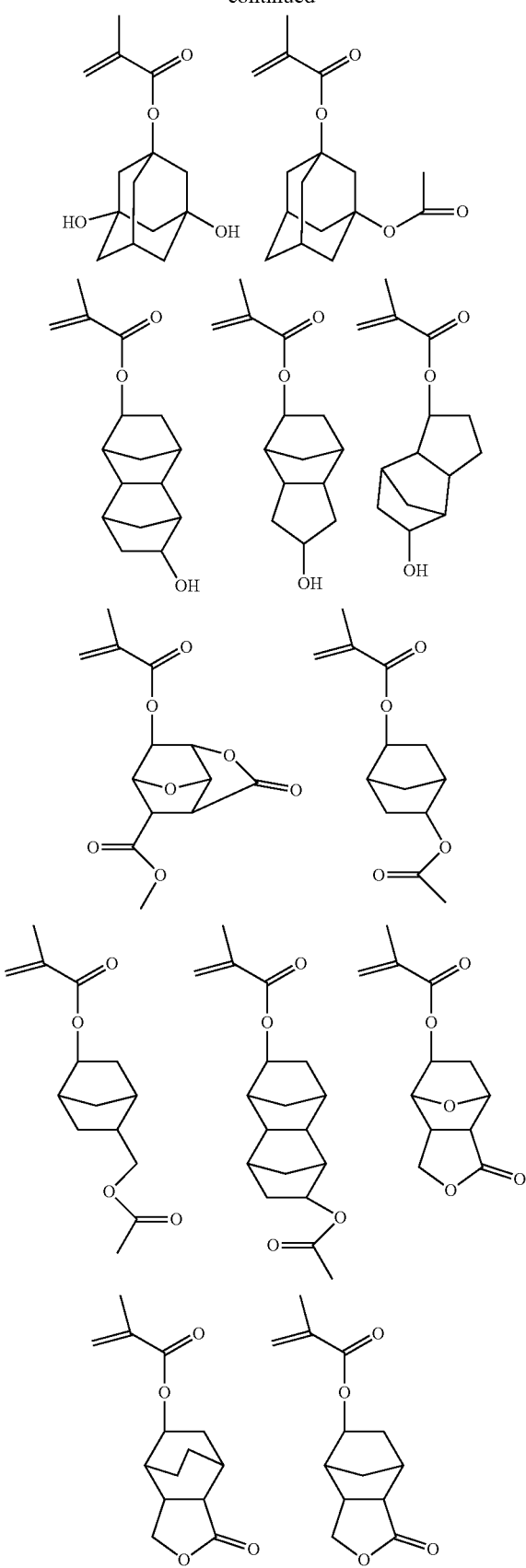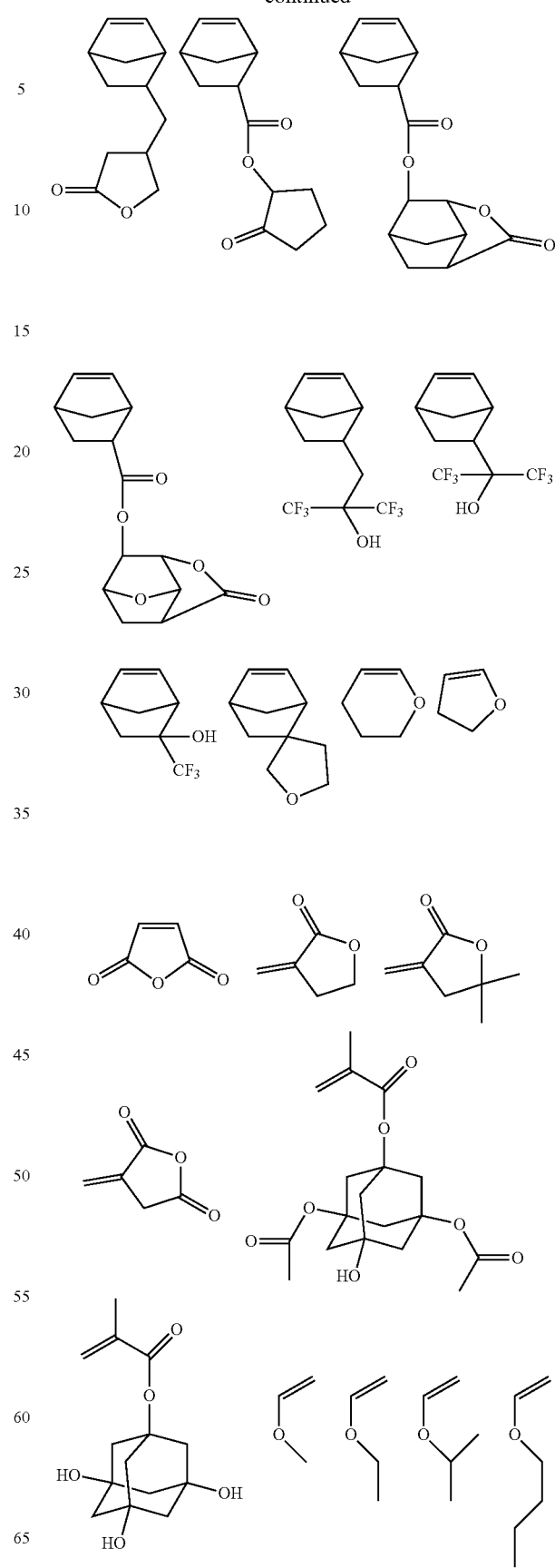

-continued

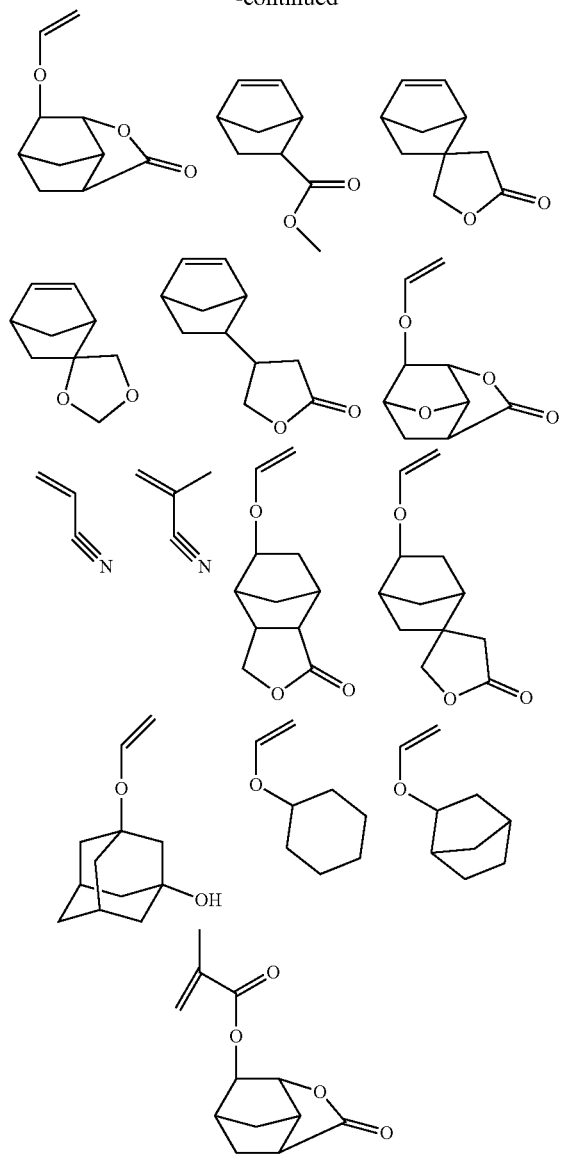

From the first polymerizable monomer and the second polymerizable monomer, a first repeating unit represented by Formula 4-1 and a second repeating unit represented by Formula 5-1 may be formed, respectively. The second repeating unit is a repeating unit that is decomposed by the action of an acid to increase solubility in an alkali developing solution.

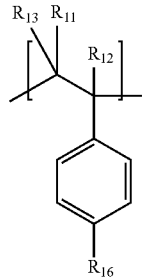

Formula 4-1

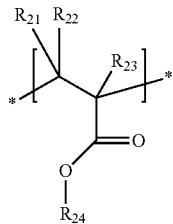

Formula 5-1 wherein, in Formula 4-1, $R_{11}$, $R_{12}$, and $R_{13}$ are each independently hydrogen, a C1-30 alkyl group, or a C6-C60 aryl group, and $R_{16}$ is a polar group, a hydroxyl group, an acetal group, or R'C(=O)O—, wherein R' is H or a C1-C20 alkyl group, and in Formula 5-1, $R_{21}$, $R_{22}$, and $R_{23}$ are each independently hydrogen or a C1-C60 alkyl group, and $R_{24}$ is an acid labile group and is a C4-C20 tertiary alkyl group, a tertbutyl group, a tert-amyl group, or a hydrocarbon group having an alicyclic structure.

The first repeating unit may be derived from 3-hydroxystyrene, 4-hydroxystyrene, 5-hydroxy-2-vinylnaphthalene, or 6-hydroxy-2-vinylnaphthalene. For example, the second repeating unit may include a repeating unit of (meth)acrylate-based polymers such as poly(t-butyl methacrylate), poly(norbornyl methacrylate), or a binary or ternary copolymer of the (meth)acrylate-based polymers. For example, the second repeating unit may not have acid labile group. The second repeating unit without acid labile group may include a repeating unit such as polymethyl methacrylate and poly(methacrylic acid).

The acetal-based prepolymer may be, for example, a compound represented by Formula 6.

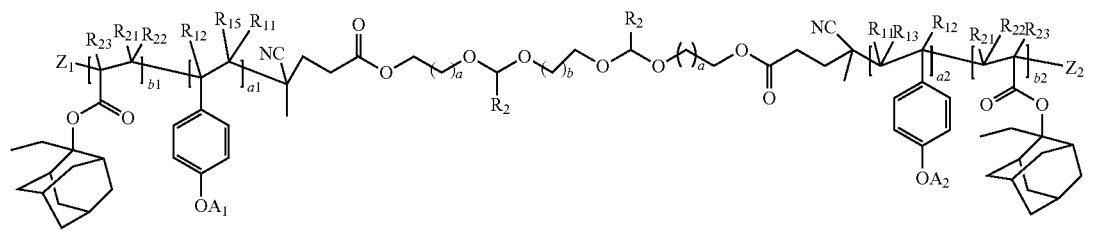

Formula 6 or

-continued

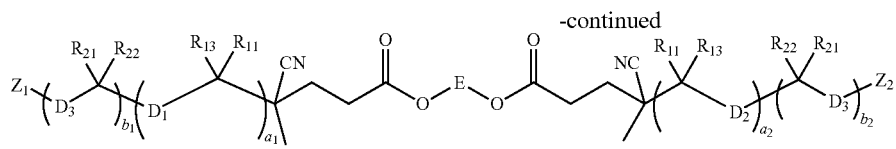

E is 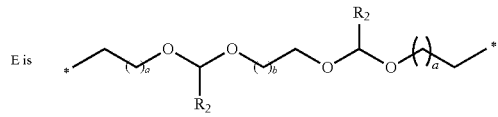

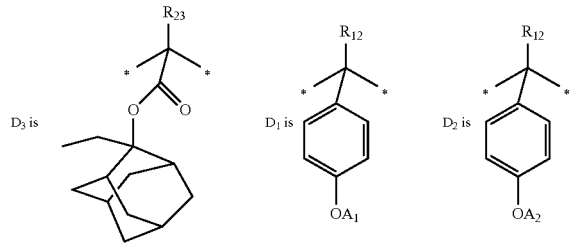

wherein, in Formula 6, $A_1$ and $A_2$ are each independently H, or —C(=O) $R_3$, wherein $R_3$ is a C1-C60 alkyl group, $Z_1$ and $Z_2$ are each independently —SH,

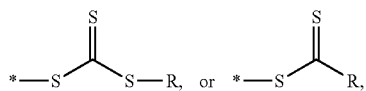

and * indicates a binding site,

R is a C1-C30 alkyl group, $R_2$ is a C1-C30 alkyl group, a and b are each independently 0 or an integer of 1 to 10, $R_{11}$, $R_{12}$, and $R_{13}$ are each independently hydrogen, a C1-30 alkyl group or a C6-C60 aryl group, $R_{21}$, $R_{22}$, and $R_{23}$ are each independently hydrogen or a C1-C60 alkyl group, and a1, b1, a2, and b2 are each independently a number from 1 to 10,000. In Formula 6, a case where a and b are 0 indicates a single bond.

In Formula 6, for example, $A_1$ and $A_2$ are —C(=O) $R_3$, wherein $R_3$ is a C1-C20 alkyl group, for example, a methyl group, an ethyl group, a propyl group, a butyl group, or a pentyl group.

For example, a1, b1, a2, and b2 are each independently a number from 1 to 1,000, a number from 1 to 100, a number from 1 to 50, a number from 2 to 50, or a number from 3 to 50.

In Formula 6, a1 and b1 may be the same as a2 and b2, respectively.

In Formula 6, a mixed molar ratio of a styrenic repeating unit and an acrylic repeating unit is, for example, 1:99 to 99:1, 1:9 to 9:1, 2:8 to 8:2, 6:4 to 4:6, or 5:5.

For example, the acetal-based prepolymer may be a compound represented by Formula 6-1.

Formula 6-1

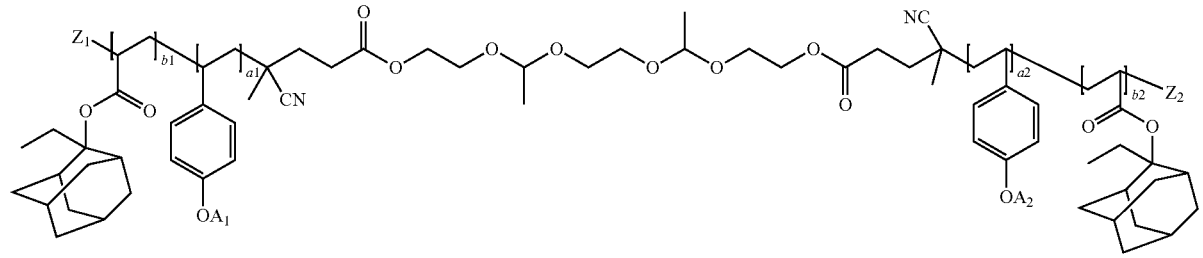

wherein, in Formula 6-1, $A_1$ and $A_2$ are each independently H or —C(=O) $R_3$, wherein $R_3$ is a C1-C60 alkyl group, $Z_1$ and $Z_2$ are each independently —SH,

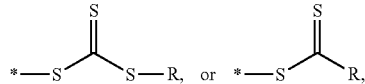

and * indicates a binding site,

R is a C1-C30 alkyl group, and a1, b1, a2, and b2 are each independently a number from 1 to 10,000, a number from 1 to 1,000, a number from 1 to 100, or a number from 1 to 50.

For example, the acetal-based prepolymer may be a compound represented by Formula 6-2, a compound represented by Formula 6-3, or a compound represented by Formula 6-4.

Formula 6-2

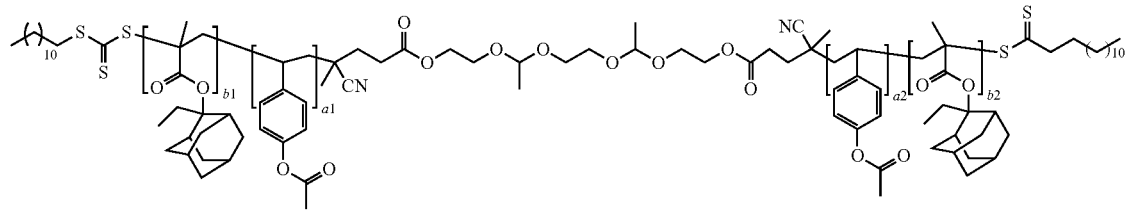

Formula 6-3

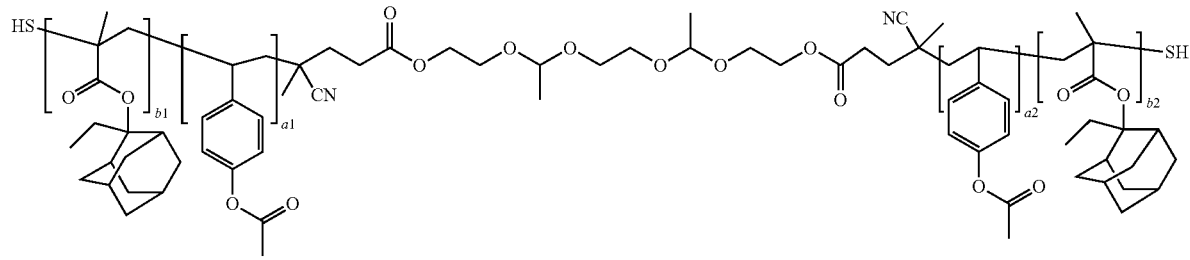

Formula 6-4

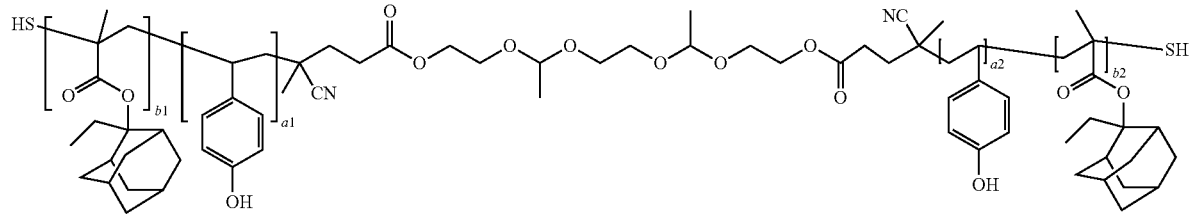

In Formulae 6-2 to 6-4, a1, b1, a2, and b2 are each independently a number from 1 to 10,000, a number from 1 to 1,000, a number from 1 to 100, a number from 1 to 50, a number from 2 to 50, a number from 3 to 50, or a number from 5 to 50.

The acetal-based prepolymers may each have a weight average molecular weight of about 1,500 g/mol to about 20,000 g/mol, about 1,800 g/mol to about 20,000 g/mol, about 2,000 g/mol to about 20,000 g/mol, or about 5,000 g/mol to about 20,000 g/mol. When the acetal-based prepolymer has a too-high weight average molecular weight, this is disadvantageous in developing a photoresist because the molecular weight is still too high even after decomposition by the photo-generated acid. When the acetal-based prepolymer has a too-low molecular weight, poor mechanical properties or performance may result.

The amount of the acetal-based compound, which is used to prepare an acetal-based prepolymer according to one or more embodiments, is stoichiometrically controlled to obtain an acetal-based prepolymer with a desired performance. The amount of the acetal-based compound may be 1 mole or greater, or 2 moles or greater, based on 1 mole of the acetal-based prepolymers. When the amount of the acetal-based compound is within these ranges, the molecular weight of the acetal-based polymer formed from the acetal-based prepolymer can be effectively reduced by acid treatment.

A mixed molar ratio of the first polymerizable monomer and the second polymerizable monomer may be 1:99 to 99:1, 1:9 to 9:1, 2:8 to 8:2, 6:4 to 4:6, or 5:5.

According to one or more embodiments, provided is an acetal-based polymer which is a chain extension reaction product of the acetal-based prepolymer described above and a chain extender.

The chain extender, which is a compound having reactive functional groups at both terminal ends of the acetal-based prepolymer, is used to extend the chain length of the acetal-based polymer. Non-limiting examples of the chain extender are a urethane-based compound that is a reaction product of a diol represented by Formula 7 and a diisocyanate represented by Formula 8, a compound represented by Formula 9, or a combination thereof.

Formula 7

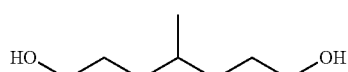

Formula 8

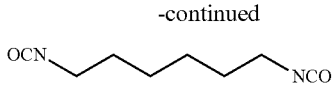

Formula 9

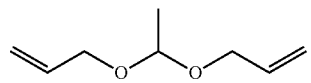

An amount of the chain extender may be about 0.5 moles to 2 moles based on 1 mole of the acetal-based prepolymer. When the amount of the chain extender is within this range, an acetal-based polymer of which the molecular weight can be effectively reduced by acid treatment can be prepared. The acetal-based polymer may include a first repeating unit of Formula 4-1 and a second repeating unit represented by Formula 5-1, as described above.

The acetal-based polymer may be, for example, an acetal-based polymer represented by Formula 10.

Formula 10

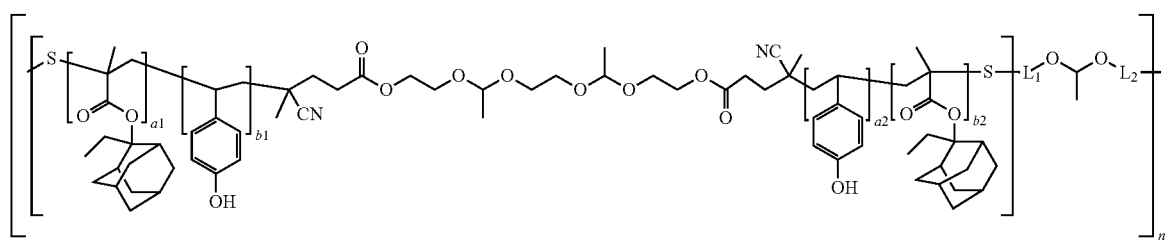

wherein, in Formula 10, $L_1$ and $L_2$ are linkers, $L_1$ is —C(=O)NH—(CH$_2$)$_{k1}$—NHC(=O)O—(CH$_2$)$_{k2}$— or —(CH$_2$—CH$_2$)$_{k3}$—, $L_2$ is —(CH$_2$)$_{k4}$—OC(=O)NH—(CH$_2$)$_{k5}$— or —(CH$_2$—CH$_2$)$_{k6}$—, $k_1$ to $k_6$ are each independently an integer of 1 to 10, a1, b1, a2, b2, and n indicates the degrees of polymerization, and are each independently a number from 1 to 10,000, a number from 1 to 1,000, a number from 1 to 100, a number from 2 to 100, or a number from 3 to 100.

A mixed molar ratio of the styrenic repeating unit and the methacrylic repeating unit may be 1:99 to 99:1, 1:9 to 9:1, 2:8 to 8:2, 6:4 to 4:6, or 5:5.

The acetal-based polymer may be a polymer represented by Formula 10-1 or a polymer represented by Formula 10-2.

Formula 10-1

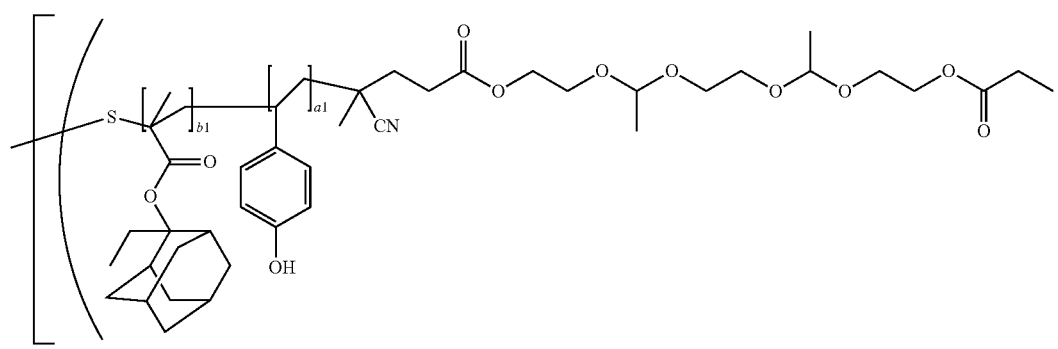

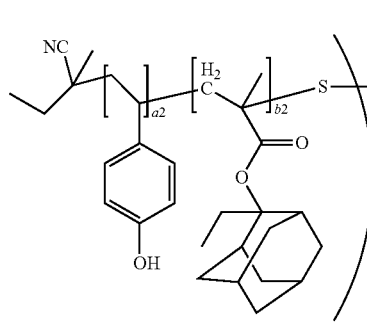
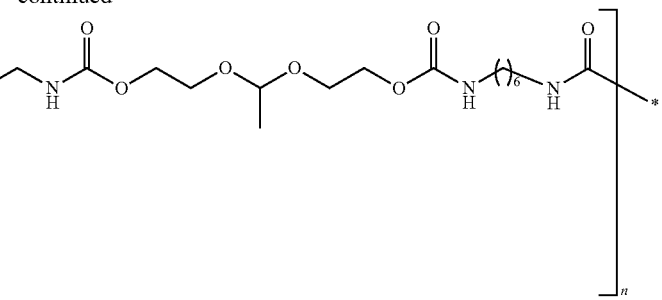

In Formula 10-1, a1, b1, a2, b2, and n are each independently a number from 1 to 10,000, a number from 1 to 100, a number from 2 to 100, or a number from 3 to 50.

In Formula 10-1, for example, n may be a number of 3 to 20.

A mixed molar ratio of the styrenic repeating unit and the methacrylic repeating unit may be 1:99 to 99:1, 1:9 to 9:1, 2:8 to 8:2, 6:4 to 4:6, or 5:5.

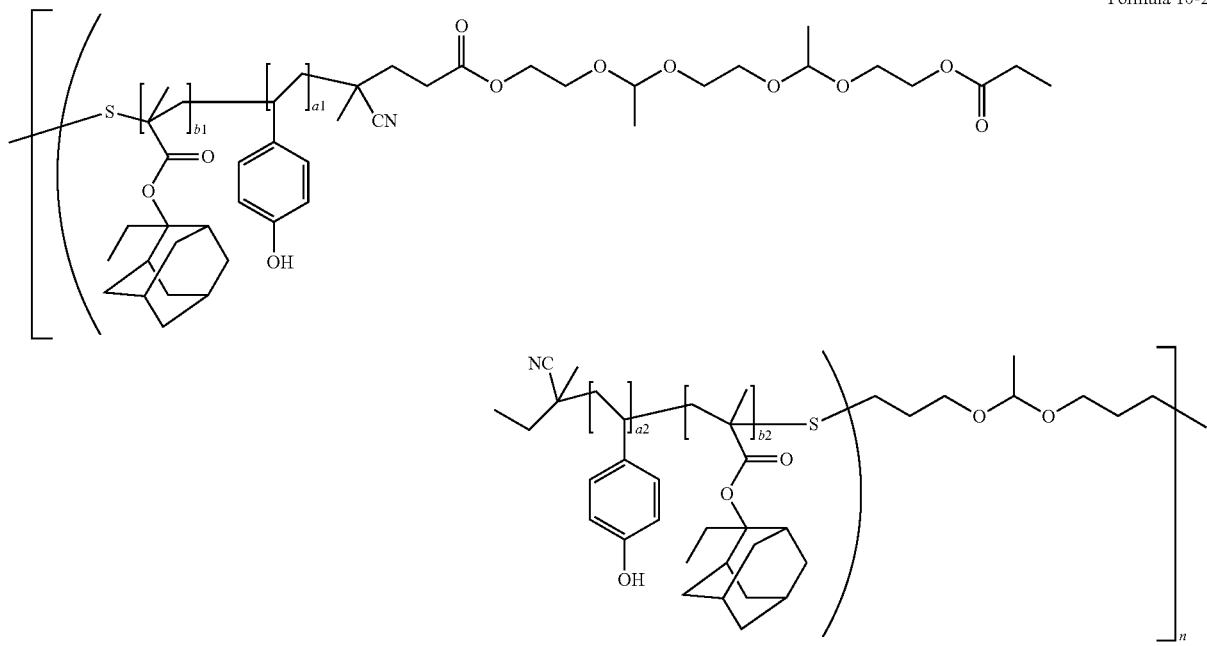

Formula 10-2

In Formula 10-2, a1, b1, a2, b2, and n indicate the degrees of polymerization, and are each independently are a number from 1 to 10,000.

a1, b1, a2, b2, and n are each independently a number from 1 to 1,000, a number from 1 to 100, a number from 2 to 100, a number from 3 to 50, or a number from 3 to 20.

A mixed molar ratio of the styrenic repeating unit and the methacrylic repeating unit may be 1:99 to 99:1, 1:9 to 9:1, 2:8 to 8:2, 6:4 to 4:6, or 5:5.

In one or more embodiments, the acetal-based polymer may have a weight average molecular weight of about 4,000 g/mol to about 20,000 g/mol and a polydispersity index (PDI) of about 1.2 to about 2.5. When the molecular weight and PDI of the acetal-based polymer are within these ranges, an effective molecular weight reduction by acid treatment is possible. Non-limiting examples of an acid are a perfluorobutane sulfonic acid, a triflic acid, or the like.

The acetal-based polymer may be a random copolymer, a block copolymer, an alternating copolymer, a graft copolymer, or a combination thereof, and for example, may be a random copolymer. The random copolymer can be easily synthesized without phase separation, compared to other copolymers, and can form a uniform thin film.

According to one or more embodiments, provided is a photoresist composition including a base polymer, a photoacid generator, and a solvent, wherein the base polymer includes the acetal-based polymer described above.

By including the acetal-based polymer according to the one or more embodiments described above, the photoresist composition can provide, even under a smaller dose light, excellent lithography characteristics in terms of exposure sensitivity, resolution, and the like, as well as an excellent pattern shape of a developed photoresist, e.g., a developed CAR.

An amount of the acetal-based polymer may be about 1 part by weight to about 25 parts by weight, about 3 parts by weight to 20 parts by weight, or about 5 parts by weight to about 20 parts by weight, on the basis of 100 parts by weight of the photoresist composition. When the amount of the acetal-based polymer is within these ranges, contrast may be additionally ensured by not only degradation by a photoacid generator, but also molecular weight reduction. In addition, an existing chemically amplified resist (CAR) structure can be introduced to improve contrast and ensure performance with a low dose of light.

Examples of the photoacid generator are triphenylsulfonium triflate, triphenylsulfonium antimonate, diethyliodonium triflate, diphenyliodonium antimonate, methoxydiphenyliodonium triflate, di-t-butyldiphenyliodonium triflate, 2,6-dinitrobenzyl sulfonate, pyrogallol tris(alkylsufonate), e.g., a pyrogallol tris((C1 to C8 alkyl) sulfonate), norbornene-dicarboxyimide triflate, triphenylsulfonium nonaflate, diphenyliodonium nonaflate, methoxydiphenyliodonium nonaflate, di-t-butyldiphenyliodonium nonaflate, N-hydroxysuccinimide nonaflate, norbornene dicarboximide nonaflate, triphenylsulfonium perfluorooctanesulfonate, diphenyliodonium perfluorooctanesulfonate, methoxydiphenyliodonium di-t-perfluorooctanesulfonate, butyldiphenyliodoniumperfluorooctanesulfonate, N-hydroxysuccinimide perfluorooctanesulfonate, norbornene dicarboximide perfluorooctanesulfonate, or the like. These materials may be used alone or in combination.

An amount of the photoacid generator may be about 15 parts to about 50 parts by weight on the basis of 100 parts by weight of the base polymer. When the amount of the photoacid generator is within this range, a glass transition temperature of the base polymer can be maintained without a reduction in light absorption rate due to less EUV photons, and no photoacid generator remains during a photolithography process by an EUV light source so that photoresist patterns formed from the photoresist composition may have improved resolution.

The photoresist composition may further include a photo-decomposable quencher (PDQ). Non-limiting examples of the photo-decomposable quencher may include a quencher represented by Formula 12.

Formula 12

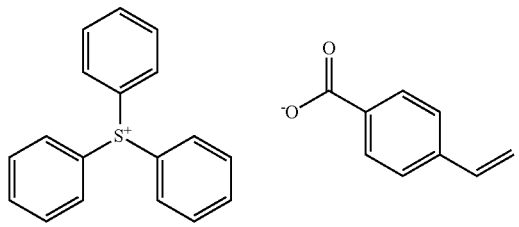

An amount of the photo-decomposable quencher in the photoresist composition may be about 0.1 part to about 20 parts by weight on the basis of 100 parts by weight of the base polymer.

In one or more embodiments, the solvent may include propylene glycol monoethyl ether acetate, polypropylene glycol monomethyl ether acetate, propylene glycol monomethyl ether, or a combination thereof. However, embodiments are not limited thereto, and any solvent available in the art may be used.

In addition, to improve adhesion to a substrate (for example, to improve the adhesion of the photoresist composition with a substrate), the photoresist composition may additionally include a silane coupling agent as an adhesion enhancer. The silane coupling agent may be, for example, vinyltrimethoxysilane, vinyltriethoxysilane, vinyl trichlorosilane, vinyl tris(β-methoxyethoxy) silane; 3-acryloxypropyltrimethoxysilane, 3-methacryloxypropyltrimethoxysilane,p-styryl trimethoxysilane, 3-methacryloxypropylmethyldimethoxysilane, 3-methacryloxypropylmethyldiethoxysilane; or a silane compound including an unsaturated carbon-carbon bond, such as trimethoxy [3-(phenylamino)propyl]silane. However, embodiments are not limited thereto.

A polymer decomposition product of the base polymer after acid treatment may have a weight average molecular weight of 3000 g/mol or less, for example, 2000 g/mol or less, 1000 g/mol or less, or about 850 g/mol to about 1000 g/mol, and have a PDI of 2.0 or less, 1.5 or less, or about 1.0 to about 1.5.

A method of forming a semiconductor pattern with the photoresist composition according to one or more embodiments will now be described.

The photoresist composition may not undergo a pattern collapse even when forming a pattern having a high aspect ratio. Accordingly, to form a micro-pattern having a width of, for example, 5 nm to 100 nm, 5 nm to 50 nm, or 5 nm to 20 nm, the photoresist composition may be used in a photoresist process using light of a wavelength of about 5 nm to about 150 nm, about 5 nm to about 80 nm, or about 5 nm to about 20 nm. Accordingly, using the photoresist composition according to one or more embodiments, it is possible to implement extreme ultraviolet lithography using a EUV light source of a wavelength of about 13.5 nm.

According to other embodiments, provided is a method of forming a pattern with the photoresist composition according to the one or more embodiments described above. For example, the formed pattern may be a photoresist pattern.

According to an embodiment, the pattern formation method may include: forming an etch target film on a substrate; applying the photoresist composition according to one or more embodiments described herein onto the etch target film to form a photoresist film; forming a photoresist pattern by patterning the photoresist film; and etching the etch target film with the photoresist pattern as an etch mask.

The method of forming a pattern with the photoresist composition according to one or more embodiments will be described with reference to FIGS. 8 to 12.

Figure 8:
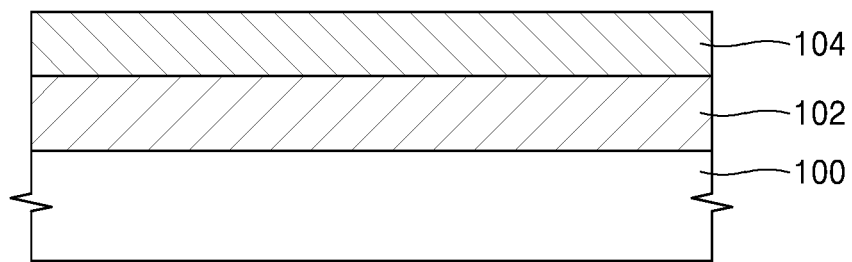
FIGS. 8 to 12 are views for explaining a pattern formation method using a photoresist composition according to an embodiment.

Referring to FIG. 8, an object to be etched (hereinafter, an etch target) is described. An example of the etch target may be a thin film 102 formed on a substrate 100. Hereinafter, following descriptions are limited to embodiments in which the thin film 102 is used as an etch target. To remove contaminants remaining on the thin film 102, the surface of the thin film 102 is cleaned. The thin film 102 may be, for example, a silicon nitride film, a polysilicon film, or a silicon oxide film. Subsequently, a lower-resist film composition for forming a lower resist film 104 is coated on the surface of the cleaned thin film 102. The coating may be carried out, for example, by spin coating, spray coating, dip coating, knife edge coating, or printing, for example, inkjet printing, screen printing, or the like.

Although the coating of the lower resist film may be omitted, embodiments of coating the lower resist film will be described below. Thereafter, a drying and baking process is performed to form the lower resist film 104 on the thin film 102. The baking treatment may be carried out at about 100° C. to about 500° C., for example, at about 100° C. to about 300° C.

Figure 9:
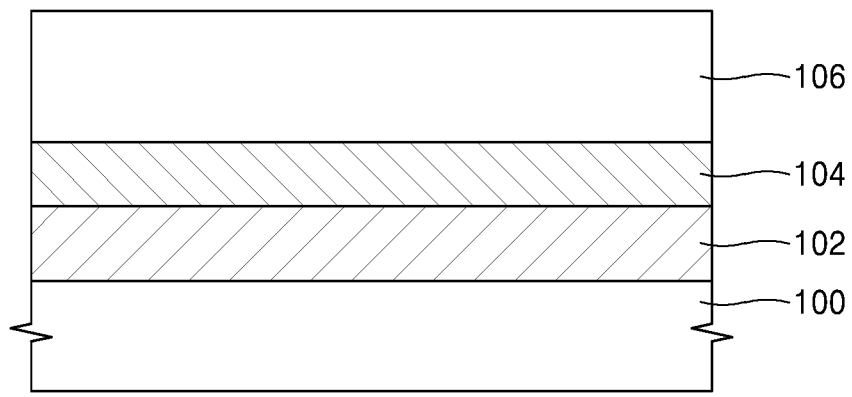

Referring to FIG. 9, the lower resist film 104 may be formed between the substrate 100 and the photoresist film 106 and prevent non-uniformity of photoresist linewidths and deterioration in pattern formability if irradiating radiation is reflected from an interface between the substrate 100 and the photoresist film 106 or an interlayer hard mask is scattered into unintended photoresist regions.

The photoresist composition described above is coated on the lower resist film 104 to form a photoresist film 106. The photoresist film 106 may have a cured form through a heat treatment process performed after the photoresist composition is coated on the thin film 102 on the substrate 100.

More particularly, the forming of a pattern with the photoresist composition according to one or more embodiments may include: coating the photoresist composition described above on the substrate 100 having the thin film 102 on a surface of the substrate 100, by spin coating, slit coating, inkjet printing, or the like; and drying the coated photoresist composition according to one or more embodiments to form the photoresist film 106. Subsequently, a first baking process of heating the substrate 100 having the photoresist film 106 formed thereon is carried out. The first baking process may be carried out at a temperature of about 80° C. to about 120° C.

Figure 10:
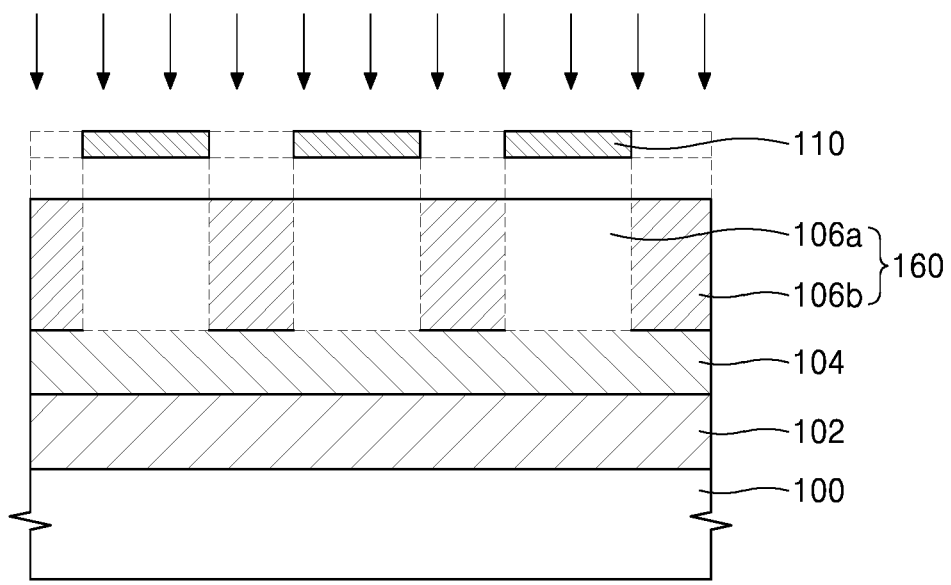

Referring to FIG. 10, the photoresist film 106 is subjected to a selective radiative exposure with the use of a photomask 110. Examples of light usable in the exposure process may be an activation radiation of light of a short wavelength, such as an i-line (a wavelength of 365 nm), a KrF excimer laser (a wavelength of 248 nm), an ArF excimer laser (a wavelength of 193 nm), light of a high-energy wavelength such as extreme ultraviolet (EUV, a wavelength of 13.5 nm), an E-beam (an electron beam), or the like. In one or more embodiments, the light for exposure may be light of a short wavelength in a wavelength range of 5 nm to 150 nm or may be light of a high-energy wavelength such as extreme ultraviolet (EUV, e.g., a wavelength of 13.5 nm), an E-beam (an electron beam), or the like.

An unexposed region 106a of the photoresist film 106 may have a different solubility from that of a non-exposed region 106b of the photoresist film 106, according to the polymer formation by cross-linking reaction. Subsequently, a second baking process is carried out on the substrate 100. The second baking process may be carried out at a temperature of about 90° C. to about 200° C. By the second baking process, the unexposed region 106a of the photoresist film 106 becomes insoluble in a developing solution.

Figure 11:
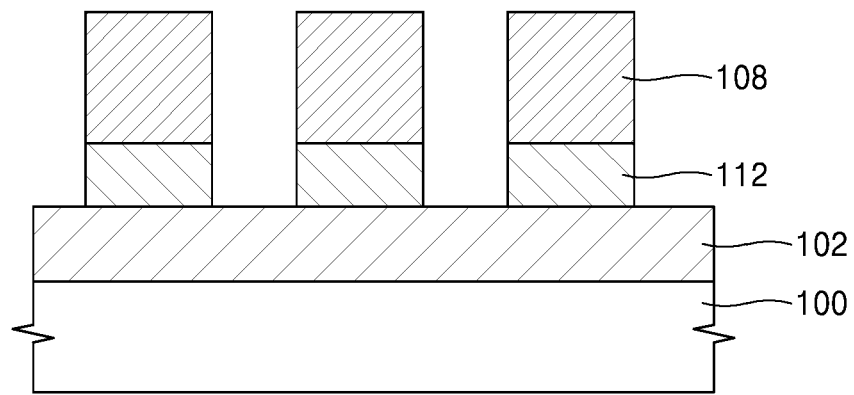

FIG. 11 shows a photoresist pattern 108 formed by removing the non-exposed region 106b of the photoresist film 106 by dissolving with a developing solution. In particular, after the non-exposed region 106b of the photoresist film 106 is dissolved and removed with an organic solvent such as 2-heptanone, the photoresist pattern 108 corresponding to a positive tone image is completed.

As described above, the developing solution in the pattern formation method according to the one or more embodiments may be an organic solvent. Examples of the organic solvent used in the pattern formation method according to one or more embodiments are ketones, such as methyl ethyl ketone, acetone, cyclohexanone, and 2-heptanone; alcohols such as 4-methyl-2-propanol, 1-butanol, isopropanol, 1-propanol, and methanol; esters, such as propylene glycol monomethyl ether acetate, ethyl acetate, ethyl lactate, n-butyl acetate, and butyrolactone; aromatic compounds, such as benzene, xylene, and toluene; or combinations thereof.

According to one or more embodiments, the photoresist pattern may be formed to have a positive tone image. In this case, the developer that can be used to form a positive tone image may be a quaternary ammonium hydroxide composition such as tetraethylammonium hydroxide, tetrapropylammonium hydroxide, tetrabutylammonium hydroxide, or a combination thereof.

In one or more embodiments, the photoresist pattern 108, which is formed by exposure with light of a short wavelength, such as an i-line (a wavelength of 365 nm), a KrF excimer laser (a wavelength of 248 nm), an ArF excimer laser (a wavelength of 193 nm), or light of high energy, such as extreme ultraviolet (EUV, a wavelength of 13.5 nm) or E-beam (electron beam) as well, may have a width of about 5 nm to about 100 nm. For example, the photoresist pattern 108 may be formed to have a width of about 5 nm to about 90 nm, about 5 nm to about 30 nm, about 10 nm to about 50 nm, or about 10 nm to about 20 nm.

The photoresist pattern 108 may have a half-pitch of about 50 nm or less, for example, 40 nm or less, for example, 30 nm or less, for example, 25 nm or less, and a linewidth roughness of about 10 nm or less or about 5 nm or less. Subsequently, the lower resist film 104 is etched using the photoresist pattern 108 as an etch mask. By the etching process as described above, an organic film pattern 112 is formed. The formed organic film pattern 112 may also have a width corresponding to the photoresist pattern 108.

Figure 12:
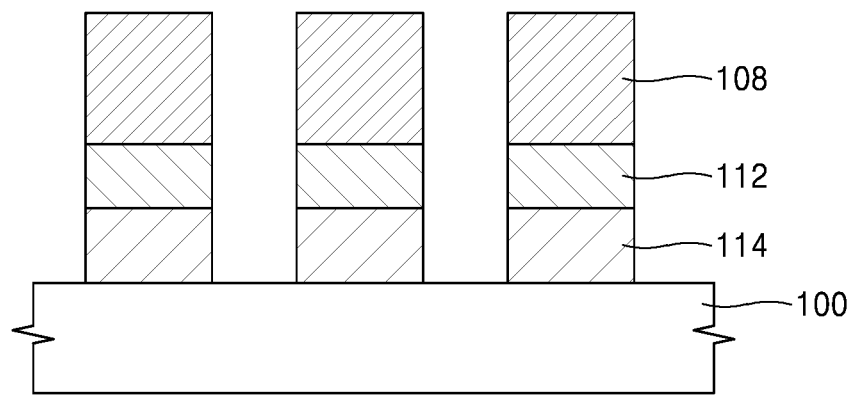

Referring to FIG. 12, an exposed region of the thin film 102 is etched with the photoresist pattern 108 as an etch mask. As a result, the thin film 102 is formed into a thin film pattern 114. For example, the thin film 102 may be etched by dry etching using an etching gas. For example, $CHF_3$, $CF_4$, $Cl_2$, $BCl_3$, and a combination thereof may be used as the etching gas.

In the exposure process performed previously, the thin film pattern 114 formed using the photoresist pattern 108 obtained by exposure with an EUV light source may have a width corresponding to the photoresist pattern 108. For example, the thin film pattern 114 may have a width of about 5 nm to 100 nm, same as the photoresist pattern 108. For example, the thin film pattern 114 formed by an exposure process with an EUV light source may have a width of about 5 nm to about 90 nm, about 5 nm to about 30 nm, about 10 nm to about 40 nm, or about 10 nm to about 20 nm, like the photoresist pattern 108. For example, the thin film pattern 114 may be formed to have a width of about 20 nm or less.

Photoresist patterns may have a deviation of a line edge from an ideal straight-line shape that should be formed. The degree of deviation of the first photoresist pattern edge from the ideal straight line that should be formed is referred to as line edge roughness (LER). The larger the value of line edge roughness, the greater the deviation of the first photoresist patterns from the straight-line shape.

In particular, when forming patterns of a very small dimension of about 20 nm to about 50 nm with EUV light, it is further hard to control the roughness characteristics. In addition, for patterns of a narrow line width, the pattern line width may have a very large uniformity difference according to the line width roughness, and thus, linewidth roughness characteristics may be very important.

The aliphatic ring group, heteroaliphatic ring group, aromatic ring group, and heteroaromatic ring group used in the formulae herein are defined as follows.

The aliphatic cyclic group may be a monocyclic or polycyclic aliphatic cyclic group. Examples of the monocyclic aliphatic ring group may include a cyclopentyl group, a cyclohexyl group, or a cyclooctyl group. Examples of the polycyclic aliphatic ring group may include a norbornyl group, a norbornenyl group, a tricyclodecanyl group, or a tetracyclodecanyl group. The hetero aliphatic cyclic group may be an aliphatic cyclic group including at least one hetero atom that is from N, O, P or S, as a ring element forming the aliphatic cyclic group, and including C as the remaining ring atoms.

The aromatic ring group may be a monocyclic or polycyclic aromatic ring group. Examples of the monocyclic aromatic ring group may include a benzene ring. Examples of the polycyclic aromatic ring group may include a naphthalene ring, a phenanthrene ring, an anthracene ring, or a fluorene ring. A heteroaromatic ring group may be an aromatic ring group including one or more hetero atoms that are N, O, P or S, as a ring element forming the aromatic ring group, and including C as the remaining ring atoms.

Unless otherwise defined throughout this specification, the definition of substituents used in the formulae is as follows.

A $C_1$-$C_{60}$ alkyl group herein refers to a monovalent linear or branched aliphatic hydrocarbon group of 1 to 60 carbon atoms. Specific examples thereof include a methyl group, ethyl group, n-propyl group, isopropyl group, n-butyl group, sec-butyl group, isobutyl group, tert-butyl group, n-pentyl group, tert-pentyl group, neopentyl group, isopentyl group, sec-pentyl group, 3-pentyl group, sec-isopentyl group, n-hexyl group, isohexyl group, sec-hexyl group, tert-hexyl group, n-heptyl group, isoheptyl group, sec-heptyl group, tert-heptyl group, n-octyl group, isooctyl group, sec-octyl group, tert-octyl group, n-nonyl group, isononyl group, sec-nonyl group, tert-nonyl group, n-decyl group, isodecyl group, sec-decyl group, tert-decyl group, or the like. A C1-C60 alkylene group herein refers to a divalent group having the same structure as the C1-C60 alkyl group.

A $C_2$-$C_{60}$ alkenyl group herein refers to a monovalent hydrocarbon group including one or more carbon-carbon double bonds in the middle or terminal of a $C_2$-$C_{60}$ alkyl group. Specific examples thereof include an ethenyl group, a propenyl group, a butenyl group, or the like. A $C_2$-$C_{60}$ alkenylene group herein refers to a divalent group having the same structure as the $C_2$-$C_{60}$ alkenyl group.

A $C_2$-$C_{60}$ alkynyl group herein refers to a monovalent hydrocarbon group including one or more carbon-carbon triple bonds in the middle or terminal of the, $C_2$-$C_{60}$ alkyl group. Specific examples thereof include an ethynyl group, a propynyl group, or the like. A $C_2$-$C_{60}$ alkynylene group herein refers to a divalent group having the same structure as the $C_2$-$C_{60}$ alkynyl group.

A $C_1$-$C_{60}$ alkoxy group herein refers to a monovalent group having the formula of —$OA_{101}$ (wherein $A_{101}$ is a $C_1$-$C_{60}$ alkyl group). Specific examples thereof include a methoxy group, an ethoxy group, an isopropyloxy group, or the like.

A $C_3$-$C_{10}$ cycloalkyl group herein refers to a monovalent saturated hydrocarbon cyclic group of 3 to 10 carbon atoms. Specific examples thereof include a cyclopropyl group, a cyclobutyl group, a cyclopentyl group, a cyclohexyl group, a cycloheptyl group, and a cyclooctyl group, an adamantanyl group, a norbornanyl group (or bicyclo[2.2.1] heptyl group), a bicyclo[1.1.1] pentyl group, a bicyclo[2.1.1] hexyl group, a bicyclo[2.2.2] octyl group, or the like. A $C_3$-$C_{10}$ cycloalkylene group herein refers to a divalent group having the same structure as the $C_3$-$C_{10}$ cycloalkyl group.

A $C_1$-$C_{10}$ heterocycloalkyl group herein refers to a monovalent cyclic group of 1 to 10 carbon atoms, which further includes at least one hetero atom as a ring-forming atom, in addition to carbon atoms. Specific examples thereof include a 1,2,3,4-oxatriazolidinyl group, a tetrahydrofuranyl group, a tetrahydrothiophenyl group, or the like. A $C_1$-$C_{10}$ heterocycloalkylene group herein refers to a divalent group having the same structure as the $C_1$-$C_{10}$ heterocycloalkyl group.

A $C_3$-$C_{10}$ cycloalkenyl group herein refers to a monovalent cyclic group of 3 to 10 carbon atoms, which has at least one carbon-carbon double bond in the ring but does not have aromaticity. Specific examples thereof include a cyclopentenyl group, a cyclohexenyl group, a cycloheptenyl group, or the like. A $C_3$-$C_{10}$ cycloalkenylene group herein refers to a divalent group having the same structure as the $C_3$-$C_{10}$ cycloalkenyl group.

A $C_1$-$C_{10}$ heterocycloalkenyl group herein refers to a monovalent cyclic group of 1 to 10 carbon atoms, which further includes at least one hetero atom as a ring-forming atom, in addition to carbon atom, and has at least one double bond in the ring. Specific examples of the $C_1$-$C_{10}$ heterocycloalkenyl group include a 4,5-dihydro-1,2,3,4-oxatriazolyl group, a 2,3-dihydrofuranyl group, a 2,3-dihydrothiophenyl group, or the like. A $C_1$-$C_{10}$ heterocycloalkenylene group herein refers to a divalent group having the same structure as the $C_1$-$C_{10}$ heterocycloalkenyl group.

A $C_6$-$C_{60}$ aryl group herein refers to a monovalent group having a carbocyclic aromatic system of 6 to 60 carbon atoms, and a $C_6$-$C_{60}$ arylene group herein refers to a divalent group having a carbocyclic aromatic system of 6 to 60 carbon atoms. Specific examples of the $C_6$-$C_{60}$ aryl group include a phenyl group, a pentalenyl group, a naphthyl group, an azulenyl group, an indacenyl group, an acenaphthyl group, a phenalenyl group, a phenanthrenyl group, an anthracenyl group, a fluoranthenyl group, a triphenylenyl group, a pyrenyl group, a chrysenyl group, a perylenyl group, a pentaphenyl group, a heptalenyl group, a naphthacenyl group, a picenyl group, a hexacenyl group, a pentacenyl group, a rubycenyl group, a coronenyl group, an ovalenyl group, or the like. When the $C_6$-$C^{60}$ aryl group and the $C_6$-$C_{60}$ arylene group include two or more rings, the two or more rings may be fused with each other.

A $C_1$-$C_{60}$ heteroaryl group herein refers to a monovalent group having a heterocyclic aromatic system of 1 to 60 carbon atoms, which further include at least one hetero atom as a ring-forming atom, in addition to carbon atoms. A $C_1$-$C_{60}$ heteroarylene group herein refers to a divalent group having a heterocyclic aromatic system of 1 to 60 carbon atoms, which further includes at least one hetero atom as a ring-forming atom, in addition to carbon atoms. Specific examples of the $C_1$-$C_{60}$ heteroaryl group include a pyridinyl group, a pyrimidinyl group, a pyrazinyl group, a pyridazinyl group, a triazinyl group, a quinolinyl group, a benzoquinolinyl group, an isoquinolinyl group, a benzoisoquinolinyl group, a quinoxalinyl group, a benzoquinoxalinyl group, a quinazolinyl group, a benzoquinazolinyl group, a cinolinyl group, a phenanthrolinyl group, a phthalazinyl group, a naphthyridinyl group, or the like. When the $C_1$-$C_{60}$ heteroaryl group and the $C_1$-$C_{60}$ heteroarylene group include two or more rings, the two or more rings may be fused with each other.

A monovalent non-aromatic condensed polycyclic group herein refers to a monovalent group (of, for example, 8 to 60 carbon atoms) having non-aromaticity as the entirety of molecules, which includes at least two rings fused each other and includes only carbons as ring-forming atoms. Specific examples of the monovalent non-aromatic condensed polycyclic group include an indenyl group, a fluorenyl group, a spiro-bifluorenyl group, a benzofluorenyl group, an indenophenanthrenyl group, an indenoanthracenyl group, or the like. A divalent non-aromatic condensed polycyclic group herein refers to a divalent group having the same structure as the monovalent non-aromatic condensed polycyclic group.

A monovalent non-aromatic condensed heteropolycyclic group herein refers to a monovalent group (of, for example, 1 to 60 carbon atoms) having non-aromaticity as the entirety of molecules, which at least two rings fused each other and further include at least one hetero atom, in addition to carbon atoms. Specific examples of the monovalent non-aromatic condensed heteropolycyclic group include an indolyl group, a benzoindolyl group, a naphthoindolyl group, an isoindoleyl group, a benzoisoindolyl group, an naphthoisoindolyl group, a benzosilolyl group, a benzothiophenyl group, a benzofuranyl group, a carbazolyl group, a dibenzosilolyl group, a dibenzothiophenyl group, a dibenzofuranyl group, an azacarbazolyl group, an azafluorenyl group, an azadibenzosilolyl group, an azadibenzothiophenyl group, an azadibenzofuranyl group, a benzopyrazolyl group, a benzoimidazolyl group, a benzoxazolyl group, a benzothiazolyl group, a benzoxadiazolyl group, a benzothiadiazolyl group, an imidazopyridinyl group, an imidazopyrimidinyl group, an imidazotriazinyl group, an imidazopyrazinyl group, an imidazopyridazinyl group, an indenocarbazolyl group, an indolocarbazolyl group, a benzofurocarbazolyl group, a benzothienocarbazolyl group, a benzosilolocarbazolyl group, a benzoindolocarbazolyl group, a benzocarbazolyl group, a benzonaphthofuranyl group, a benzonaphthothiophenyl group, a benzonaphthosilolyl group, a benzofurodibenzofuranyl group, a benzofurodibenzothiophenyl group, a benzothienodibenzothiophenyl group, or the like. A divalent non-aromatic condensed heteropolycyclic group herein refers to a divalent group having the same structure as the monovalent non-aromatic condensed heteropolycyclic group described above.

A $C_6$-$C_{60}$ aryloxy group herein refers to -$OA_{102}$ (wherein $A_{102}$ is a $C_6$-$C_{60}$ aryl group described above), and a $C_6$-$C_{60}$ arylthio group herein refers to -$SA_{103}$ (wherein $A_{103}$ is a $C_6$-$C_{60}$ aryl group described above).

A $C_7$-$C_{60}$ arylalkyl group herein refers to -$A_{104}A_{105}$ (wherein $A_{104}$ is a $C_1$-$C_{54}$ alkylene group and $A_{105}$ is a $C_6$-$C_{59}$ aryl group), and a $C_2$-$C_{60}$ heteroarylalkyl group herein refers to -$A_{106}A_{107}$ (wherein $A_{106}$ is a $C_1$-$C_{59}$ alkylene group and $A_{107}$ is a $C_1$-$C_{59}$ heteroaryl group).

A hetero atom herein refers to any atom except a carbon atom. Examples of the hetero atom include O, S, N, P, Si, B, Ge, Se, or any combination thereof.

One or more embodiments of the present disclosure will now be described in detail with reference to the following examples and comparative examples. However, these examples are only for illustrative purposes and are not intended to limit the scope of the one or more embodiments of the present disclosure.

Preparation of Acetal-Based Compound

Example 1. Synthesis of Chain Transfer Agent Having Vinyl Ether Group as Terminal Group Reaction Scheme 1

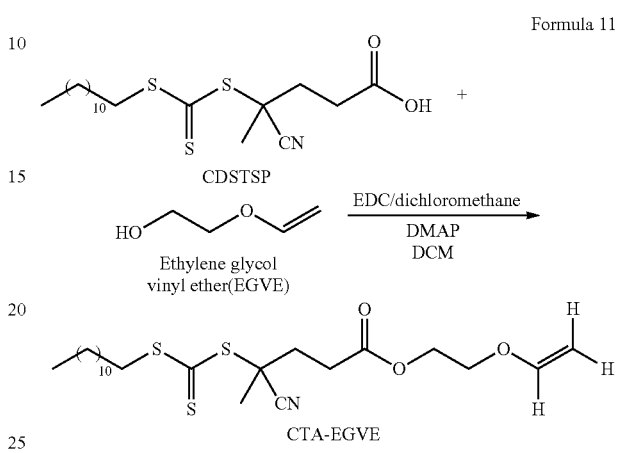

In Scheme 1, EDC" is an abbreviation for "1-ethyl-3-(3-dimethylaminopropyl) carbodiimide.

5 g of 4-cyano-4 (dodecyl sulfanyl thiocarbonyl) sulfanyl pentanoic acid (CDSTSP) as a source material, was added to a 250-ml round-bottomed flask and completely dissolved with 50 milliliters (ml) of dichloromethane (DCM). The flask was placed into a water bath containing ice and acetone and then stirred for 5 minutes.

83.2 mg of 4-dimethylaminopyridine (DMAP) was added to the flask and compound on the flask wall was washed off with 20 ml of dichloromethane. 2.6 g of 1-ethyl-3-(3-dimethylaminopropyl) carbodiimide (EDC) and 20 ml of dichloromethane were further added to the flask and stirred for 10 minutes. 1.38 g of ethylene glycol vinyl ether (EGVE) was added dropwise to the reaction mixture and stirred.

The reaction mixture was stirred in an ice bath for 30 minutes or longer, and then at room temperature (25° C.). After the reaction mixture was stirred for 24 hours at room temperature, the reaction solution was added to a 500-ml separatory funnel. 150 ml of dichloromethane was then added to the separatory funnel, and the organic mixture was extracted with an aqueous sodium bicarbonate solution. The aqueous sodium bicarbonate extraction process were repeated 4 times.

To the organic layer from the extraction, sodium sulfate was added to remove the remaining water from the organic layer. The solvent (dichloromethane) was removed with a rotary evaporator, and the remaining solvent was completely removed with a vacuum pump to yield 5.6 g of a product (CTA-EGVE) of Formula 11. This product was analyzed using a nuclear magnetic resonance (NMR) spectroscope to identify the structure of the product.

Formula 11

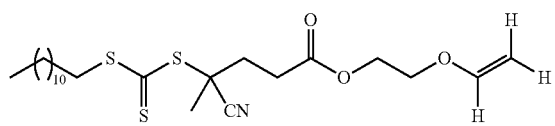

The structure of the product (CTA-EGVE) can be confirmed from the NMR analysis result of FIG. 1. The $^1$H-NMR spectrum of FIG. 1 was obtained using CDCl$_3$ as a measurement solvent. The labels indicated below are used to assign the hydrogen peaks in the $^1$H-NMR spectrum.

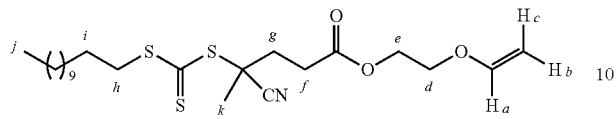

Synthesis of Chain Transfer Agent Having Acetal Group

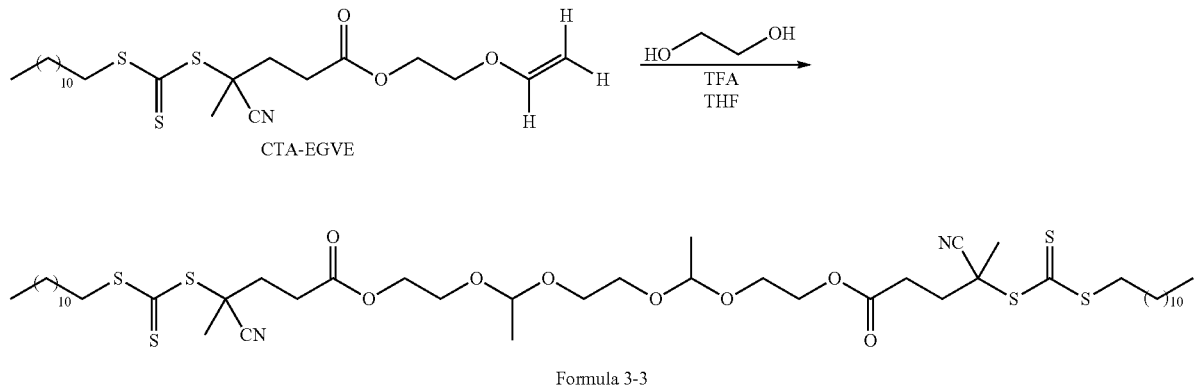

Using the compound of Formula 11, the chain transfer agent having a vinyl ether terminal group that was obtained according to the processes described above, ethylene glycol and an acid, a compound of Formula 3-3, a chain transfer agent having an acetal group (hereinafter, acetal-chain transfer agent (ACT-CTA)), was synthesized as follows.

4.7 g of the compound of Formula 11, the chain transfer agent having a vinyl ether terminal group obtained according to the processes described above, was added to a 25-ml round-bottom flask and completely dissolved with 10 ml of anhydrous tetrahydrofuran (THF). The reaction flask was added into a water bath containing ice and acetone and the reaction mixture stirred for 5 minutes. Then, 0.31 g of ethylene glycol was added to the flask and continuously stirred to prepare a mixture in which the chain transfer agent was dissolved.

Separately, 0.17 g of trifluoroacetic acid (TFA) was added to 1 mL of anhydrous tetrahydrofuran that was previously cooled in an ice bath. The trifluoroacetic acid/THF mixture was also cooled in an ice bath, and then added dropwise to the mixture in which the chain transfer agent was dissolved. The reaction mixture was stirred at 0° C. for 30 minutes or more, then the ice bath was removed and the reaction mixture allowed to warm to room temperature (25° C.) and stirred.

After the stirring for 24 hours at 25° C., the reaction flask was placed in an ice bath to lower the internal temperature of the reaction mixture so as to terminate the reaction. 0.5 mL to 1 mL of triethylamine in excess was dissolved in 1 mL of anhydrous tetrahydrofuran in a 5 mL vial to obtain a mixture, and the vial placed in an ice bath. The cooled triethylamine solution was slowly added to the reaction flask at 0° C. for 10 minutes or more. The solvent was removed using a rotary evaporator, and the remaining solvent was completely removed using a vacuum pump. The resulting product mixture was dissolved with 20 mL of dichloromethane and added to a 500-mL separatory funnel, and an additional 150 mL of dichloromethane was added to the funnel. The organic product was extracted four-times aqueous sodium hydrogen carbonate solution. The organic layer was collected and sodium sulfate was added to remove the remaining water. Then, the solvent was removed with a rotary evaporator, and the remaining solvent was completely removed with a vacuum pump. A solid slowly formed at room temperature and recrystallized. The solid was filtered off with diethyl ether, followed by removing the solvent from the obtained solution using a rotary evaporator to yield 5.7 g of the compound of Formula 3-3.

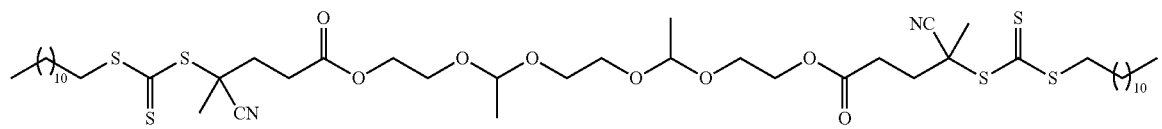

Formula 3-3

The compound of Formula 3-3 was analyzed using a nuclear magnetic resonance spectroscope. The analysis results are shown in FIG. 2 with the label "a" indicating the acetal hydrogen in the $^1$H-NMR spectrum.

Figure 2:
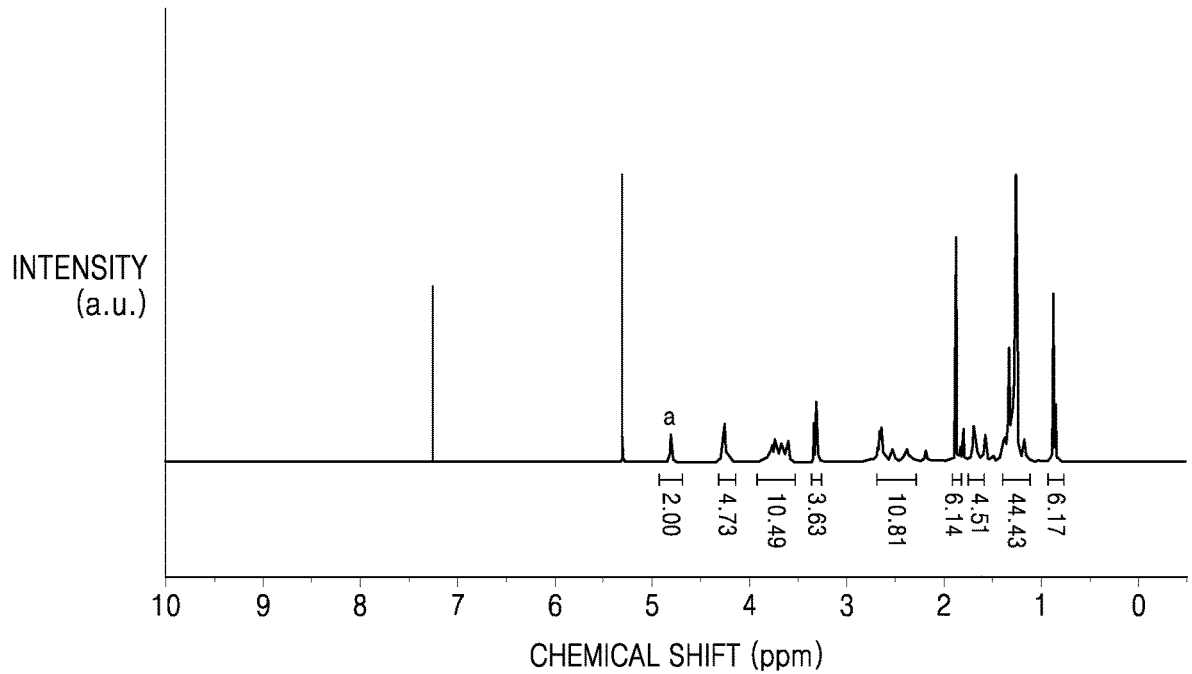
FIG. 2 shows a $^1$H-NMR spectrum of a chain transfer agent having an acetal group, which is prepared according to Example 1.

In the $^1$H NMR spectra of FIG. 2, CDCl$_3$ was used as a measurement solvent.

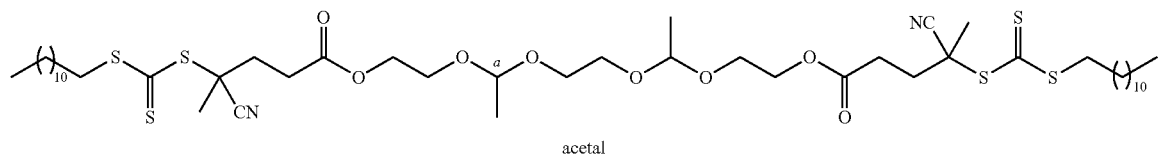

acetal

15

Example 2. Polymerization of Acetal-Based Prepolymer with Acetal-Based Compound)

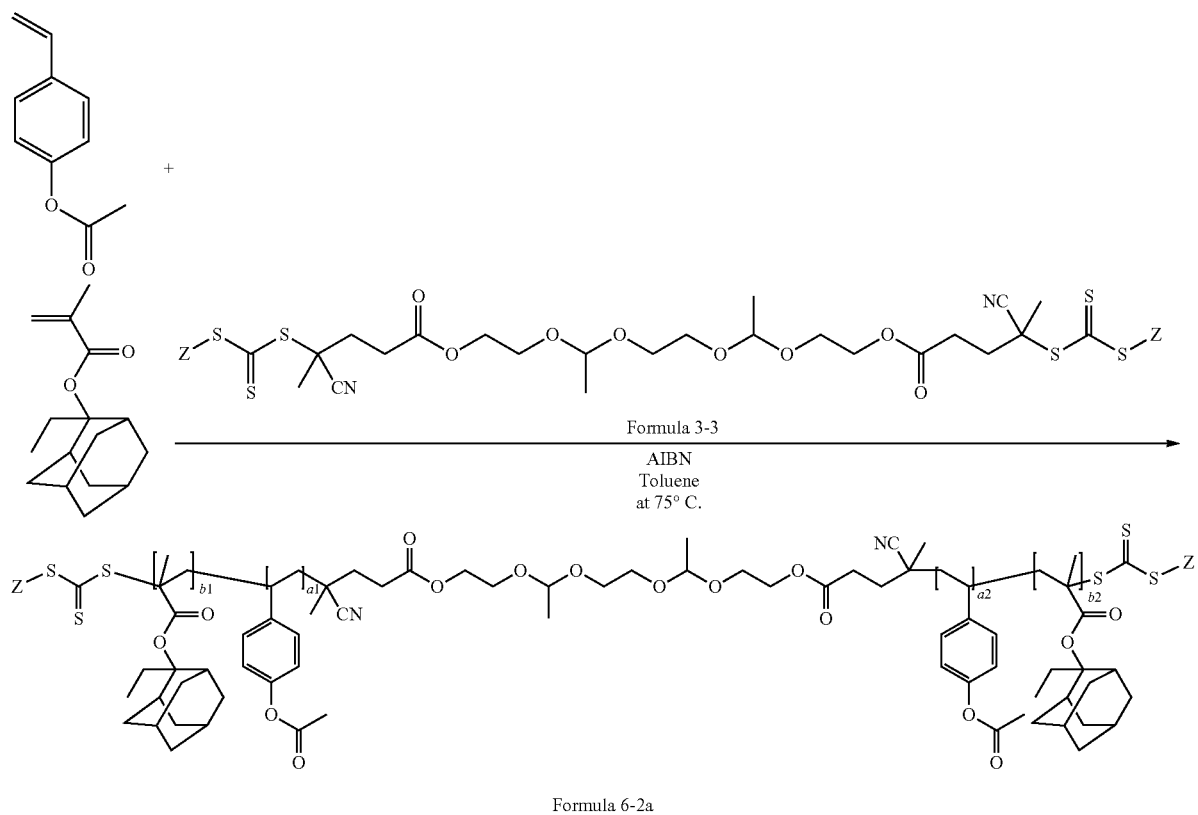

In Formula 6-2a, Z was CH$_3$(CH$_2$)$_{11}$—, and a1, b1, a2, and b2 were controlled so that the prepolymer of Formula 6-2a has a weight average molecular weight of 1.864 g/mol. a1 and b1 may be selected to be the same as a2 and b2, respectively, a mixing molar ratio of the styrene-based repeating unit and methacrylic repeating unit may be 1:1.

First, a reaction inhibitor was removed from 4-acetoxystyrene using aluminum oxide to obtain purified 4-acetoxy styrene. Then, 9.5 g of purified 4-acetoxy styrene and 9.7 g of 2-ethyl-2-methacryloxyadamantane were added into a 50-mL Schlenk flask containing a magnetic stirrer to prepare a mixture.

5.5 g of the compound of Formula 3-3, as an acetal-chain transfer agent, was added into a 20-mL vial and completely dissolved with 7 g of toluene to prepare solution 1. 0.45 g of azobisisobutyronitrile (AIBN) as a thermal initiator was added to a 5 mL vial and completely dissolved with 1 g of toluene to prepare solution 2. Then, after solution 1 and solution 2 were added to the mixture in the reaction flask, gas was removed through three freeze-pump-thaw cycles. Subsequently, copolymerization was performed at 75° C.

After completion of the copolymerization reaction, the reaction solution was cooled down to room temperature and exposed to the air. The resulting solution was diluted with tetrahydrofuran, and methanol was added to facilitate precipitation of a solid. The resulting yellow solid was collected by vacuum filtration and dried in a vacuum oven to yield 18.5 g of acetal-based prepolymer of Formula 6-2.

Formula 6-2

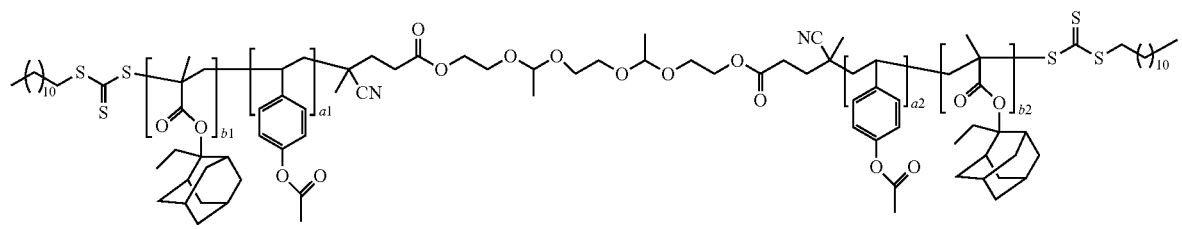

In Formula 6-2, a mixing molar ratio of styrenic repeating units and methacrylic repeating units was 1:1, and the degrees of polymerization a1, b1, a2, and b2 were controlled so that the polymer of Formula 6-2 had a weight average molecular weight of 1,864 g/mol. In this case, a1 is the same as a2, and b1 is the same as b2.

Figure 3:
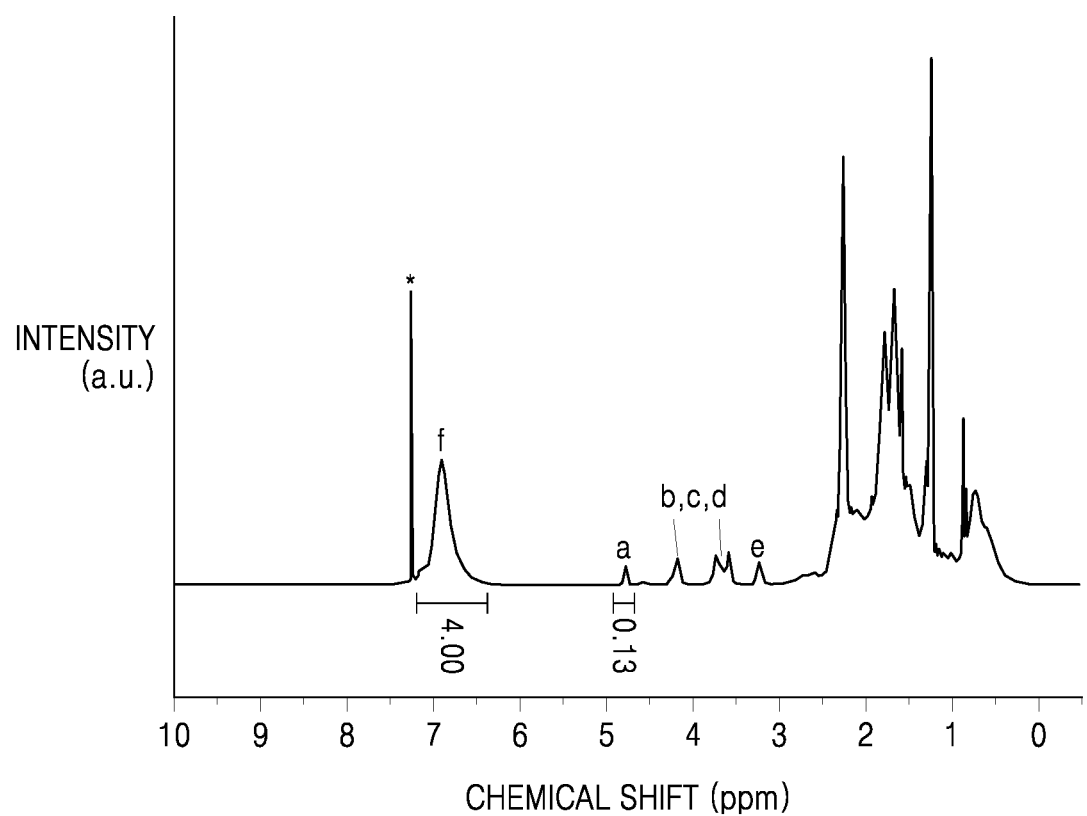
FIG. 3 shows a $^1$H-NMR spectrum of an acetal-based prepolymer prepared according to Example 2.

The compositions, molecular weights, and degrees of dispersion of the synthesized prepolymer samples were analyzed using a nuclear magnetic resonance spectroscopy and gel permeation chromatography. The structure of the product was confirmed from the NMR analysis result of FIG. 3. In $^1$H NMR spectrum analysis, CDCl$_3$ was used as a measurement solvent. Again, the labels below are used to assign the hydrogen peaks in the $^1$H-NMR spectrum with "f" indicates the styrenic aromatic hydrogens.

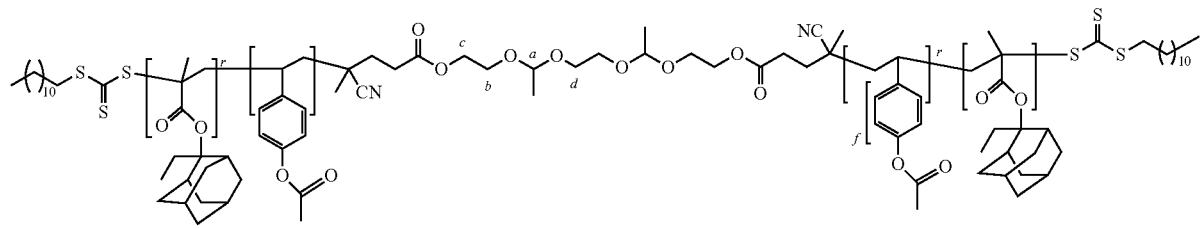

Both terminal groups of the acetal-based prepolymer of Formula 6-2 were substituted with thiol groups to prepare a prepolymer of Formula 6-3 as follows.

Formula 6-3

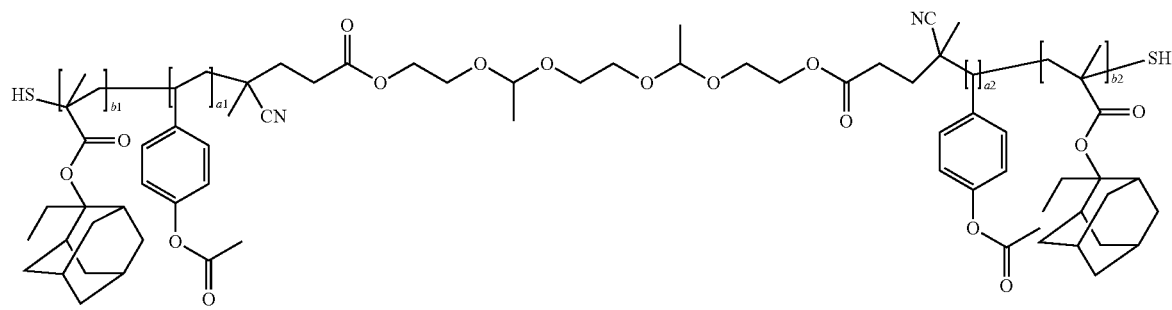

In Formula 6-3, a mixing molar ratio of styrenic repeating units and methacrylic repeating units was 1:1, and the degrees of polymerization a1, b1, a2, and b2 were controlled so that the acetal-based prepolymer of Formula 6-3 had a weight average molecular weight of 1,810 g/mol. In this case, a1 is the same as a2, and b1 is the same as b2.

5 g of the acetal-based prepolymer of Formula 6-2 was completely dissolved in 62 mL of anhydrous tetrahydrofuran, and then 0.88 g of n-butylamine and 0.3 g of tributylphosphine were added to the flask and the mixture stirred at room temperature for 24 hours. The solution was concentrated using a rotary evaporator, and after precipitation with excess hexane, the solid was collected by vacuum filtration and dried in a vacuum oven to prepare the acetal-based prepolymer of Formula 6-3.

The compositions, molecular weights, and degrees of dispersion of the synthesized prepolymer samples were analyzed using a nuclear magnetic resonance spectroscopy and gel permeation chromatography. The structure of the product of Formula 6-2 was confirmed from the NMR analysis result of FIG. 3. In $^1$H NMR spectrum analysis, CDCl$_3$ was used as a measurement solvent.

Synthesis of Chain Extension Agent

Example 3

1 g of allyl alcohol and 0.041 g of pyridinium para-toluenesulfonic acid were completely dissolved in 7 mL of dichloromethane in a flask. This flask was placed in an ice bath and the mixture was stirred. 1.38 g of allyl vinyl ether dissolved in 1 ml of dichloromethane was added to the flask, and the reaction mixture stirred at 0° C. for 30 minutes or more, and then stirred at room temperature for 14 hours. Potassium carbonate was added to the reaction mixture to terminate the reaction. The reaction solution was passed through Celite using a glass-frit filter, and then extracted with distilled water.

Sodium sulfate was added to the extracted product, and after removal of water, dichloromethane was removed using a rotary evaporator. The resulting product was purified by column chromatography using hexane and ethyl acetate as eluents. At this time, to protect the acetal group, triethylamine was added to the eluents, thereby to yield 1.5 g of compound of Formula 9. The structure of this compound was analyzed using a nuclear magnetic resonance spectroscope.

Formula 9

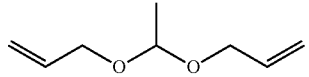

Polymerization of Acetal-Based Polymer by Stepwise Growth Polymerization Using Acetal-Chain Transfer Agent and Chain Extender

Example 4. Stepwise Growth Polymerization of Thiol-Vinyl Crosslinking Agent)

In accordance with Reaction Scheme 5, 0.2 g of the prepolymer of Formula 6-3, synthesized in Example 2, was added to a 10-mL round-bottom flask and completely dissolved with 1 mL of anhydrous tetrahydrofuran. Then, 4.7 mg of 2,2-dimethoxy-2-phenylacetophenone as a photoinitiator was added, and 13.1 mL of the compound of Formula 9 as a chain extender, prepared according to Example 3, was added to the flask.

Figure 4:
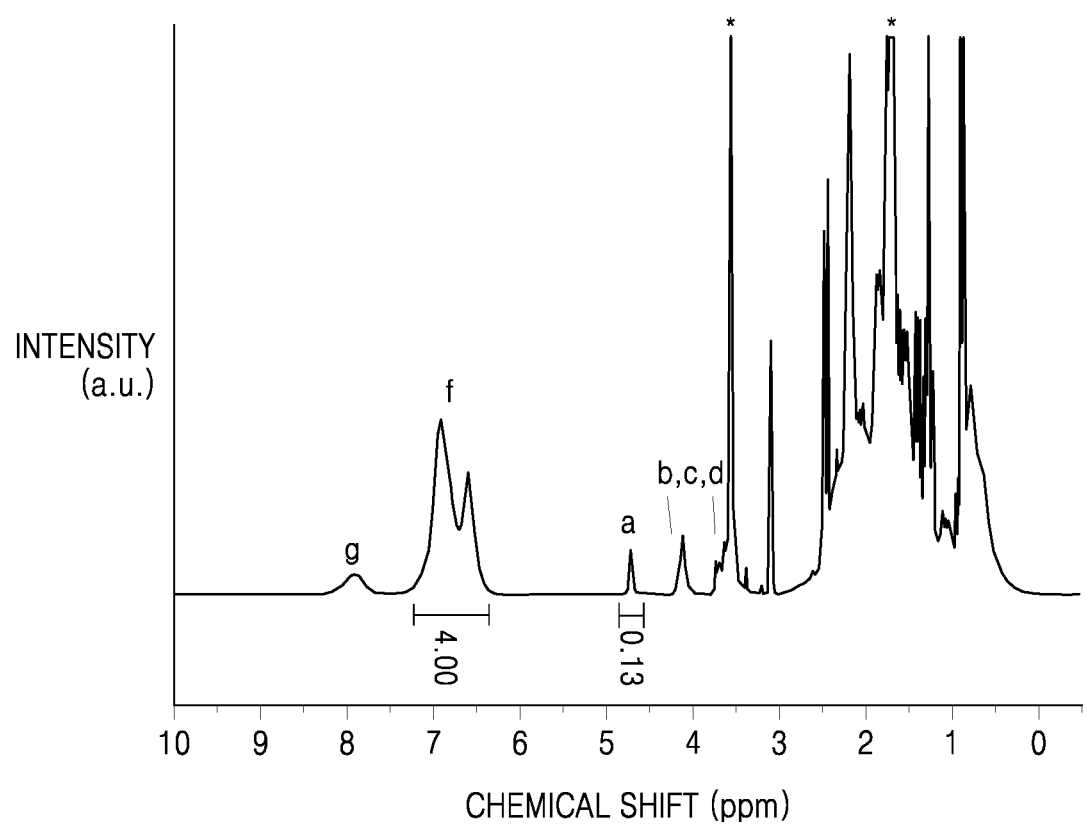
FIG. 4 shows a $^1$H-NMR spectrum of an acetal-based prepolymer prepared according to Example 4.

The flask containing the reactants was irradiated with a 365-nm UV lamp for 2 hours. Then, the resulting solution was added to hexane to facilitate precipitation. The precipitated acetal-based prepolymer was dried in a vacuum oven. The structure of the acetal-based prepolymer can be identified from FIG. 4. The labels indicated below are used to assign the hydrogen peaks in the $^1$H-NMR spectrum.

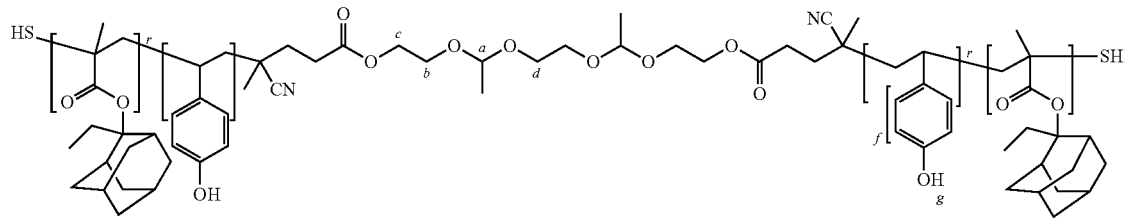

Thereafter, 0.5 g of acetal-based prepolymer and 10 ml of methanol were added to a 100-ml round-bottom flask, a 28% ammonia aqueous solution (70 equivalents per a mole of 4-acetoxystyrene) was added to the flask. After stirring at room temperature for 24 hours, the solvent was removed using a rotary evaporator. The resulting product was dissolved with tetrahydrofuran, then precipitated with water, filtered under vacuum for recovery, followed by drying to yield a random copolymer of Formula 10-1, an acetal-based polymer. The molecular weight and dispersity of the product were analyzed by gel permeation chromatography.

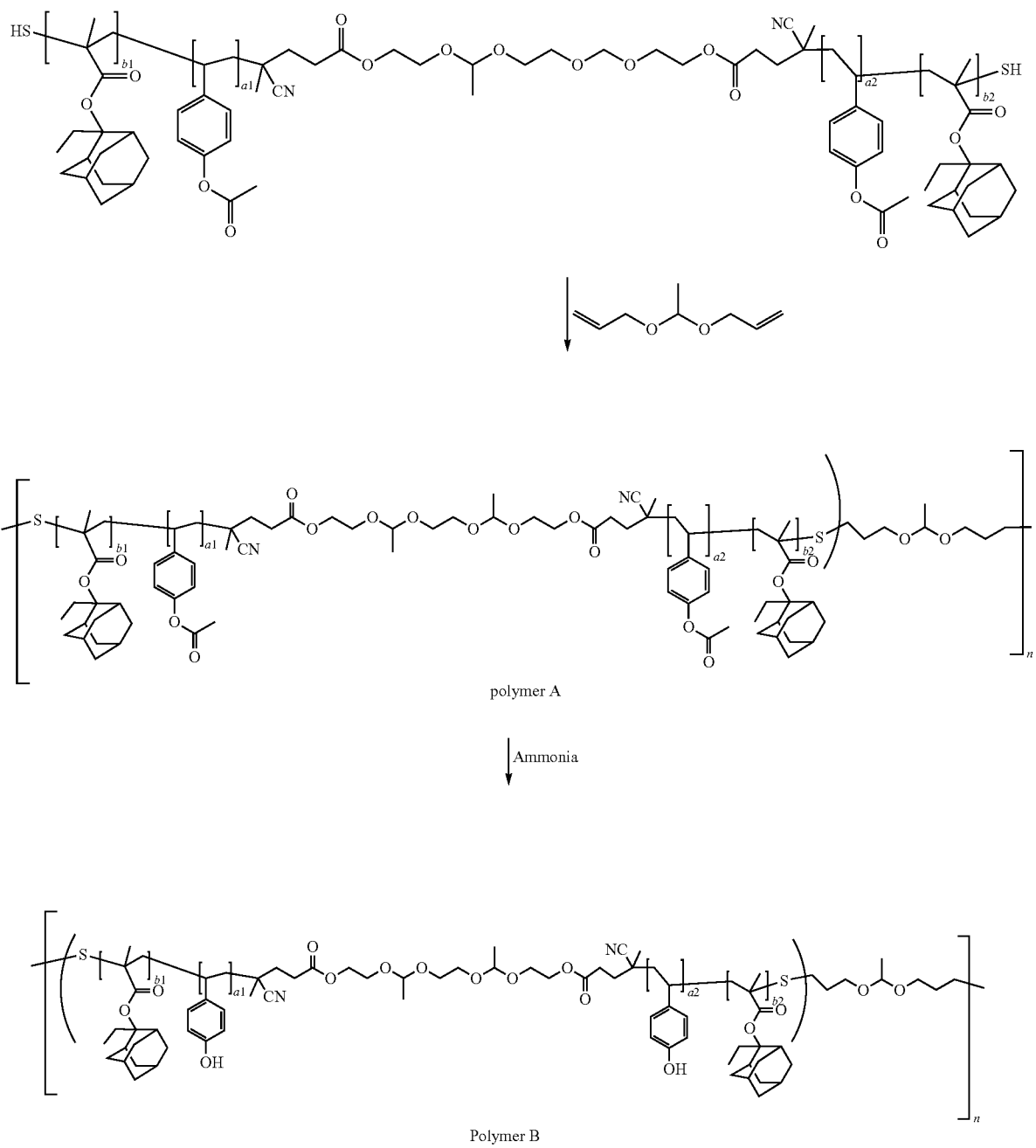

Reaction Scheme 5

In Reaction Scheme 5, a1, b1, a2, b2, and n in the acetal-based polymer (Polymer A) were adjusted so that the Polymer A has a weight average molecular weight of about 5,360 g/mol, and a1, b1, a2, b2, and n in the acetal-based polymer (Polymer B) were adjusted so that the Polymer bhas a weight average molecular weight of about 5,500 g/mol. A mixing molar ratio of styrenic repeating units and methacrylic repeating units in the acetal-based polymers (Polymer A & Polymer B) was 1:1. In the formulae above, a1 is the same as a2, and b1 is the same as b2.

Example 5. Preparation of Acetal-Based Polymer

Reaction Scheme 6

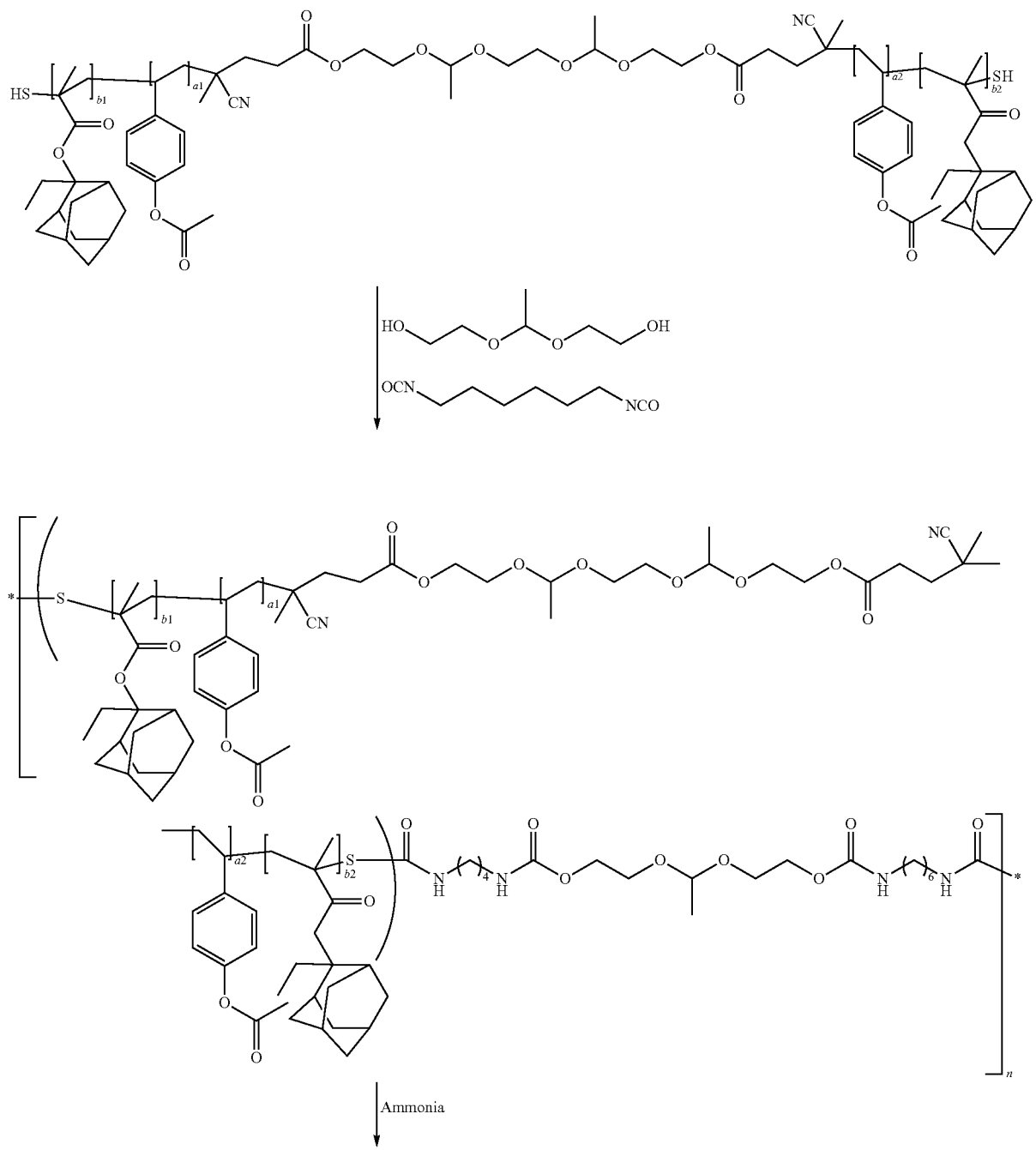

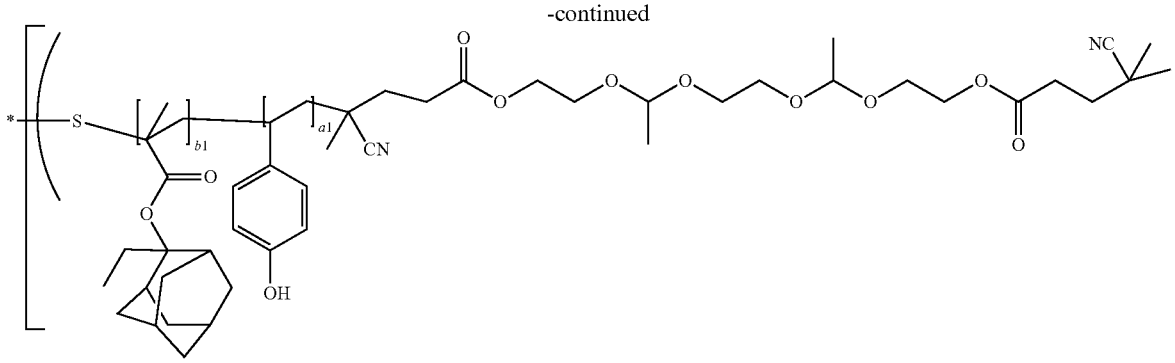

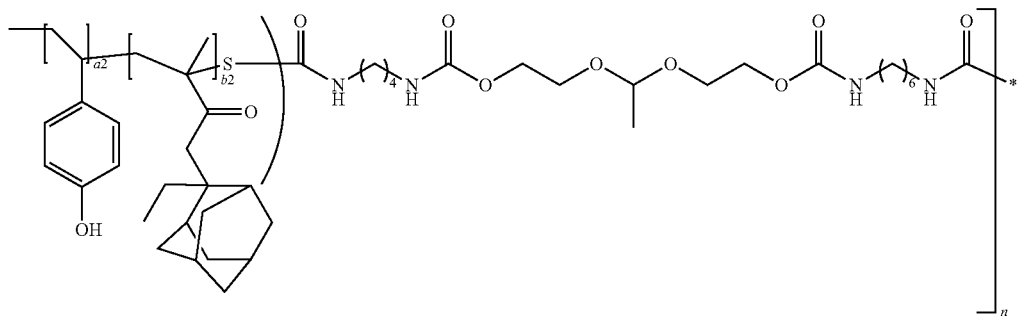

In Formula 10-1, b1, a1, b2, a2, and n were adjusted so that each polymer has a weight average molecular weight of 5,501 g/mol. In the polymer at the step previous to obtaining the polymer of Formula 10-1, b1, a1, b2, a2, and n may be adjusted so that each polymer has a weight average molecular weight of 4,950 g/mol. The mixed molar ratio of styrenic repeating units and methacrylic repeating units was 1:1. a2 and b2 are the same as a1 and b1, respectively.

In accordance with Reaction Scheme 6, 0.1 g of the prepolymer of Formula 6-3 was added to a 5 mL vial and completely dissolved with 0.3 mL of anhydrous tetrahydrofuran. Then, 5.8 mg of triethylamine was added to the vial and reaction solution mixed using a vortex mixer. Next, 4.7 mg of dibutyltin dilaurate, 2.1 mg of a compound of Formula 7, and 22 mg of hexamethylene diisocyanate of Formula 8 were added to a 10 mL round-bottom flask and stirred.

Formula 7

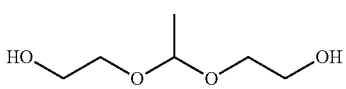

In a few seconds upon stirring the reaction mixture began to turn cloudy an acetal-polymer solution was added and stirred at room temperature for 19 hours. The resulting solution was diluted with tetrahydrofuran, followed by the addition of hexane to obtain a precipitate. The precipitate was collected by vacuum filtration and then dried in a vacuum oven to obtain a polymer.

After 0.5 g of the polymer sample and 10 mL of methanol were added toto a 100-mL round-bottom flask, a 28% ammonia aqueous solution (70 equivalents per a mole of 4-acetoxystyrene) was added thereto. After stirring at room temperature for 24 hours, the solvent was removed using a rotary evaporator, the resulting product was dissolved with tetrahydrofuran, then precipitated with water, and filtered under vacuum for recovery, followed by drying to yield a random copolymer of Formula 10-1, an acetal-based polymer.

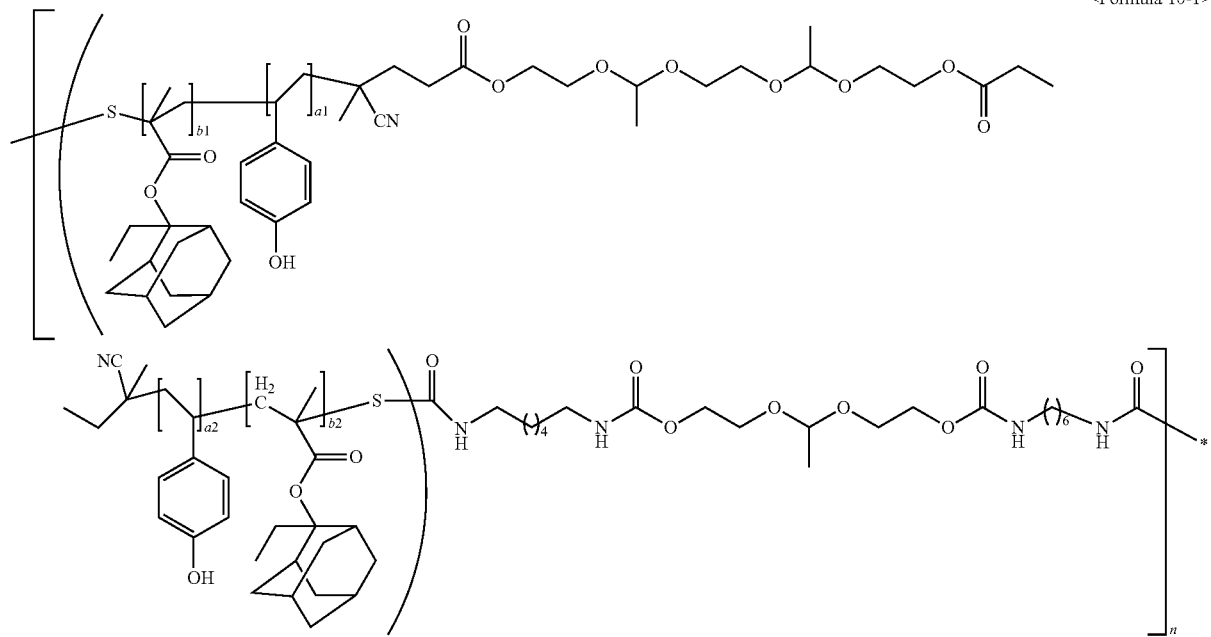

<Formula 10-1>

In Formula 10-1, a1, b1, a2, b2, and n, degrees of polymerization, were adjusted so that the copolymer of Formula 10-1 has a weight average molecular weight of about 5,501 g/mol. The mixed molar ratio of styrenic repeating units and methacrylic repeating units was 1:1. In Formula 10-1, a2 and b2 have the same values as those of a1 and b1, respectively.

Figure 5:
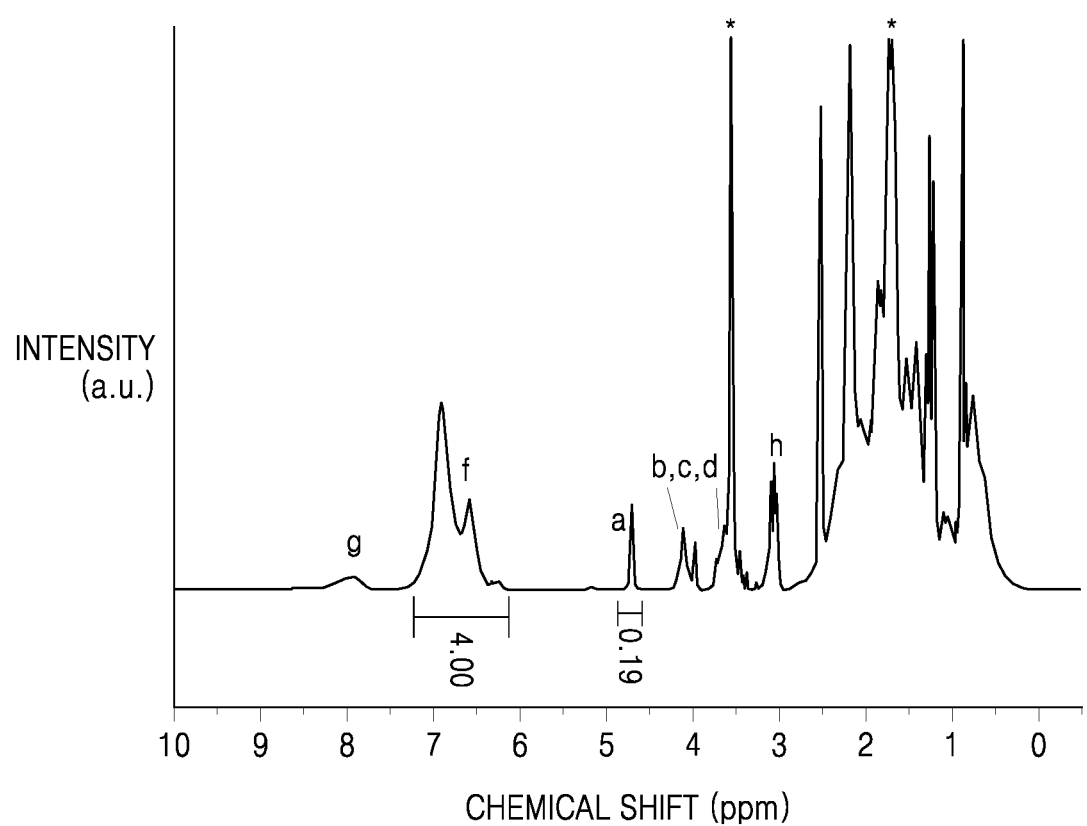
FIG. 5 shows a $^1$H-NMR spectrum of an acetal-based polymer prepared according to Example 4.

The structure of the polymer was confirmed from the $^1$H-NMR spectrum of FIG. 5. The measurement solvent used was THF-d8.

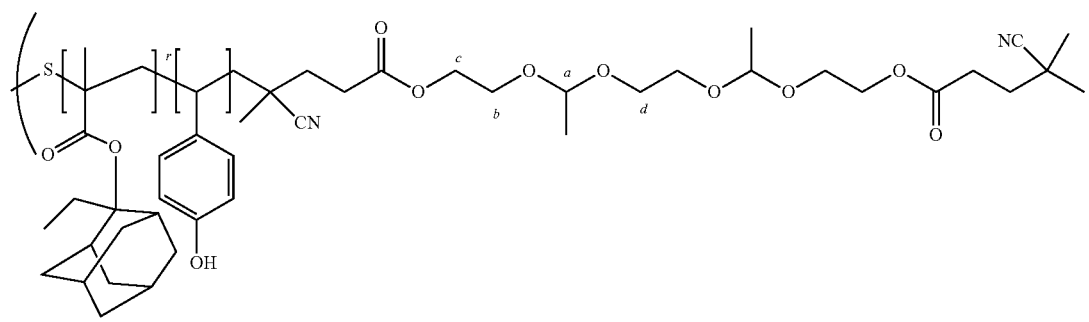

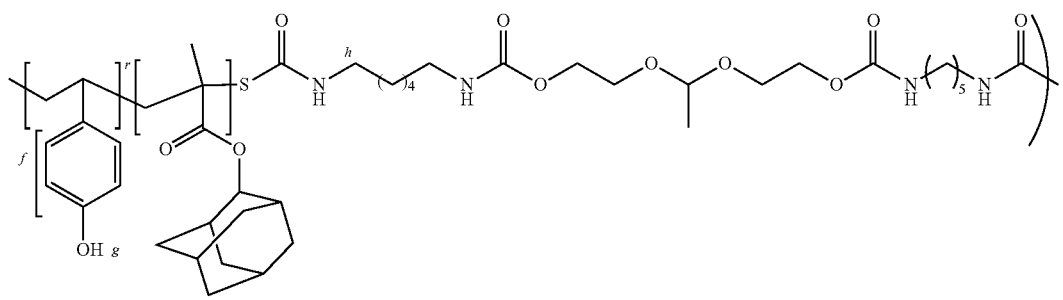

Example 6. Synthesis of Photoacid Generator (PAG)

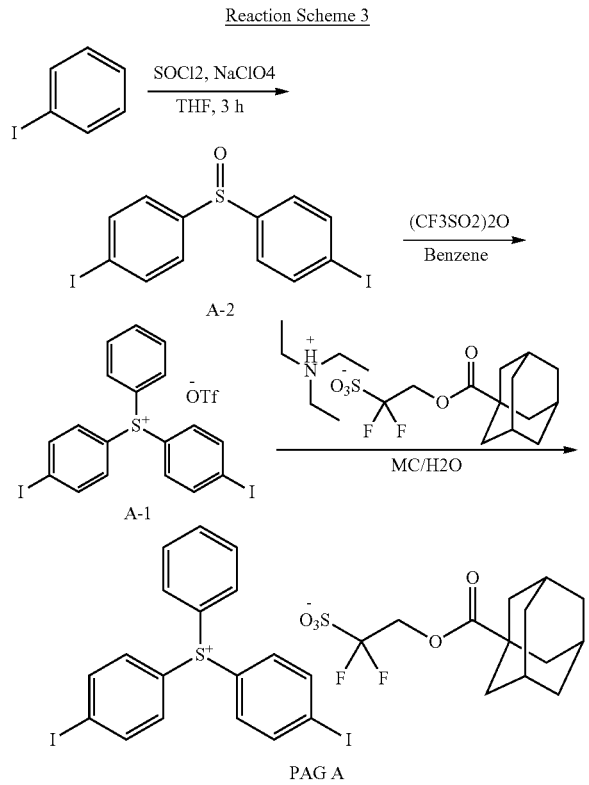

2.246 g (11.01 mmol) of iodobenzene, 0.655 g (5.51 mmol) of thionyl chloride, and 0.117 g (1.10 mmol) of sodium perchlorate were mixed with 12 mL of tetrahydrofuran and then stirred for 3 hours. Thereafter, the reaction solvent was removed under reduced pressure and extracted with 30 ml of water and 30 mL of methylene chloride to provide an organic layer. The organic layer is separated and dried with $Na_2SO_4$ and filtered. From the obtained filtrate, residues were obtained under reduced pressure, followed by separation and purification by silica gel column chromatography to obtain compound A-2 (3.75 g, yield: 75%). The compound was identified by NMR and liquid chromatography and mass spectrometry (LC-MS). $^1$H NMR (300 MHZ, $CDCl_3$): δ 7.05 (d, 4H), 7.42 (d, 4H), LC-MS m/z=454.85 (M+H)

After 3.73 g (8.20 mmol) of compound A-2 was dissolved in 15 ml of benzene, 2.778 g (9.85 mmol) of trifluoromethanesulfonic anhydride was dropwise added to the solution at 0° C. and stirred at room temperature for 1 hour. The reaction mixture is extracted with 20 mL of water and 50 mL of acetyl acetate to provide an organic layer that is then separated, washed with a saturated $NaHCO_3$ aqueous solution, and filtered. From the obtained filtrate, residues were obtained under reduced pressure, followed by separation and purification by silica gel column chromatography to obtain compound A-1 (4.92 g, 90%). The compound was identified by NMR and liquid chromatography and mass spectrometry (LC-MS). $^1$H NMR (300 MHZ, $CD_2Cl_2$): δ 8.08 (d, 4H), 7.84 (t, 1H), 7.74 (t, 2H), 7.69 (d, 2H), 7.41 (d, 2H), LC-MS m/z=514.88 (Cation)

4.91 g (7.39 mmol) of compound A-1 and 3.146 g (7.39 mmol) of triethylammonium 2-(1-adamantanecarbonyloxy)-1,1-difluoroethanesulfonate were mixed with 45 mL of methylene chloride and 5 ml of water, and stirred for 1 hour. The resulting organic layer was separated and dried with $MgSO_4$ and filtered. From the obtained filtrate, residues were obtained under reduced pressure, followed by separation and purification by silica gel column chromatography to obtain compound PAG A (5.7 g, 92% yield, 99% purity). The obtained compound was identified by NMR and matrix-assisted laser desorption/ionization (MALDI) high-resolution mass spectrometry (HRMS). $^1$H NMR (300 MHz, $CD_2Cl_2$): δ 8.08 (d, 4H), 7.84 (t, 1H), 7.74 (t, 2H), 7.69 (d, 2H), 7.41 (d, 4H), 4.63 (t, 2H), 2.00 (m, 3H), 1.89 (m, 6H), 1.71 (m, 3H), HRMS (MALDI) calcd for $C_{31}H_{30}F_2I_2O_5S_2$: m/z 837.96 Found: 837.95

Example 7: Preparation of Polymer of Formula 9

A polymer represented by Formula 9 was synthesized in the following manner.

0.94 g of dimethyl 2,2'-azobis(2-methylpropionate) (Waco Chemicals), 3.03 g of 2-ethyl-2-adamantyl methacrylate (TCI Chemicals), and 1.98 g of 4-acetoxy styrene (Sigma-Aldrich) were dissolved in tetrahydrofuran and then polymerized at 80° C. for 8 hours. Thereafter, upon addition of methanol a precipitate formed and the precipitate was dried in a 40° C. vacuum oven for 12 hours to obtain a white polymer powder. The obtained polymer was stirred in a mixed solution of sodium methoxide and methanol with a magnetic stir bar for 6 hours, and then acidified with acetic acid to obtain an acidified polymer. Thereafter, the acidified polymer was precipitated with distilled water, and the resulting precipitate was dried in a vacuum oven for 48 hours to obtain a white polymer powder represented by Formula 9.

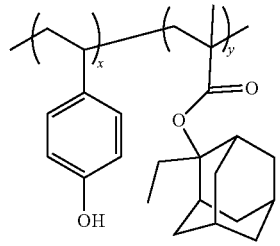

Formula 9

In Formula 9, x and y are each the number of about 50.

Example 8: Preparation of Photoresist Composition

A photoresist composition was prepared with the acetal-based polymer obtained according to Example 5, which is then used as a base polymer according to the following processes.

100 parts by weight of acetal-based polymer as a random copolymer, 20.29 parts by weight of a photoacid generator of Formula 11, 12 parts by weight of a photodegradable quencher of Formula 12 (Chemieliva Pharmaceutical Product List), and 7500 parts by weight of a co-solvent in which propylene glycol monoethyl ether acetate (Aldrich) and propylene glycol monomethyl ether (Aldrich) were mixed in a weight ratio of 30:70, were added and mixed to prepare a photoresist composition.

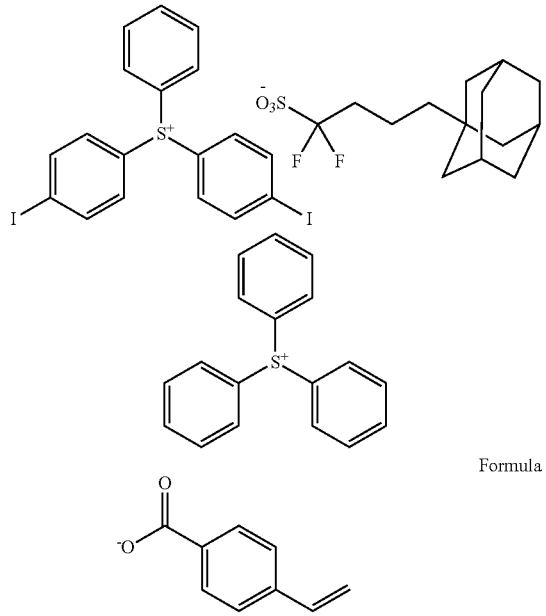

Formula 11

Formula 12

Comparative Example 1: Preparation of Photoresist Composition

A photoresist composition was prepared according to the same manner as in Example 1, except that the polymer represented by Formula 9, obtained according to Example 6, was used as the base polymer.

Evaluation Example 1: Stability Test Using Perfluorobutanesulfonic Acid

Figure 6:
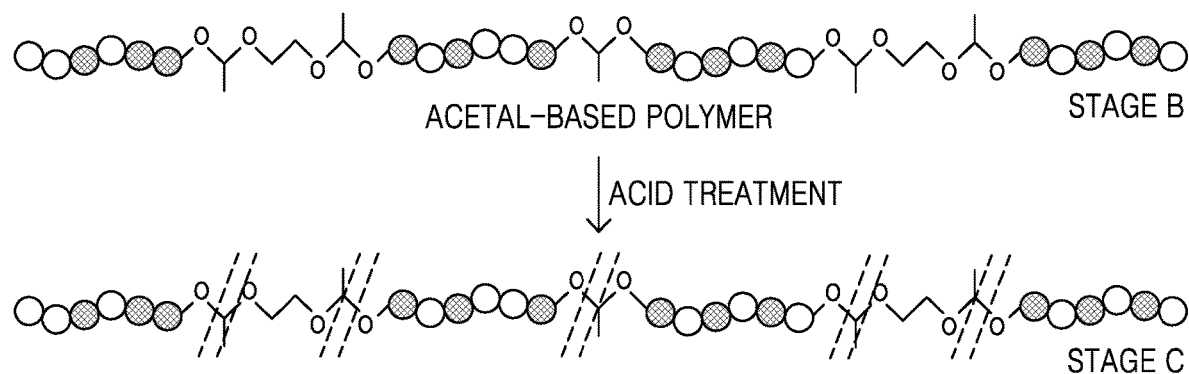
FIG. 6 is an illustration for explaining an acid treatment process of an acetal-based polymer.

A stability test of the acetal-based polymer obtained according to Example 5 was carried out as follows. After 0.1 g of the acetal-based polymer as a random polymer was completely dissolved in 0.5 mL of anhydrous tetrahydrofuran, acid treatment was carried out by adding 8 mg of perfluorobutanesulfonic acid. Subsequently, after stirring at room temperature (25° C.) for 23 hours, the acid was removed with an aqueous solution of ethyl acetate and sodium hydrogen carbonate. The organic layer was then extracted and separated, and the organic solvent was removed using a rotary evaporator FIG. 6 illustrates the acid treatment process described above. By acid treatment of the acetal-based polymer, acetal units were decomposed.

Figure 7:
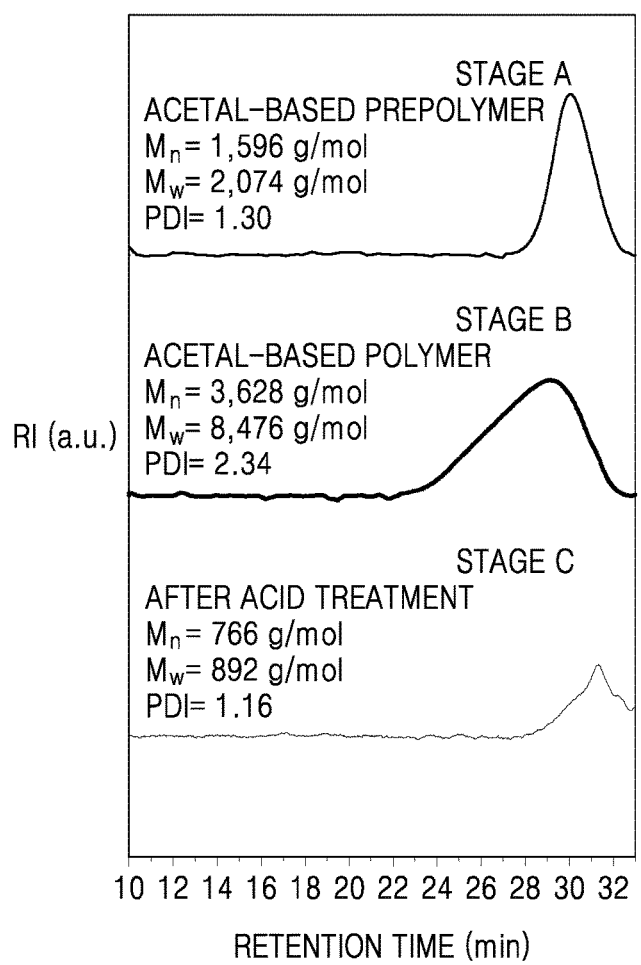
FIG. 7 shows results of gel permeation chromatography (GPC) measurement of an acetal-based prepolymer, an acetal-based polymer obtained from the acetal-based prepolymer, and a product after acid treatment.

The product resulting from the acid treatment was analyzed by gel permeation chromatography to analyze the composition, weight average molecular weight (Mw), number average molecular weight (Mn), and polydispersity index (PDI) thereof. The analysis results are shown in FIG. 7. PDI was evaluated by Equation 1.

$$PDI = Mw/Mn \quad \text{Equation 1}$$

Referring to FIG. 7, it is found that the Mn, Mw, and PDI of the acetal-based polymer were greater compared to those of the acetal-based prepolymer. It is also found that after decomposition by the acid treatment, the Mw, Mn, and PDI of the polymer chains were reduced.

Phase A in FIG. 7 corresponds to the acetal-based prepolymer at phase A in Reaction Scheme 7.

Reaction Scheme 7

A Step

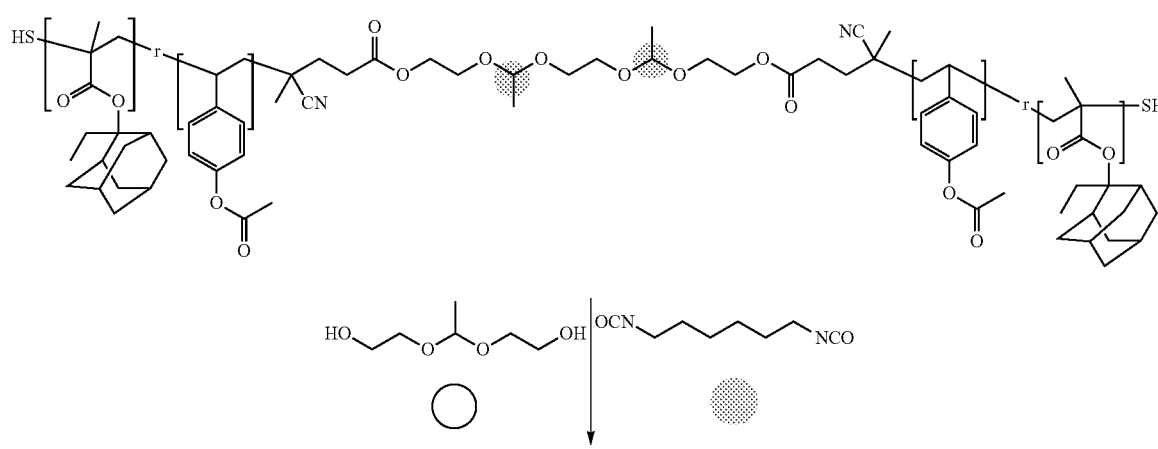

Evaluation Example 2: Photoresist Pattern Formation Process 12-inch circular silicon wafer substrates were pretreated in a UV ozone cleaning system for 10 minutes. Subsequently, the photoresist compositions prepared in Example 8 and Comparative Example 1 were spin-coated on the pretreated substrates, respectively, and subjected to calcination on a hot plate at 110° C. for 30 seconds (post-apply bake (PAB)) to form a photoresist film having a thickness of about 100 nm. A mask and EUV light (ASML NXE-3350) were projected onto the photoresist film-coated wafers. Subsequently, the photoresist film-coated wafers were subjected to exposure on a hot plate at 90° C. for 30 seconds (post-exposure bake, PEB). The calcinated films were soaked in a 2.38% TMAH developer solution for 30 sec. Patterns each having a critical dimension (CD) of 50 nm and lines (25 nm) and spaces (25 nm) were formed.

Subsequently, washing with deionized (DI) water for 10 sec was carried out to remove coated portions that were not exposed to EUV light, followed by drying, thereby forming photoresist patterns.

The line edge roughness (LER) of each photoresist pattern was measured. The measurement results are shown in Table 1.

TABLE 1

| Class. | Measured LER value of Example 8 | Measured LER value of Comparative Example 1 |
|---|---|---|
| 1 time | 2.2 nm | 2.8 nm |
| 2 times | 2.1 nm | 3.0 nm |
| 3 times | 2.3 nm | 3.0 nm |
| 4 times | 2.0 nm | 3.1 nm |

Referring to Table 1, the photoresist pattern formed using the photoresist composition of Example 8 was found to have improved roughness characteristics and good LER characteristics, compared to those of the photoresist pattern formed using the photoresist composition of Comparative Example 1.

As described above, the acetal-based polymer according to one or more embodiments includes an acetal moiety as an acid labile group, and thus, the molecular weight can be effectively reduced when treated with acid. When using a photoresist composition containing such an acetal-based polymer, an exposed portion may have a reduced molecular weight, thus increasing solubility to a developing solution while reducing line edge roughness (LER), and thus, high pattern accuracy can be achieved.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:
1. An acetal-based prepolymer which is a polymerization product of the acetal-based compound, a first polymerizable monomer having a polar group, and a second polymerizable monomer having an acid labile group,
wherein the acetal-based compound is represented by Formula 1:

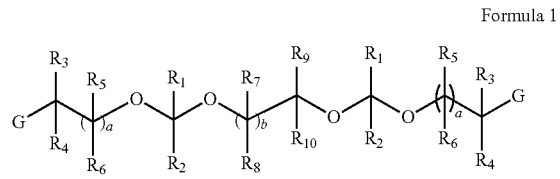

Formula 1 wherein, in Formula 1,
$R_1$ to $R_{10}$ are each independently hydrogen, deuterium, a substituted or unsubstituted C1-C60 alkyl group, a substituted or unsubstituted C2-C60 alkenyl group, a substituted or unsubstituted C2-C60 alkynyl group, a substituted or unsubstituted C1-C60 alkoxy group, a substituted or unsubstituted C3-C10 cycloalkyl group, a substituted or unsubstituted C1-C10 heterocycloalkyl group, a substituted or unsubstituted C3-C10 cycloalkenyl group, a substituted or unsubstituted C1-C10 heterocycloalkenyl group, a substituted or unsubstituted C6-C60 aryl group, a substituted or unsubstituted C6-C60 aryloxy group, a substituted or unsubstituted C6-C60 arylthio group, a substituted or unsubstituted C1-C60 heteroaryl group, a substituted or unsubstituted C8-C60 monovalent non-aromatic condensed polycyclic group, a substituted or unsubstituted C1-C60 monovalent non-aromatic condensed heteropolycyclic group, $-Si(Q_1)(Q_2)(Q_3)$, $-B(Q_1)(Q_2)$, $-N(Q_1)(Q_2)$, $-P(Q_1)(Q_2)$, $-C(=O)(Q_1)$, $-S(=O)(Q_1)$, $-S(=O)_2(Q_1)$, $-P(=O)(Q_1)(Q_2)$, or $-P(=S)(Q_1)(Q_2)$,
$Q_1$ to $Q_3$ are each independently hydrogen; deuterium; $-F$; $-Cl$; $-Br$; $-I$; a hydroxyl group; a cyano group; a nitro group; a C1-C60 alkyl group; a C2-C60 alkenyl group; a C2-C60 alkynyl group; a C1-C60 alkoxy group; or a C3-C60 carbocyclic group unsubstituted or substituted with deuterium, $-F$, cyano group, a C1-C60 alkyl group, a C1-C60 alkoxy group, a phenyl group, a biphenyl group, or any combination thereof; a C1-C60 heterocyclic group unsubstituted or substituted with deuterium, $-F$, cyano group, a C1-C60 alkyl group, a C1-C60 alkoxy group, a phenyl group, a biphenyl group, or any combination thereof; a C7-C60 arylalkyl group unsubstituted or substituted with deuterium, $-F$, cyano group, a C1-C60 alkyl group, a C1-C60 alkoxy group, a phenyl group, a biphenyl group, or any combination thereof; or a C2-C60 heteroarylalkyl group unsubstituted or substituted with deuterium, $-F$, cyano group, a C1-C60 alkyl group, a C1-C60 alkoxy group, a phenyl group, a biphenyl group, or any combination thereof,
with an exception that both $R_1$ and $R_2$ are hydrogen (in other words, neither $R_1$ nor $R_2$ are both hydrogen),
a and b are each independently 0 or an integer of 1 to 10,
G is a group represented by Formula 2 or Formula 2a,

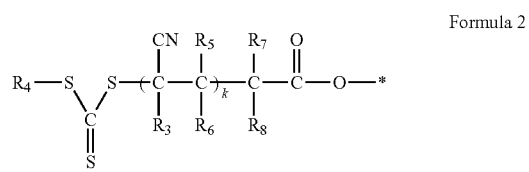

Formula 2

-continued

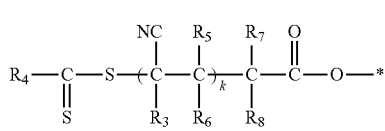

Formula 2a wherein, in Formula 2 and Formula 2a, $R_4$ is an unsubstituted or substituted C1-C60 alkyl group or an unsubstituted or substituted C1-C60 aryl group, $R_3$ and $R_5$ to $R_8$ are each independently hydrogen, or an unsubstituted or substituted C1-C20 alkyl group,

* indicates a linking site, and k is 0 or 1.

2. The acetal-based prepolymer of claim 1, wherein the first polymerizable monomer having a polar group is a compound represented by Formula 4:

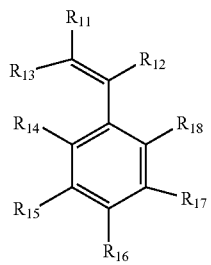

Formula 4 wherein, in Formula 4, $R_{11}$ to $R_{13}$ are each independently a hydrogen, a C1-30 alkyl group, or a C6-C60 aryl group, $R_{14}$ to $R_{18}$ are each independently hydrogen, a C1-C60 alkyl group, a C1-C60 alkoxy group, a cyano group, a hydroxyl group, a halogen, a halogen-substituted C1-C60 alkyl group, an acetal group, R'C(=O)O—, wherein R' is H or a C1-C20 alkyl group, a C6-C60 aryl group, a C6-C60 aryloxy group, a C6-C60 arylthio group, a C1-C60 heteroaryl group, a C8-C60 monovalent non-aromatic condensed polycyclic group, or a C1-C60 monovalent non-aromatic condensed heteropolycyclic group, optionally, at least two adjacent $R_{14}$ to $R_{18}$ are linked to form a ring, and at least one of $R_{14}$ to $R_{18}$ is a polar group.

3. The acetal-based prepolymer of claim 2, wherein the polar group is a hydroxyl group, an acetal group, or R'C(=O)O—, wherein R' is H or a C1-C20 alkyl group.

4. The acetal-based prepolymer of claim 1, wherein the second polymerizable monomer having an acid labile group is a compound represented by Formula 5:

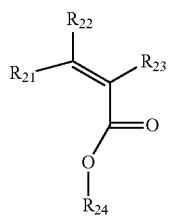

Formula 5 wherein, in Formula 5, $R_{21}$, $R_{22}$, and $R_{23}$ are each independently a hydrogen or a C1-C60 alkyl group, and $R_{24}$ is an acid labile group.

5. The acetal-based prepolymer of claim 4, wherein the acid labile group is a tertbutyl group, a tert-amyl group, or a hydrocarbon group having a C4-C60 alicyclic structure.

6. The acetal-based prepolymer of claim 4, wherein the acid labile group is an unsubstituted or substituted group A selected from an adamantyl group, a noradamantyl group, a decalin residue, a tricyclodecanyl group, a tetracyclododecanyl group, a norbornyl group, a cedrol group, a cyclohexyl group, a cycloheptyl group, a cyclooctyl group, a cyclodecanyl group, or a cyclododecanyl group.

7. The acetal-based prepolymer of claim 1, wherein the acetal-based prepolymer is a compound represented by Formula 6:

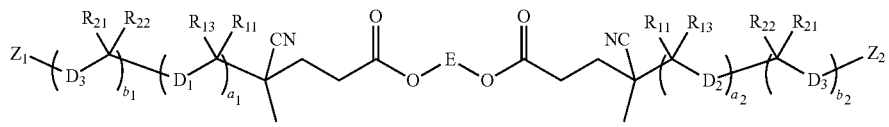

Formula 6

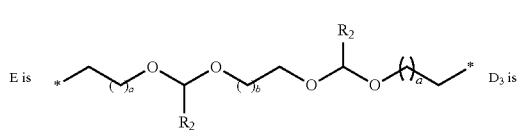

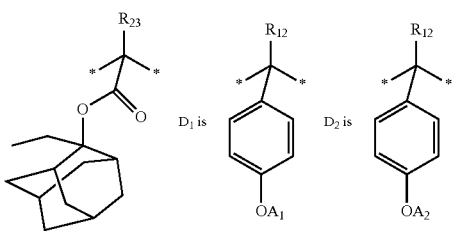

wherein, in Formula 6, $A_1$ and $A_2$ are each independently H, or —C(═O)$R_3$, where $R_3$ is a C1-C60 alkyl group,
$Z_1$ and $Z_2$ are each independently —SH,

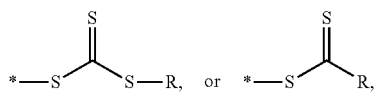

and * indicates a binding site,
R is a C1-C30 alkyl group, $R_2$ is a C1-C30 alkyl group, a and b are each independently 0 or an integer of 1 to 10, $R_{11}$, $R_{12}$, and $R_{13}$ are each independently hydrogen, a C1-30 alkyl group or a C6-C60 aryl group, $R_{21}$, $R_{22}$, and $R_{23}$ are each independently hydrogen or a C1-C60 alkyl group, and a1, b1, a2, and b2 are each independently an integer from 1 to 10,000.

8. The acetal-based prepolymer of claim 1, wherein the acetal-based prepolymer is an acetal-based prepolymer represented by Formula 6-1:

Formula 6-1

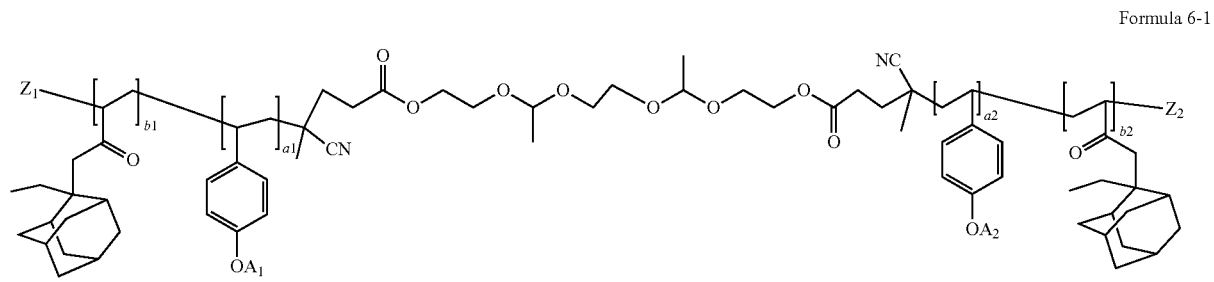

wherein, in Formula 6-1, A1 and A2 are each independently H or —C(═O)$R_3$, wherein $R_3$ is a C1-C60 alkyl group,
$Z_1$ and $Z_2$ are each independently —SH,

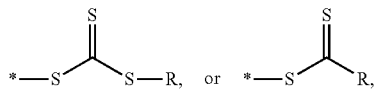

and * indicates a binding site,
R is a C1-C30 alkyl group, and a1, b1, a2, and b2 indicate the degrees of polymerization and are each independently a number from 1 to 10,000.

9. The acetal-based prepolymer of claim 1, wherein the acetal-based prepolymer is a compound represented by Formula 6-2, a compound represented by Formula 6-3, or a compound represented by Formula 6-4:

Formula 6-2

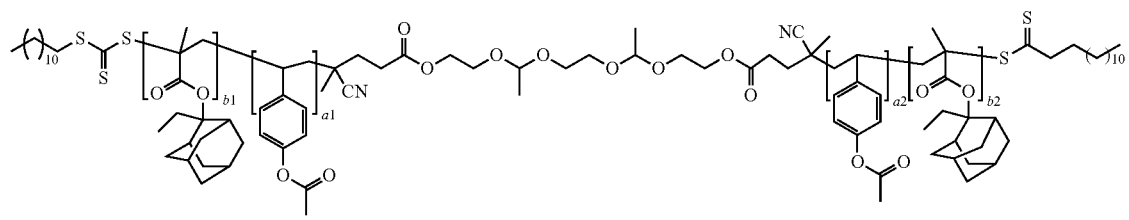

Formula 6-3

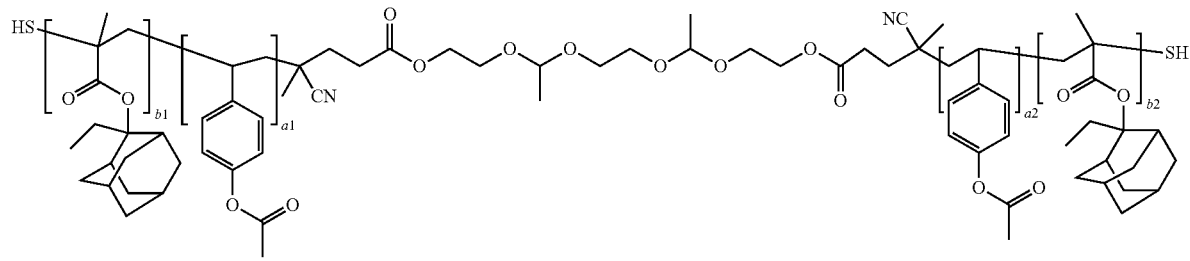

Formula 6-4

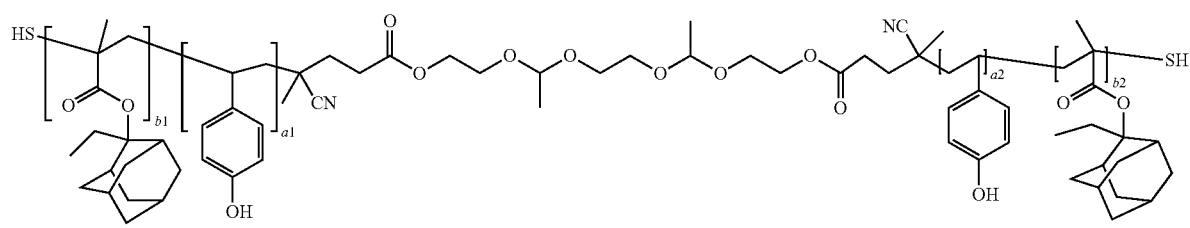

wherein, in Formulae 6-2, 6-3, and 6-4, a1, b1, a2, and b2 are each independently a number from 1 to 10,000.

10. The acetal-based prepolymer of claim 1, wherein the acetal-based prepolymer has a weight average molecular weight of about 1,500 grams per mole to about 20,000 grams per mole.

11. An acetal-based polymer which is a chain extension reaction product of the acetal-based prepolymer of claim 5 and a chain extender.

12. The acetal-based polymer of claim 11, wherein the chain extender is a urethane-based compound that is a reaction product of a diol represented by Formula 7 and a diisocyanate represented by Formula 8, a compound represented by Formula 9, or a combination thereof:

Formula 7

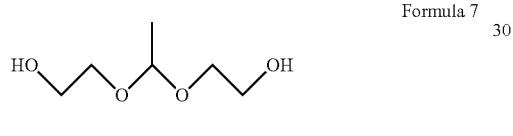

Formula 8

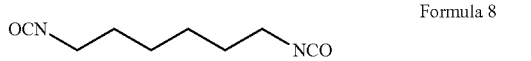

Formula 9

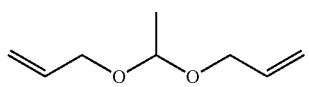

13. The acetal-based polymer of claim 11, comprising a first repeating unit represented by Formula 4-1 and a second repeating unit represented by Formula 5-1:

Formula 4-1

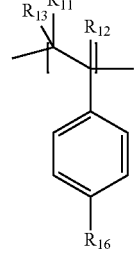

Formula 5-1

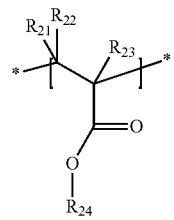

wherein, in Formula 4-1, $R_{11}$, $R_{12}$, and $R_{13}$ are each independently hydrogen, a C1-30 alkyl group, or a C6-C60 aryl group, and $R_{16}$ is a polar group, a hydroxyl group, an acetal group, or R'C(=O)O—, wherein R' is H or a C1-C20 alkyl group, and in Formula 5-1, $R_{21}$, $R_{22}$, and $R_{23}$ are each independently hydrogen or a C1-C60 alkyl group, and $R_{24}$ is an acid labile group, a tertbutyl group, a tert-amyl group, or a hydrocarbon group having a C4-C60 alicyclic structure.

14. The acetal-based polymer of claim 11, wherein an amount of the chain extender is about 0.5 to 2 moles with respect to 1 mole of the acetal-based prepolymer.

15. The acetal-based polymer of claim 11, wherein the acetal-based polymer is an acetal-based polymer represented by Formula 10:

Formula 10

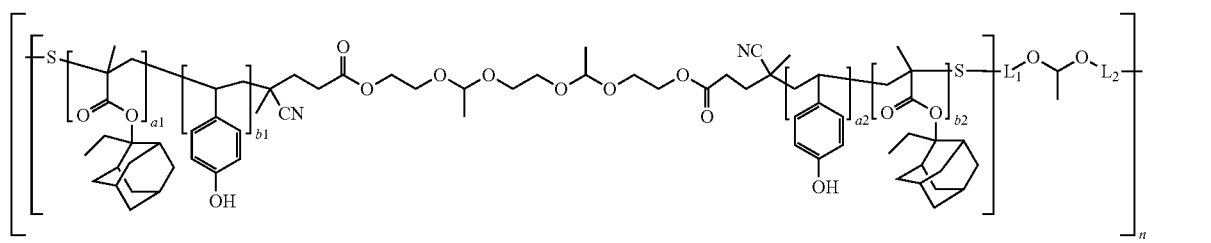

wherein, in Formula 10, $L_1$ and $L_2$ are linkers, $L_1$ is —C(=O)NH—$(CH_2)_{k1}$-NHC(=O)O—$(CH_2)_{k2}$— or —$(CH_2$—$CH_2)_{k3}$—, $L_2$ is —$(CH_2)_{k4}$—OC(=O)NH—$(CH_2)_{k5}$— or —$(CH_2$—$CH_2)_{k6}$—, $k_1$ to $k_6$ are each independently an integer of 1 to 10, and a1, b1, a2, b2, and n are each independently an integer from 1 to 10,000.

16. The acetal-based polymer of claim 11, wherein the acetal-based polymer is a polymer represented by Formula 10-1, or a polymer represented by Formula 10-2:

<Formula 10-1>

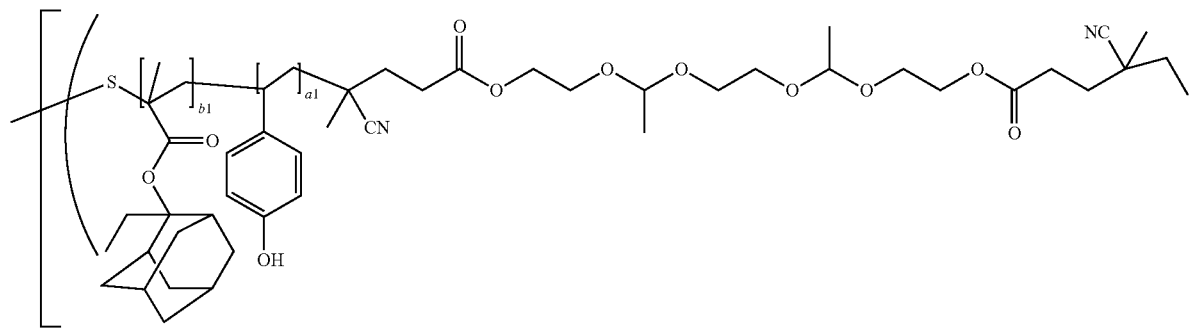

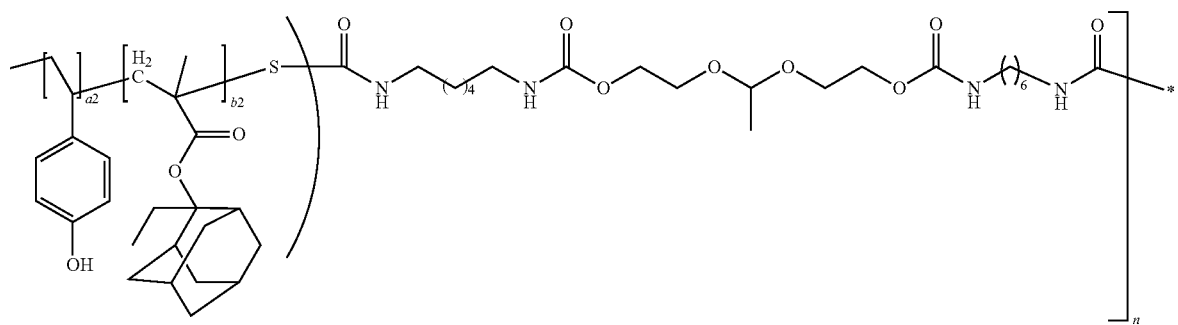

wherein, in Formula 10-1, a1, b1, a2, b2, and n are each independently an integer from 1 to 10,000, Formula 10-2

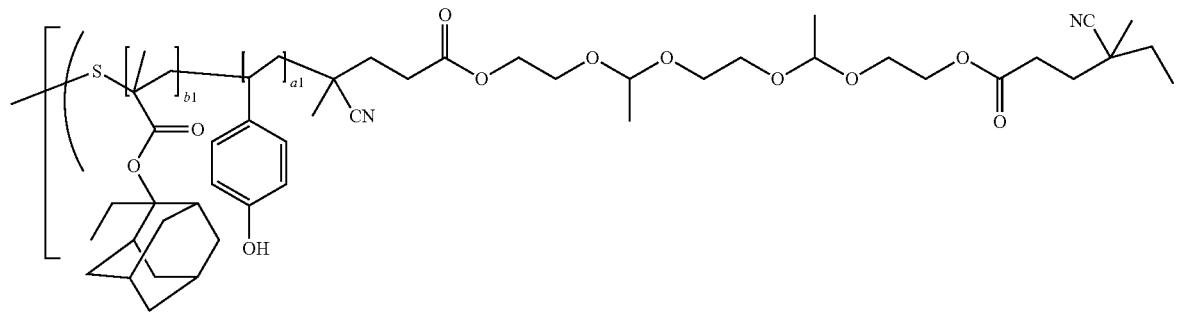

-continued

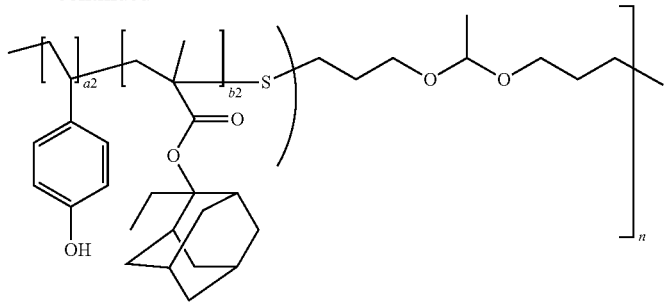

wherein, in Formula 10-2, a1, b1, a2, b2, and n are each independently are an integer from 1 to 10,000.

17. The acetal-based polymer of claim 11, wherein the acetal-based polymer has a weight average molecular weight of about 4,000 grams per mole to about 20,000 grams per mole and a polydispersity index of about 1.2 to about 2.5.

18. The acetal-based polymer of claim 11, wherein the acetal-based polymer is a random copolymer, a block copolymer, an alternating copolymer, a graft copolymer, or a combination thereof.

19. A photoresist composition comprising
a base polymer, a photoacid generator, and a solvent,
wherein the base polymer comprises the acetal-based polymer according to claim 11.

20. The photoresist composition of claim 19, wherein an amount of the acetal-based polymer is about 1 part by weight to about 25 parts by weight, with respect to 100 parts by weight of a total weight of the photoresist composition.

21. The photoresist composition of claim 19, wherein the acetal-based polymer has a weight average molecular weight of about 4,000 grams per mole to about 50,000 grams per mole and a polydispersity index of about 1.2 to about 2.5.

22. The photoresist composition of claim 19, wherein a polymer decomposition product after acid-treatment of the base polymer has a weight average molecular weight of 3,000 grams per mole or less.

* * * * *